(12) United States Patent
Forssell et al.

(10) Patent No.: US 11,961,978 B2
(45) Date of Patent: Apr. 16, 2024

(54) INTEGRATED ALTERNATING CURRENT AND DIRECT CURRENT SUPPLY IN A BATTERY DEVICE

(71) Applicant: Volvo Car Corporation, Gothenburg (SE)

(72) Inventors: Jonas Forssell, Torslanda (SE); Robert Eriksson, Hålta (SE)

(73) Assignee: VOLVO CAR CORPORATION, Gothenburg (SE)

( * ) Notice: Subject to any disclaimer, the term of this patent is extended or adjusted under 35 U.S.C. 154(b) by 134 days.

(21) Appl. No.: 17/306,230

(22) Filed: May 3, 2021

(65) Prior Publication Data

US 2022/0037703 A1 Feb. 3, 2022

Related U.S. Application Data

(60) Provisional application No. 63/059,300, filed on Jul. 31, 2020.

(51) Int. Cl.
| | | |
|---|---|---|
| *H01M 10/42* | (2006.01) | |
| *G06N 20/00* | (2019.01) | |
| *H01M 10/48* | (2006.01) | |
| *H02J 7/00* | (2006.01) | |

(Continued)

(52) U.S. Cl.
CPC ........ *H01M 10/4257* (2013.01); *G06N 20/00* (2019.01); *H01M 10/48* (2013.01); *H01M 10/482* (2013.01); *H02J 7/0013* (2013.01); *H02J 7/0047* (2013.01); *B60L 50/64* (2019.02); *B60L 58/10* (2019.02);

(Continued)

(58) Field of Classification Search
CPC .......... H01M 10/4257; H01M 10/482; H01M 2010/4278; H01M 2220/20
USPC ......................................................... 429/90
See application file for complete search history.

(56) References Cited

U.S. PATENT DOCUMENTS

| | | | |
|---|---|---|---|
| 5,622,789 A | 4/1997 | Young | |
| 8,134,338 B2 | 3/2012 | Choi | |
| 9,362,757 B2 | 6/2016 | Deal et al. | |

(Continued)

FOREIGN PATENT DOCUMENTS

| | | |
|---|---|---|
| EP | 2 681 782 B1 | 1/2014 |
| EP | 2 705 564 B1 | 3/2014 |

(Continued)

OTHER PUBLICATIONS

Communication pursuant to Rule 69 EPC Received for European Patent Application No. 21188834.2 dated Feb. 7, 2022, 2 pages.

(Continued)

*Primary Examiner* — James M Erwin
(74) *Attorney, Agent, or Firm* — Amin, Turocy & Watson, LLP

(57) ABSTRACT

Devices, systems, methods, computer-implemented methods, and/or computer program products to facilitate an intelligent battery cell with integrated monitoring and switches are provided. According to an embodiment, a device can comprise active battery cell material. The device can further comprise an internal circuit coupled to the active battery cell material and comprising: one or more switches coupled to battery cell poles of the device; and a processor that operates the one or more switches to provide a defined value of electric potential at the battery cell poles.

20 Claims, 30 Drawing Sheets

(51) Int. Cl.
*B60L 50/64* (2019.01)
*B60L 58/10* (2019.01)

(52) U.S. Cl.
CPC .............. *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 9,891,286 | B2 | 2/2018 | Fetzer et al. |
| 10,056,654 | B2 | 8/2018 | Butzmann et al. |
| 10,205,327 | B2 | 2/2019 | Okui |
| 10,367,239 | B1 | 7/2019 | Dao |
| 2009/0296442 | A1* | 12/2009 | Chang .................. H02J 7/342 320/105 |
| 2013/0127399 | A1 | 5/2013 | Tang et al. |
| 2015/0365788 | A1* | 12/2015 | Lidgren ................ H04W 4/14 455/456.1 |
| 2016/0226268 | A1 | 8/2016 | Okui |
| 2016/0365788 | A1* | 12/2016 | Singh ................... H02P 29/02 |
| 2017/0256984 | A1* | 9/2017 | Ding .................... H02J 1/14 |
| 2018/0175638 | A1 | 6/2018 | Zhu |
| 2020/0011934 | A1 | 1/2020 | Tabatowski-Bush et al. |
| 2020/0142004 | A1 | 5/2020 | Ito et al. |
| 2020/0164763 | A1 | 5/2020 | Holme |
| 2020/0207219 | A1 | 7/2020 | Slepchenkov et al. |
| 2020/0274368 | A1 | 8/2020 | Crouse, Jr. |
| 2021/0126471 | A1 | 4/2021 | Srivastava et al. |
| 2021/0376629 | A1 | 12/2021 | Chen et al. |

FOREIGN PATENT DOCUMENTS

| | | |
|---|---|---|
| EP | 3 151 360 A1 | 4/2017 |
| EP | 3247022 A1 | 11/2017 |
| EP | 4 190 621 A1 | 6/2023 |
| GB | 2584424 A | 12/2020 |
| JP | 2021-19371 A | 2/2021 |
| KR | 10-2137759 B1 | 7/2020 |
| KR | 10-2180138 B1 | 11/2020 |
| WO | 2020/219440 A1 | 10/2020 |

OTHER PUBLICATIONS

Non-Final Office Action received for U.S. Appl. No. 17/306,221, dated Feb. 6, 2023, 39 pages.
Communication pursuant to Article 94(3) EPC received for EP Patent Application Serial No. 21188834.2 dated Mar. 22, 2023, 4 pages.
Extended European Search Report for European Application No. 21188834.2 dated Dec. 10, 2021, 8 pages.
LCSC Electronics, "Huayi HY3003D," https://lcsc.com/product-detail/Others_HuaYi-Microelectronics-HY3003D_C357980.html, @ 2020 Shenzhen LCSC Electronics Technology Co., Ltd.
coilcraft.com, "MSD1514 Series, " https://www.coilcraft.com/en-us/products/power/coupled-inductors/1-1-shielded-coupled/msd/msd1514/, Copyright 2021, Coilcraft, Inc.
LCSC Electronics, "Ai-Thinker ESP-12S," https://lcsc.com/product-detail/WIFI-Modules_ESP-12S_C82898.html, @ 2020 Shenzhen LCSC Electronics Technology Co., Ltd.
Rohm Co., "Calculation of Power Loss (Synchronous)," No. AEK59-D1-0065-2, Oct. 2016—Rev. 003, @ 2016 ROHM Co., Ltd.
Communication pursuant to Rule 114(2) EPC received for EP Patent Application Serial No. 21188834.2 dated May 3, 2023, 3 pages.
Final Office Action received for U.S. Appl. No. 17/306,221, dated Jul. 17, 2023, 121 pages.
Notice of Allowance received for U.S. Appl. No. 17/306,221, dated Oct. 10, 2023, 36 pages.
Ex Parte Quayle Action received for U.S. Appl. No. 17/306,248, dated Oct. 12, 2023, 39 pages.
Non- Final Office Action received for U.S. Appl. No. 17/306,256, dated Sep. 12, 2023, 58 pages.
Notice of Allowance received for U.S. Appl. No. 17/306,248, dated Dec. 20, 2023, 24 pages.
Xia et al., "State-of-charge Balancing of Lithium-ion Batteries with State-of-health Awareness Capability", IEEE Transactions on Industry Applications Transaction, 2020, 12 pages.
Chowdhury et al., "An Integrated State of Health (SOH) Balancing Method for Lithium-Ion Battery Cells", IEEE, 2019, pp. 5759-5763.
Forssell et al., "Intelligent Battery Cell With Integrated Monitoring and Switches", Provisional Application U.S. Appl. No. 63/059,300, filed Jul. 31, 2020, 59 pages.
Ekstrom et al., "Intelligent Battery Cell" Provisional Application U.S. Serial No. 63/246,483 filed on Sep. 21, 2021, 54 pages.
International Search Report and Written Opinion received for PCT Application Serial No. PCT/EP2022/085528 dated Mar. 14, 2023, 13 pages.
Notice of Allowance received for U.S. Appl. No. 17/306,221, dated Dec. 18, 2024, 6 pages.
Notice of Allowance received for U.S. Appl. No. 17/306,221, dated Jan. 24, 2024, 6 pages.

* cited by examiner

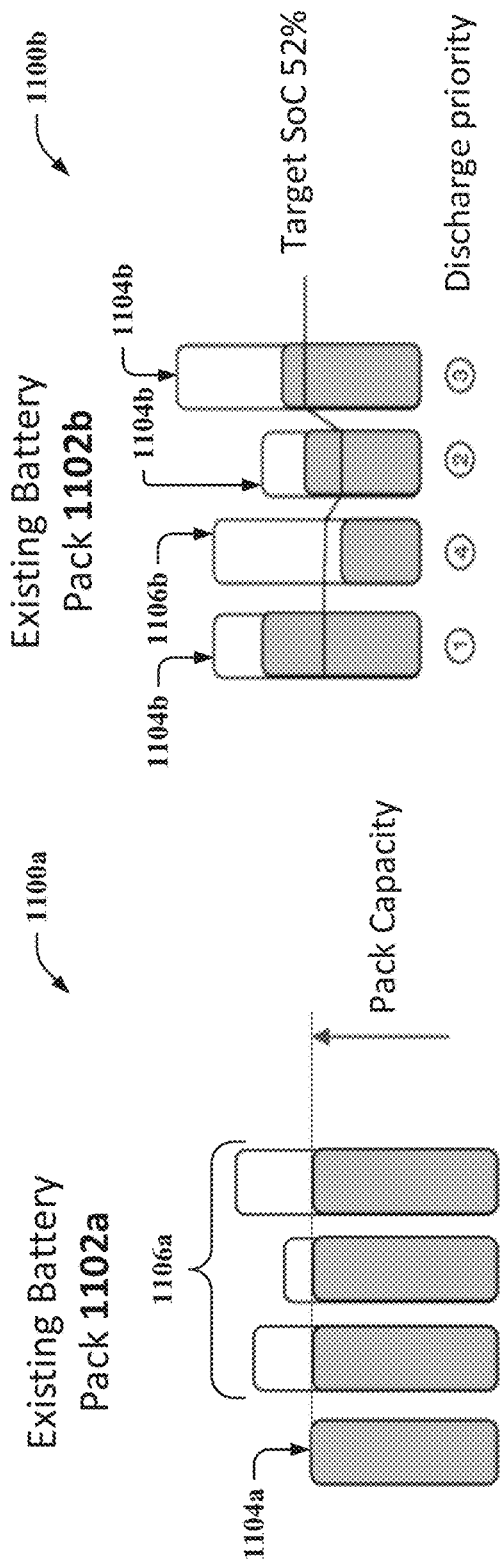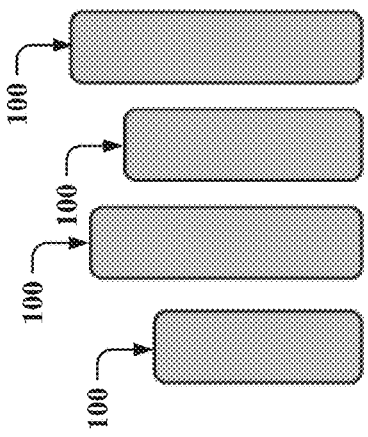
FIG. 11A
FIG. 11B
FIG. 11C

INTEGRATED ALTERNATING CURRENT AND DIRECT CURRENT SUPPLY IN A BATTERY DEVICE

CROSS-REFERENCE TO RELATED APPLICATIONS

This application claims the benefit of priority to U.S. Provisional Application No. 63/059,300, filed Jul. 31, 2020, entitled "INTELLIGENT BATTERY CELL WITH INTEGRATED MONITORING AND SWITCHES." The entirety of the aforementioned application is hereby incorporated herein by reference.

BACKGROUND

The subject disclosure relates to a battery cell, and more specifically, to a battery cell with integrated monitoring and switches.

Currently, an electric driveline (e.g., an electric driveline used in an electric vehicle) is based on a battery with a direct current (DC) voltage of approximately 370 volts (V). Many systems are designed around this battery to protect and control the battery. Auxiliary units are used to generate alternating current (AC) voltage to run motors and charge the battery. All these systems are complex and expensive and are a source of errors.

At present, there are a number of different types of battery packs comprising multiple batteries and/or cells. Some example problems with such battery packs include: a) they are always on, that is, they always have a live voltage (e.g., approximately 400V); and/or b) they provide a constant voltage and therefore they use the auxiliary units described above to provide fluctuating voltage (e.g., AC voltage) and/or lower voltage (e.g., 12V, 48V, etc.). In addition, there are a variety of existing battery management systems (BMS) that can be used in many different systems. Some example problems with existing BMS include: a) they involve a set of sensor cables and/or submodules that add complexity and/or cost; b) they only monitor cell parameters (e.g., temperature, pressure, etc.); c) they are not integrated inside the cell; and/or d) they do not provide integrated switch functionality.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate an intelligent battery cell with integrated monitoring and switches are described.

According to an embodiment, a device can comprise active battery cell material. The device can further comprise an internal circuit coupled to the active battery cell material and comprising: one or more switches coupled to battery cell poles of the device; and a processor that operates the one or more switches to provide a defined value of electric potential at the battery cell poles.

DESCRIPTION OF THE DRAWINGS

FIGS. 11A and 11B illustrate example, non-limiting existing devices (e.g., prior art devices). FIG. 11C illustrates an example, non-limiting device that can facilitate an intelligent battery cell with integrated monitoring and switches in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

Figure 1:
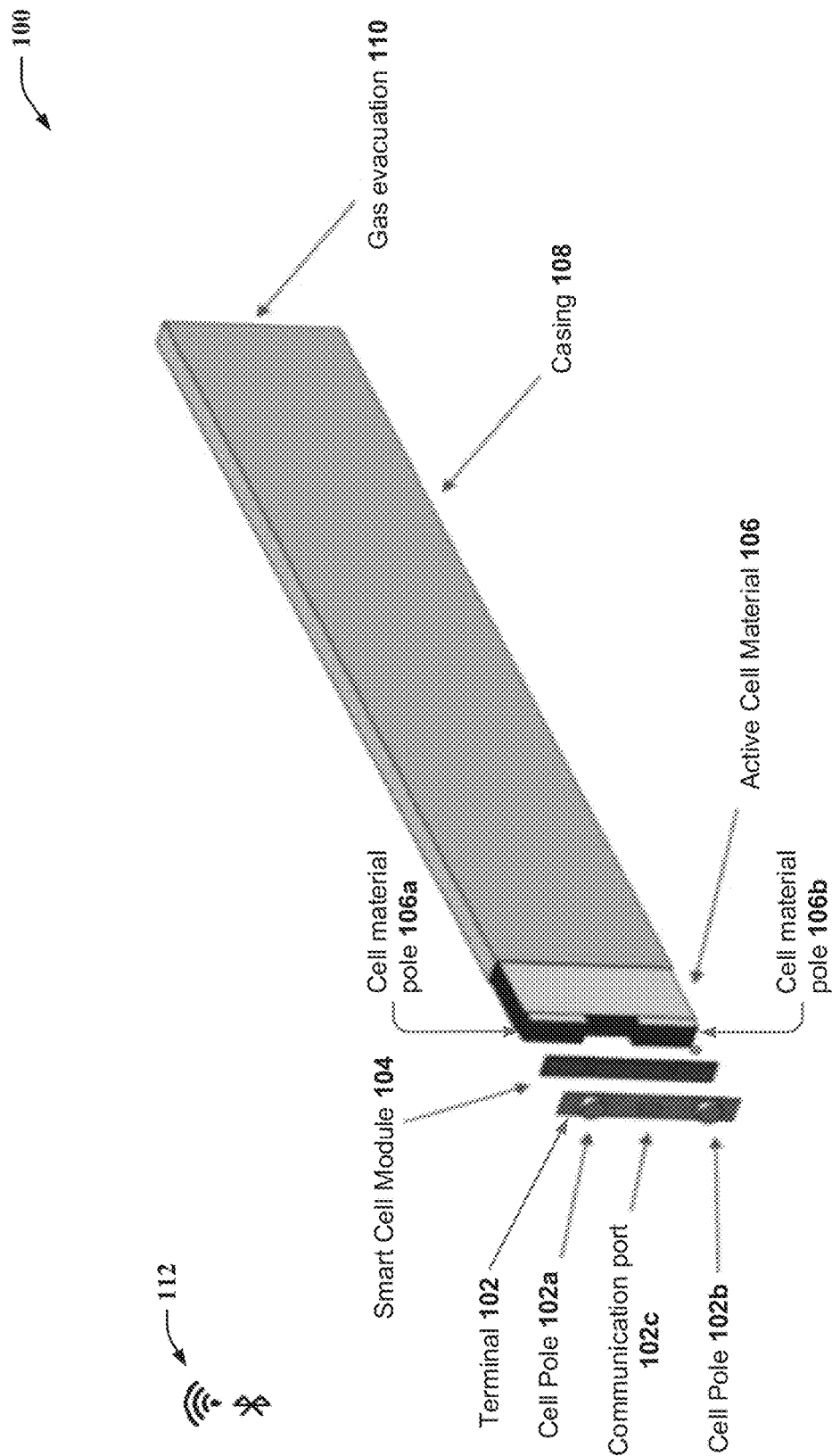
FIGS. 1 and 2 illustrate orthogonal views of example, non-limiting devices that can facilitate an intelligent battery cell with integrated monitoring and switches in accordance with one or more embodiments described herein.

FIG. 1 illustrates an orthogonal view of an example, non-limiting device 100 that can facilitate an intelligent battery cell with integrated monitoring and switches in accordance with one or more embodiments described herein. Device 100 can comprise a battery device and/or a battery cell device that can be implemented in a variety of different electronic systems. In an embodiment, device 100 can be implemented as a single battery device and/or a single battery cell device. In another embodiment, device 100 can be implemented as a single battery device and/or a single battery cell device in a battery pack (also referred to as a battery array, battery bank, power bank, etc.). In another embodiment, device 100 can be implemented as a single battery device and/or a single battery cell device in a battery pack used in an electric driveline of an electric vehicle (EV).

As illustrated in the example embodiment depicted in FIG. 1, device 100 can comprise a terminal 102 having cell poles 102a, 102b and/or a communication port 102c. In this embodiment, device 100 can further comprise a smart cell module 104 that can be coupled to terminal 102 and/or cell poles 102a, 102b and further coupled to an active cell material 106 and/or cell material poles 106a, 106b of active cell material 106. In this embodiment, device 100 can further comprise a casing 108 that can encapsulate one or more components of device 100. For example, casing 108 can encapsulate active cell material 106, cell material poles 106a, 106b, and/or smart cell module 104. In some embodiments, casing 108 can also encapsulate (e.g., partially or fully) terminal 102 and/or cell poles 102a, 102b. In the example embodiment illustrated in FIG. 1, device 100 can further comprise a gas evacuation 110 that can be formed on a side of device 100 and/or casing 108.

Terminal 102 can comprise a battery terminal. Cell poles 102a, 102b can comprise battery cell poles (e.g., a positive battery terminal and a negative battery terminal). Terminal 102 and/or cell poles 102a, 102b can comprise an electrically conducting material that can facilitate the transfer of electric current and/or voltage to and/or from smart cell module 104 and/or active cell material 106 (e.g., via cell material poles 106a, 106b).

Communication port 102c can comprise a communication port that can enable a wired connection of device 100 (e.g., a wired connection of smart cell module 104) to another device (e.g., a computer, a controller (e.g., microcontroller), a transceiver, a processor, a memory, etc.). Although the example embodiment illustrated in FIG. 1 comprises communication port 102c that can facilitate a wired connection to device 100 (e.g., to smart cell module 104), it should be appreciated that the subject disclosure is not so limiting. For example, in some embodiments, as described below, device 100 and/or one or more components thereof (e.g., smart cell module 104) can comprise a transmitter, a receiver, and/or a transceiver that can facilitate wireless communication over a network (e.g., the Internet, etc.) between device 100 (e.g., smart cell module 104) and another device (e.g., a computing and/or communication device of an electric vehicle comprising device 100, a computing resource in a cloud computing environment (e.g., a virtual machine, a virtual computer, a server, a memory, etc.), and/or another device).

Smart cell module 104 can comprise an intelligent (e.g., "smart") separator (e.g., interface) between cell poles 102a, 102b (e.g., external cell poles) of terminal 102 and cell material poles 106a, 106b (e.g., internal cell poles) of active cell material 106. Smart cell module 104 can comprise an internal circuit of device 100. Smart cell module 104 can comprise an integrated circuit (IC) that can be formed on a substrate (e.g., a silicon (Si) substrate, etc.) using one or more fabrication techniques and/or materials described below.

Fabrication of device 100 and/or small cell module 104 can comprise multi-step sequences of, for example, photolithographic and/or chemical processing steps that facilitate gradual creation of electronic-based systems, devices, components, and/or circuits in a semiconducting and/or a superconducting device (e.g., an IC). For instance, small cell module 104 can be fabricated on a substrate (e.g., a silicon (Si) substrate, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

Device 100 and/or small cell module 104 can be fabricated using various materials. For example, device 100 and/or small cell module 104 can be fabricated using materials of one or more different material classes including, but not limited to: conductive materials, semiconducting materials, superconducting materials, dielectric materials, polymer materials, organic materials, inorganic materials, nonconductive materials, and/or another material that can be utilized with one or more of the techniques described above for fabricating an integrated circuit.

Although the example embodiment illustrated in FIG. 1 depicts smart cell module 104 positioned vertically in device 100 between terminal 102 and active cell material 106, it should be appreciated that the subject disclosure is not so limiting. For example, in another embodiment, smart cell module 104 can be positioned (e.g., vertically, horizontally, etc.) in and/or on, for instance, casing 108, active cell material 106, a battery pack comprising device 100, and/or at another location in and/or on device 100 and/or such a battery pack comprising device 100.

Smart cell module 104 can be implemented in device 100 to form an intelligent battery cell that can comprise one or more integrated monitoring components and/or switches that can facilitate different parameter monitoring and/or collection operations and/or different operating modes of device 100 in accordance with one or more embodiments of the subject disclosure described herein. For example, smart cell module 104 can comprise one or more sensors (not illustrated in FIG. 1) that can monitor and/or collect parameter data of device 100 and/or one or more components thereof. For instance, smart cell module 104 can comprise one or more sensors (e.g., one or more sensors 306 described below with reference to FIG. 3) that can monitor and/or collect parameter data of device 100 and/or active cell material 106 including, but not limited to: temperature; pressure (e.g., swelling); chemistry (e.g., chemistry on electrolyte to monitor aging); acceleration (e.g., to sense a crash of, for instance, an electric vehicle comprising device 100); current (e.g., current flowing into and/or out of device 100 and/or active cell material 106); voltage (e.g., voltage potential across cell material poles 106a, 106b of active cell material 106); and/or other parameter data of device 100 and/or active cell material 106. In these examples, smart cell module 104 can further comprise one or more switches (e.g., one or more switches 308 described below with reference to FIG. 3) that can comprise, for instance, metal-oxide-semiconductor field-effect transistor (MOSFET) switches that can facilitate different operating modes of device 100 (e.g., off, positive, negative, bypass, etc.) in accordance with one or more embodiments of the subject disclosure described herein.

To facilitate such parameter monitoring and/or different operating modes of device 100 described above, smart cell module 104 can comprise a processor (not illustrated in FIG. 1), a memory (not illustrated in FIG. 1), one or more sensors, and/or one or more switches. For example, as described below with reference to FIG. 3, smart cell module 104 can comprise a processor 302 (e.g., a central processing unit (CPU), a microprocessor, etc.), a memory 304, one or more sensors 306 (e.g., temperature sensor, pressure sensor, etc.), and/or one or more switches 308 (e.g., MOSFET switches) that can enable the parameter monitoring and/or different operating modes of device 100 described above.

In some embodiments, device 100 and/or smart cell module 104 can comprise a switch controller (not illustrated in the figures) that can control (e.g., via processor 302) the operation of such one or more switches 308 (e.g., MOSFET switches) to facilitate such different operating modes of device 100 described above. In some embodiments, a battery pack (e.g., battery pack 908 described below with reference to FIG. 9) that can comprise multiple devices 100 and/or smart cell modules 104 can comprise such a switch controller described above. In these embodiments, such a switch controller in such a battery pack can control (e.g., via processor 302 and/or another processor) the operation of such one or more switches 308 (e.g., MOSFET switches) in each device 100 to facilitate such different operating modes of each device 100 described above.

Device 100 can comprise a modular component that can function and/or be controlled independent of all other battery devices and/or battery cell devices (e.g., other devices 100) that can be in a battery pack (e.g., battery pack 908 described below with reference to FIG. 9). Therefore, it should be appreciated that one or more devices 100 in such a battery pack can be removed and/or replaced without affecting the structure and/or functionality of the battery pack and/or any other devices 100 in the battery pack.

Active cell material 106 can comprise active battery cell material such as, for instance, a battery cell (also referred to as a "cell"). Active cell material 106 can comprise a single battery cell or, in some embodiments, multiple individual battery cells that can be positioned inside casing 108 according to a variety of patterns (e.g., vertically, horizontally, etc.). Active cell material 106 can comprise any type of battery cell material such as, for instance, a lithium battery cell material, a lithium ion (Li-Ion) battery cell material, a lithium metal battery cell material, a lithium sulphur (Li—S) battery cell material, a molten salt (Na—NiCl$_2$) battery cell material, a nickel metal hydride (Ni-MH) battery cell material, a lead acid battery cell material, and/or another type of battery cell material.

Gas evacuation 110 can comprise a device and/or structure that can facilitate the release of gas from casing 108 that can be generated by active cell material 106 (e.g., during charging, discharging, etc.). For example, gas evacuation 110 can comprise a vent, a port, a hole, a plate, a flap, a valve (e.g., a pressure relief valve, a one-way valve, a check valve, etc.), and/or another device and/or structure that can facilitate the release of gas from casing 108.

Smart cell module 104 can comprise any type of component, machine, device, facility, apparatus, and/or instrument that can comprise a processor and/or can be capable of effective and/or operative communication with a wired and/or wireless network. All such embodiments are envisioned. For example, smart cell module 104 can comprise a computing device, a general-purpose computer, a special-purpose computer, a quantum computing device (e.g., a quantum computer), an integrated circuit, a system on a chip (SOC), and/or another type of device.

Smart cell module 104 can be coupled (e.g., communicatively, electrically, operatively, optically, etc.) to one or more external systems, sources, and/or devices (e.g., classical and/or quantum computing devices, communication devices, etc.). For example, smart cell module 104 can be coupled via communication port 102c to one or more external systems, sources, and/or devices using a data cable (e.g., High-Definition Multimedia Interface (HDMI), recommended standard (RS) 232, Ethernet cable, etc.) and/or one or more wired networks described below.

In some embodiments, smart cell module 104 can be coupled (e.g., communicatively, electrically, operatively, optically, etc.) to one or more external systems, sources, and/or devices (e.g., classical and/or quantum computing devices, communication devices, etc.) via a network 112. Network 112 can comprise one or more wired and/or wireless networks, including, but not limited to, a cellular network, a wide area network (WAN) (e.g., the Internet), and/or a local area network (LAN). For example, smart cell module 104 can communicate with one or more external systems, sources, and/or devices, for instance, computing devices using network 112, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2(3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, smart cell module 104 can thus include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between smart cell module 104 and external systems, sources, and/or devices (e.g., computing devices, communication devices, etc.).

Figure 2:
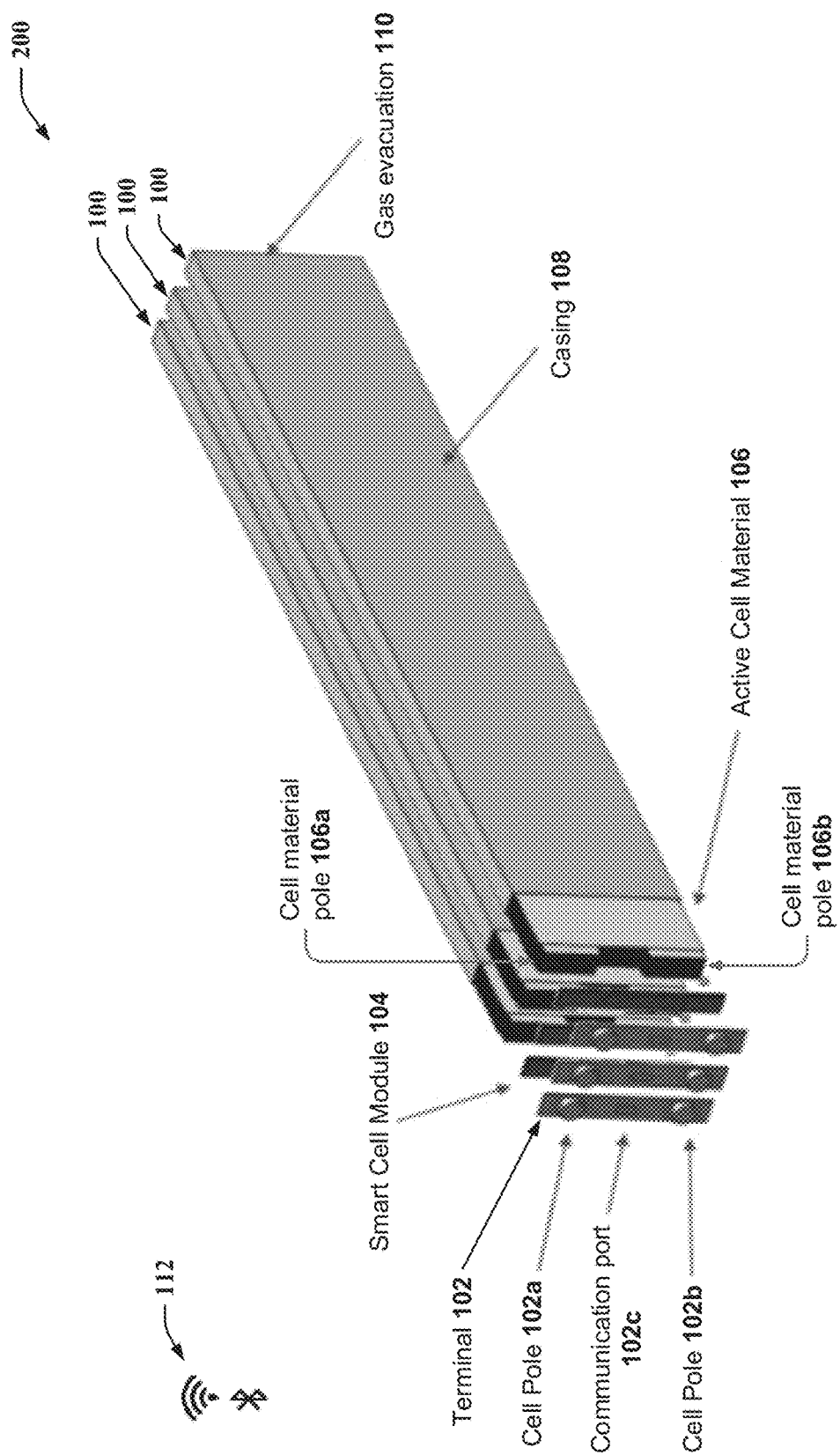

FIG. 2 illustrates an orthogonal view of an example, non-limiting device 200 that can facilitate an intelligent battery cell with integrated monitoring and switches in accordance with one or more embodiments described herein. Repetitive description of like elements and/or processes employed in respective embodiments is omitted for sake of brevity.

Device 200 illustrated in FIG. 2 can comprise an example, non-limiting alternative embodiment of device 100 described above with reference to FIG. 1. For example, device 200 can comprise a battery pack having one or more devices 100 (e.g., 3 as depicted in FIG. 2). In another example, device 200 can comprise a battery pack having one or more devices 100 (e.g., 3), where such a battery pack can be implemented in an electronic system such as, for instance, an electric driveline of an electric vehicle (EV).

Figure 3:
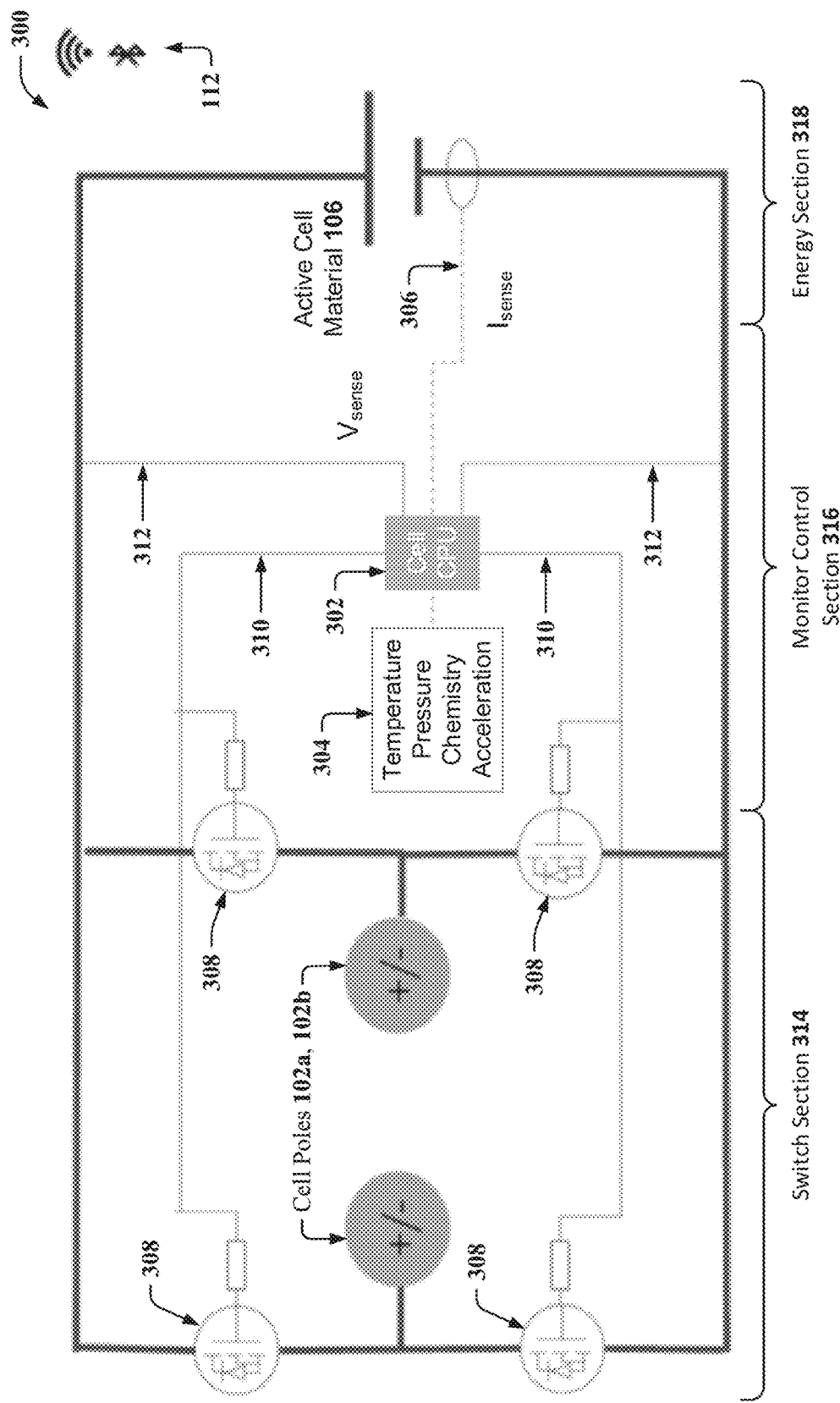
FIG. 3 illustrates an example, non-limiting circuit that can facilitate an intelligent battery cell with integrated monitoring and switches in accordance with one or more embodiments described herein.

FIG. 3 illustrates an example, non-limiting circuit 300 that can facilitate an intelligent battery cell with integrated monitoring and switches in accordance with one or more embodiments described herein. Repetitive description of like elements and/or processes employed in respective embodiments is omitted for sake of brevity.

Circuit 300 can comprise an electrical circuit representation of device 100. To facilitate such parameter monitoring and/or different operating modes of device 100 described above with reference to FIG. 1, smart cell module 104 can comprise a processor 302 (denoted as "Cell CPU" in FIG. 3), a memory 304, one or more sensors 306, and/or one or more switches 308 as illustrated in the example embodiment depicted in FIG. 3. In some embodiments, processor 302 can comprise a central processing unit (CPU) that can comprise memory 304.

As illustrated by circuit 300 in the example embodiment depicted in FIG. 3, smart cell module 104 can comprise multiple sections including, but not limited to, a switch section 314, a monitor and/or control section 316, an energy section 318, and/or another section. Switch section 314 can comprise an H-bridge electronic circuit having multiple switches 308 (e.g., 4 switches 308 comprising 4 MOSFET switches). Monitor and/or control section 316 can comprise processor 302, memory 304, and/or one or more sensors 306. To facilitate various monitoring and/or control functions of smart cell module 104 and/or device 100, smart cell module 104, processor 302, memory 304, one or more sensors 306, and/or one or more switches 308 can use (e.g., draw) electric energy (e.g., electric power, electric current, electric voltage) from active cell material 106. For example, as illustrated in the example embodiment depicted in FIG. 3, processor 302 and/or memory 304 can be coupled to active cell material 106 via wire traces 312 (e.g., integrated metal wires, striplines, microstrips, etc.), which can enable smart cell module 104, processor 302, memory 304, one or more sensors 306, and/or one or more switches 308 to draw electric energy (e.g., electric power, electric current, electric voltage) from active cell material 106. Energy section 318 can comprise active cell material 106 and cell material poles 106a, 106b, which can enable the transfer of electric energy (e.g., electric current, electric voltage, etc.) into and out of active cell material 106, smart cell module 104, and/or device 100.

As smart cell module 104 and/or one or more components thereof (e.g., processor 302, memory 304, one or more sensors 306, one or more switches 308, etc.) can draw electric energy (e.g., electric power) from active cell material 106, it should be appreciated that device 100 and/or smart cell module 104 can thereby eliminate galvanic contact of one or more components of device 100 with one or more devices that are external to device 100 (e.g., another battery device and/or battery cell device in a battery pack comprising device 100). By eliminating such galvanic contact, device 100 and/or smart cell module 104 can thereby provide enhanced safety when compared to existing battery device and/or battery cell device technologies (e.g., when compared to prior art battery device and/or battery cell device technologies). Additionally, or alternatively, by eliminating such galvanic contact, device 100 and/or smart cell module 104 can thereby eliminate hardware such as, for instance, cables, which are used in existing battery pack and/or battery management system (BMS) technologies (e.g., BMS wires coupled to one or more battery devices and/or battery cell devices in a battery pack).

Processor 302 can comprise one or more types of processors and/or electronic circuitry (e.g., a classical processor, a quantum processor, etc.) that can implement one or more computer and/or machine readable, writable, and/or executable components and/or instructions that can be stored on memory 304. For example, processor 302 can perform various operations that can be specified by such computer and/or machine readable, writable, and/or executable components and/or instructions including, but not limited to, logic, control, input/output (I/O), arithmetic, and/or the like. Processor 302 can comprise one or more central processing unit (CPU), multi-core processor, microprocessor, dual microprocessors, microcontroller, System on a Chip (SOC), array processor, vector processor, quantum processor, and/or another type of processor. Such examples of processor 302 can be employed to implement any embodiments of the subject disclosure.

In the example embodiment illustrated in FIG. 3, processor 302 can comprise a central processing unit (CPU) such as, for example, a microprocessor. In some embodiments, processor 302 can comprise and/or employ one or more machine learning (ML) and/or artificial intelligence (AI) models to learn, for instance, one or more operating conditions and/or cause and effect conditions corresponding to device 100 and/or an external device coupled to device 100. In these embodiments, based on learning such one or more operating conditions and/or cause and effect conditions, processor 302 can further employ the one or more ML and/or AI models to perform one or more tasks including, but not limited to, making a prediction, making an estimation (e.g., cell capacity (e.g., electric energy) of active cell material 106), classifying data, implementing one or more monitoring and/or control operations of device 100 and/or smart cell module 104, and/or another task.

Memory 304 can store one or more computer and/or machine readable, writable, and/or executable components and/or instructions that, when executed by processor 302 (e.g., a classical processor, a quantum processor, etc.), can facilitate performance of operations defined by the executable component(s) and/or instruction(s). For example, memory 304 can store computer and/or machine readable, writable, and/or executable components and/or instructions that, when executed by processor 302, can facilitate execution of the various functions described herein relating to device 100 and/or smart cell module 104 as described herein with or without reference to the various figures of the subject disclosure. For instance, memory 304 can store computer and/or machine readable, writable, and/or executable components and/or instructions that, when executed by processor 302, can facilitate one or more of such parameter monitoring tasks described above with reference to FIG. 1 and/or to facilitate logging of monitoring data collected by one or more sensors 306. In another example, memory 304 can store computer and/or machine readable, writable, and/ or executable components and/or instructions that, when executed by processor 302, can facilitate operation of one or more switches 308 to configure device 100 to operate in one or more operation modes 400 described below with reference to FIG. 4.

In an embodiment, memory 304 can store computer and/or machine readable, writable, and/or executable components and/or instructions such as, for instance, a monitoring component that, when executed by processor 302, can employ one or more sensors 306 of smart cell module 104 in device 100 to collect parameter data corresponding to device 100 and/or one or more components thereof. In this embodiment, such a monitoring component can further store and/or log (e.g., via processor 302) the parameter data in memory 304.

In another embodiment, memory 304 can store computer and/or machine readable, writable, and/or executable components and/or instructions such as, for instance, a machine learning component that, when executed by processor 302, can facilitate operation of one or more switches 308 (e.g., based on parameter data collected from device 100) to configure device 100 to operate in one or more operation modes 400 described below with reference to FIG. 4. In this embodiment, such a machine learning component can learn to identify certain parameter data collected from device 100 that can be indicative of certain events and/or conditions associated with device 100, a battery pack comprising device 100, and/or an electronic system (e.g., an electric driveline of an EV) comprising device 100. For example, the machine learning component can learn (e.g., by being trained using one or more supervised leaning techniques, unsupervised learning techniques, etc.) to identify certain parameter data that can be indicative of, for instance: a high or low state of charge (SoC) in device 100; a crash of a vehicle (e.g., an EV) comprising device 100; a high or low temperature of one or more components of device 100; a high or low pressure in device 100, and/or another event and/or condition. In this example, based on identifying such parameter data that can be indicative of one or more such events and/or conditions defined above, the machine learning component can then configure device 100 (e.g., via processor 302, one or more switches 308, etc.) in a certain operation mode as described above (e.g., in an off mode and/or a bypass mode based on detecting a crash of a vehicle comprising device 100). In some embodiments, such a machine learning component described above can comprise a machine learning model based on artificial intelligence (AI) including, but not limited to, a shallow or deep neural network model, a support vector machine (SVM) model, a classifier, a decision tree classifier, a regression model, and/or any supervised or unsupervised machine learning model that can perform the operations of the machine learning component described above.

Memory 304 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Such examples of memory 304 can be employed to implement any embodiments of the subject disclosure.

One or more sensors 306 can comprise, for instance, a temperature sensor, a pressure sensor, a chemical sensor, an accelerometer, and/or another sensor that can measure one or more parameters of device 100 and/or active cell material 106. As illustrated in the example embodiment depicted in FIG. 3, sensors 306 can provide sensing data to processor 302 in the form of electric current (e.g., denoted as $I_{sense}$ in FIG. 3) and/or electric voltage (e.g., denoted as $V_{sense}$ in FIG. 3). Processor 302 can facilitate the recording of such sensing data in, for instance, a text file and/or a log that can be stored on memory 304. In some embodiments, smart cell module 104 can share such sensing data with a device that can be external to device 100 (e.g., a computing resource in a cloud computing environment). Based on such sensing data, processor 302 can operate (e.g., open or close) one or more switches 308 to implement one or more operation modes of device 100.

One or more switches 308 can comprise MOSFET switches. One or more switches 308 can be configured in smart cell module 104 such that actuation of such one or more switches 308 (e.g., via processor 302) can implement one or more operation modes of device 100.

Smart cell module 104, processor 302, memory 304, one or more sensors 306, and/or one or more switches 308 can be coupled to one another via a bus 310 to perform functions of device 100, smart cell module 104, and/or any components coupled therewith. Bus 310 can comprise one or more memory bus, memory controller, peripheral bus, external bus, local bus, a quantum bus, and/or another type of bus that can employ various bus architectures. Such examples of bus 310 can be employed to implement any embodiments of the subject disclosure.

Figure 4:
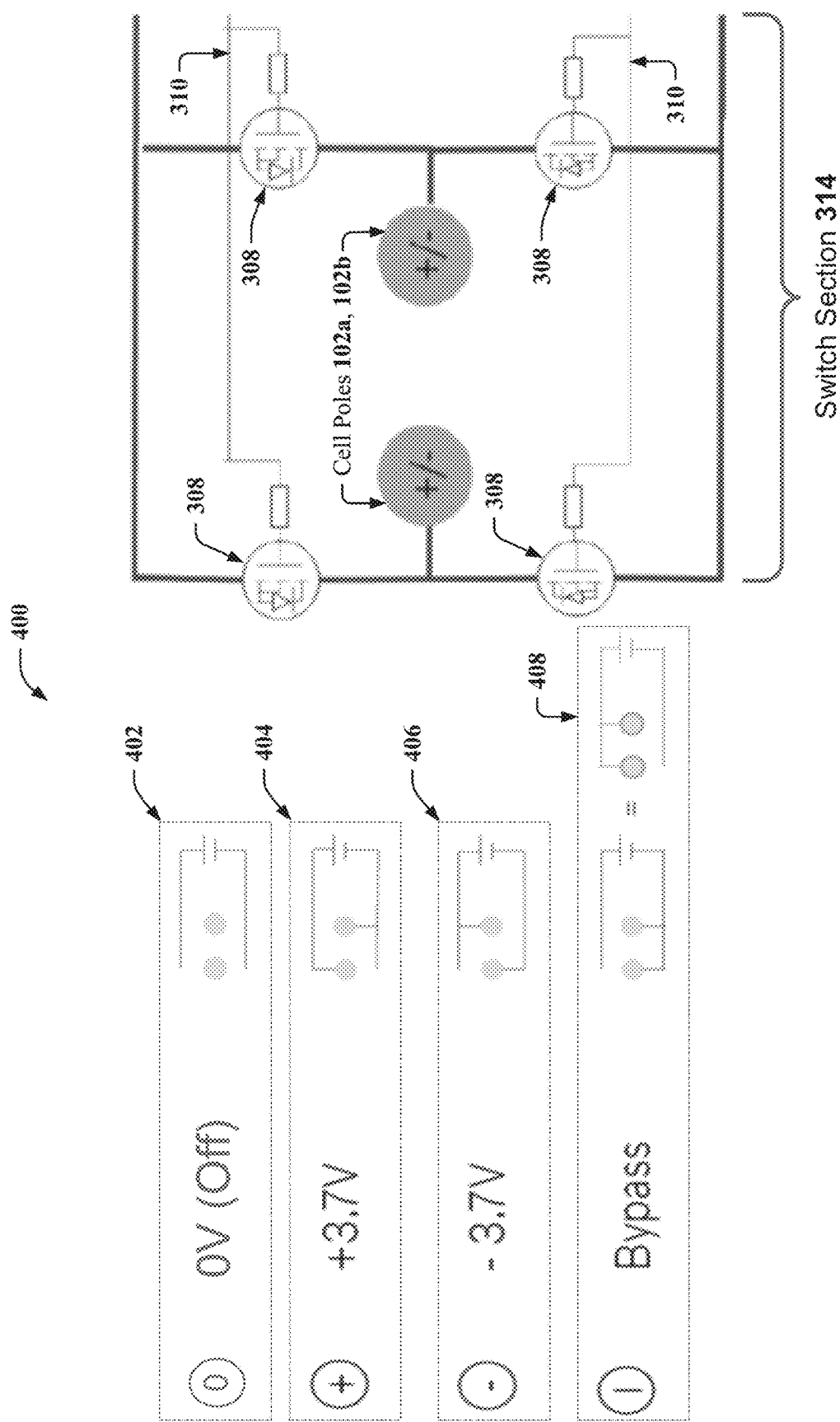
FIG. 4 illustrates example, non-limiting operation modes that can facilitate an intelligent battery cell with integrated monitoring and switches in accordance with one or more embodiments described herein.

FIG. 4 illustrates example, non-limiting operation modes 400 that can facilitate an intelligent battery cell with integrated monitoring and switches in accordance with one or more embodiments described herein. Repetitive description of like elements and/or processes employed in respective embodiments is omitted for sake of brevity.

Device 100 can operate in one or more operation modes 400. Operation modes 400 can comprise an off mode 402 (denoted as "0V (Off)" in FIG. 4), a positive mode 404

(denoted as "+3.7V" in FIG. 4), a negative mode 406 (denoted as "−3.7V" in FIG. 4, also referred to as a reverse mode), and/or a bypass mode 408 (denoted as "Bypass" in FIG. 4). In some embodiments, implementation of one or more operation modes 400 defined above can enable device 100 to control (e.g., via smart cell module 104) its contribution (e.g., electric voltage contribution) to a battery pack comprising device 100. To implement such one or more operation modes 400 defined above, processor 302 of smart cell module 104 can operate (e.g., open, close, turn on, turn off, engage, disengage, etc.) one or more switches 308 to control cell poles 102a, 102b (e.g., to control the electric energy (e.g., electric current, electric voltage, etc.) present at and/or across cell poles 102a, 102b).

Bypass mode 408 can comprise a default mode of device 100 and thus, device 100 and/or smart cell module 104 can be in a passive state until "armed" (e.g., until set into off mode 402, positive mode 404, or negative mode 406). In bypass mode 408, there is no voltage on cell poles 102a, 102b.

It should be appreciated that device 100 can be configured (e.g., set) to operate in bypass mode 408 to mitigate risk of injury and/or damage to a person and/or property. For example, during installation of device 100 in an electronic system, device 100 can be configured (e.g., by operating one or more switches 308 via processor 302) to operate in bypass mode 408 to mitigate risk of injury and/or damage to a person (e.g., a technician performing the installation) and/or property (e.g., automated equipment performing the installation and/or property within a certain proximity of the electronic system). In another example, during installation of a battery pack comprising one or more devices 100 in an electronic system (e.g., an electric driveline of an EV), each device 100 in the battery pack can be individually configured (e.g., by operating one or more switches 308 via processor 302) to operate in bypass mode 408 to mitigate risk of injury and/or damage to a person (e.g., a technician performing the installation) and/or property (e.g., automated equipment performing the installation and/or property within a certain proximity of the electronic system).

It should also be appreciated that in operation, each device 100 in a battery pack can be individually configured to operate in off mode 402, positive mode 404, negative mode 406, or bypass mode 408 to facilitate a desired yield of electric energy (e.g., electric current, electric voltage, etc.) from each device 100 and/or from the battery pack. For example, one or more devices 100 in a battery pack can be individually configured (e.g., by operating one or more switches 308 via processor 302) to operate in bypass mode 408 to facilitate a desired yield of electric energy (e.g., electric current, electric voltage, etc.) from one or more other battery devices and/or battery cell devices in the battery pack. In some embodiments, such one or more other battery devices and/or battery cell devices can also comprise one or more devices 100 that can be individually configured (e.g., by operating one or more switches 308 via processor 302) to operate in one of the operation modes 400 defined above (e.g., off mode 402, positive mode 404, negative mode 406, and/or bypass mode 408).

Figure 5:
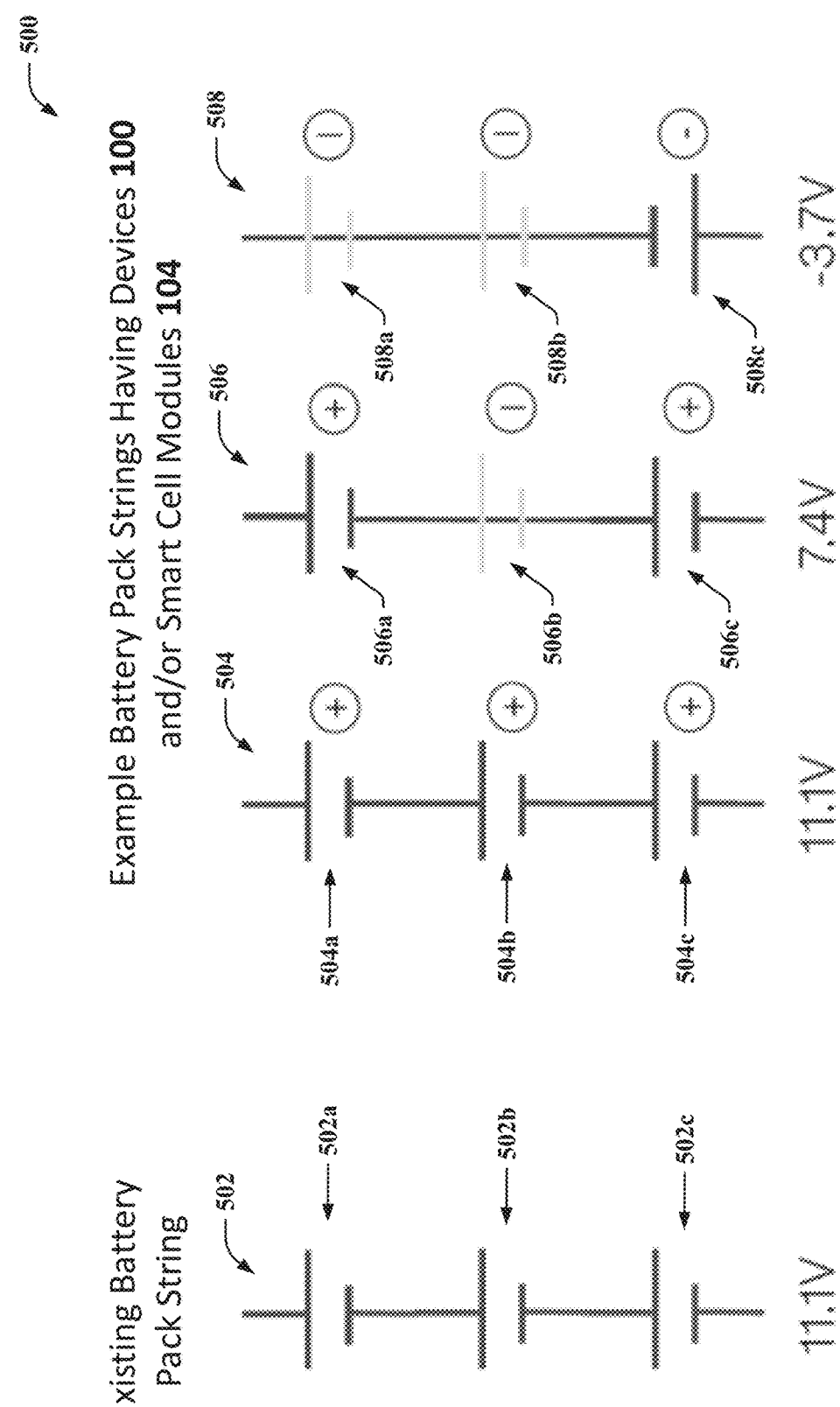
FIG. 5 illustrates example, non-limiting electrical diagrams that can facilitate an intelligent battery cell with integrated monitoring and switches in accordance with one or more embodiments described herein.

FIG. 5 illustrates example, non-limiting electrical diagrams 500 that can facilitate an intelligent battery cell with integrated monitoring and switches in accordance with one or more embodiments described herein. Repetitive description of like elements and/or processes employed in respective embodiments is omitted for sake of brevity.

String 502 is an electrical diagram representing an existing battery pack string (e.g., a battery pack string currently used in prior art technologies) that couples multiple battery devices and/or battery cell devices 502a, 502b, 502c in series to yield 11.1V of electric voltage. Battery devices and/or battery cell devices 502a, 502b, 502c comprise battery devices and/or battery cell devices that do not comprise device 100 and/or smart cell module 104.

String 504 is an electrical diagram representing an example, non-limiting battery pack string that can comprise multiple battery devices and/or battery cell devices 504a, 504b, 504c that can be coupled in series to yield, for example, 11.1V of electric voltage. Battery devices and/or battery cell devices 504a, 504b, 504c can each comprise the same structure and/or functionality as that of device 100 and/or smart cell module 104. As illustrated in FIG. 5, to yield 11.1V of electric voltage, for example, battery devices and/or battery cell devices 504a, 504b, 504c of string 504 can all be configured (e.g., as described above with reference to FIG. 4) to operate in positive mode 404.

String 506 is an electrical diagram representing an example, non-limiting battery pack string that can comprise multiple battery devices and/or battery cell devices 506a, 506b, 506c that can be coupled in series to yield, for example, 7.4V of electric voltage. Battery devices and/or battery cell devices 506a, 506b, 506c can each comprise the same structure and/or functionality as that of device 100 and/or smart cell module 104. As illustrated in FIG. 5, to yield 7.4V of electric voltage, for example, battery device and/or battery cell device 506b of string 506 can be configured (e.g., as described above with reference to FIG. 4) to operate in bypass mode 408 while battery devices and/or battery cell devices 506a and 506c can be configured to operate in positive mode 404.

String 508 is an electrical diagram representing an example, non-limiting battery pack string that can comprise multiple battery devices and/or battery cell devices 508a, 508b, 508c that can be coupled in series to yield, for example, −3.7V of electric voltage. Battery devices and/or battery cell devices 508a, 508b, 508c can each comprise the same structure and/or functionality as that of device 100 and/or smart cell module 104. As illustrated in FIG. 5, to yield −3.7V of electric voltage, for example, battery devices and/or battery cell devices 508a and 508b of string 508 can be configured (e.g., as described above with reference to FIG. 4) to operate in bypass mode 408 while battery device and/or battery cell device 508c can be configured to operate in negative mode 406.

Figure 6:
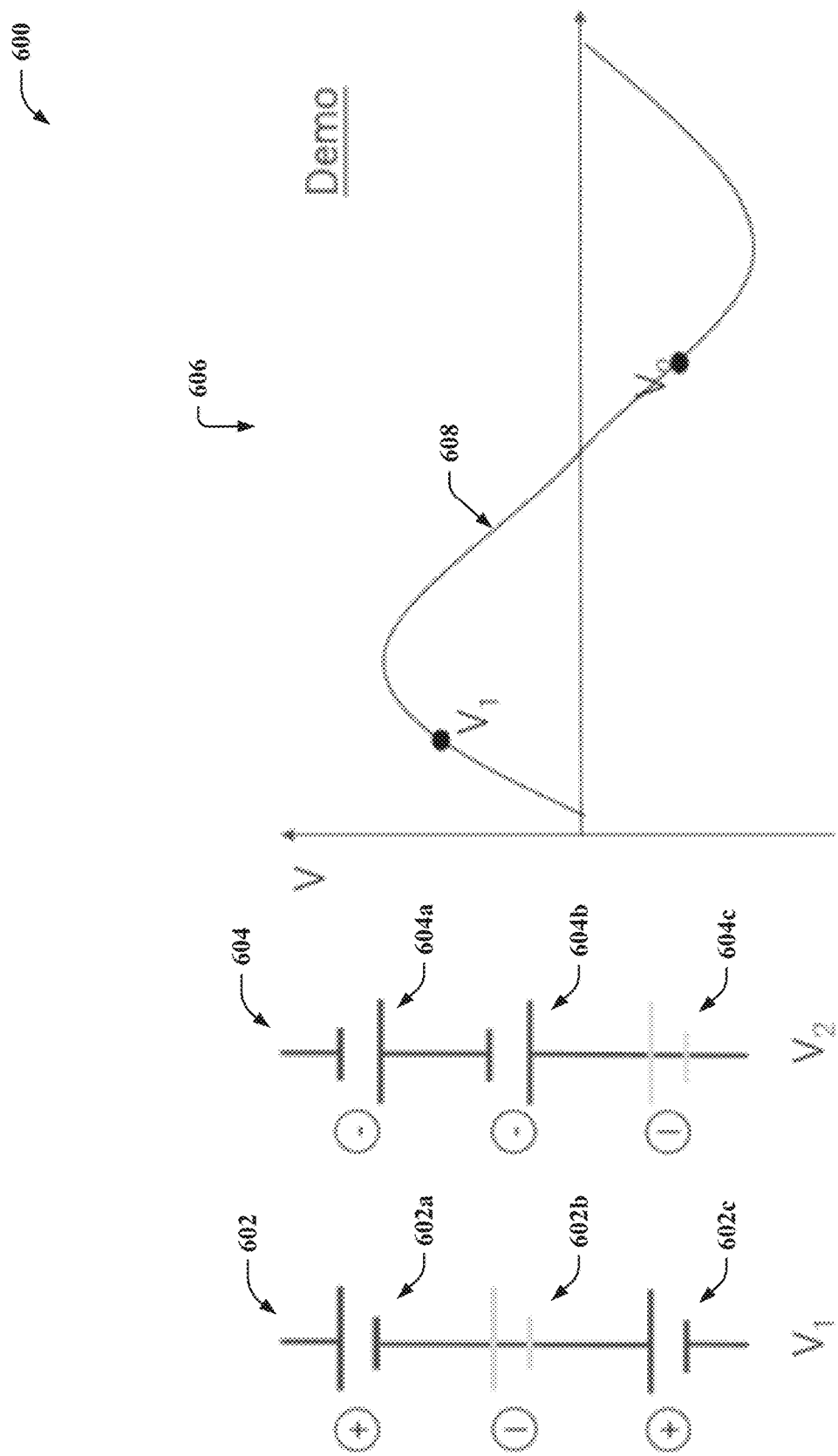
FIG. 6 illustrates an example, non-limiting diagram that can facilitate an intelligent battery cell with integrated monitoring and switches in accordance with one or more embodiments described herein.

FIG. 6 illustrates an example, non-limiting diagram 600 that can facilitate an intelligent battery cell with integrated monitoring and switches in accordance with one or more embodiments described herein. Repetitive description of like elements and/or processes employed in respective embodiments is omitted for sake of brevity.

Diagram 600 can comprise strings 602, 604. Diagram 600 can further comprise a plot 606 depicting a voltage curve 608 corresponding to strings 602, 604.

String 602 is an electrical diagram representing an example, non-limiting battery pack string that can comprise multiple battery devices and/or battery cell devices 602a, 602b, 602c that can be coupled in series to yield, for example, 7.4V of electric voltage (denoted as $V_1$ in FIG. 6). Battery devices and/or battery cell devices 602a, 602b, 602c can each comprise the same structure and/or functionality as that of device 100 and/or smart cell module 104. As illustrated in FIG. 6, to yield 7.4V of electric voltage ($V_1$) for example, battery device and/or battery cell device 602b of string 602 can be configured (e.g., as described above with reference to FIG. 4) to operate in bypass mode 408 while battery devices and/or battery cell devices 602a and 602c can be configured to operate in positive mode 404.

String 604 is an electrical diagram representing an example, non-limiting battery pack string that can comprise multiple battery devices and/or battery cell devices 604a, 604b, 604c that can be coupled in series to yield, for example, −7.4V of electric voltage (denoted as $V_2$ in FIG. 6). Battery devices and/or battery cell devices 604a, 604b, 604c can each comprise the same structure and/or functionality as that of device 100 and/or smart cell module 104. As illustrated in FIG. 6, to yield −7.4V of electric voltage ($V_2$), for example, battery devices and/or battery cell devices 604a and 604b of string 604 can be configured (e.g., as described above with reference to FIG. 4) to operate in negative mode 406 while battery device and/or battery cell device 604c can be configured to operate in bypass mode 408.

Voltage curve 608 depicted in plot 606 can be generated based on $V_1$ (7.4V) and $V_2$ (−7.4V), where $V_1$ and $V_2$ can be yielded by strings 602, 604, respectively, as described above. The curve shape of voltage curve 608 can be divided into multiple steps (e.g., steps 706 described below with reference to FIG. 7). For instance, the curve shape of voltage curve 608 can be divided into 2*96 steps (192 steps), which can reduce noise, vibration, and harshness (NVH) and electromotive force (EMF). In some embodiments, the main voltage (e.g., main voltage of a battery pack comprising one or more devices 100) can be $(3)^{1/2}*370V=640V$, which is approximately the same as an 800V battery. For example, the main voltage output of a battery pack comprising one or more devices 100 and/or strings 602, 604 can be 640V, which can constitute maximum alternating current (AC) root mean square (RMS) values that can be produced by strings 602, 604 with 400V DC supplied by each string. In this example, if compared to a conventional setup with a 3-phase/6 pulse (3ph/6 pulse) pulse width modulated (PWM) inverter in an 800V DC battery application, the AC RMS value will be the same, that is, for instance, it will be 640V.

Figure 7:
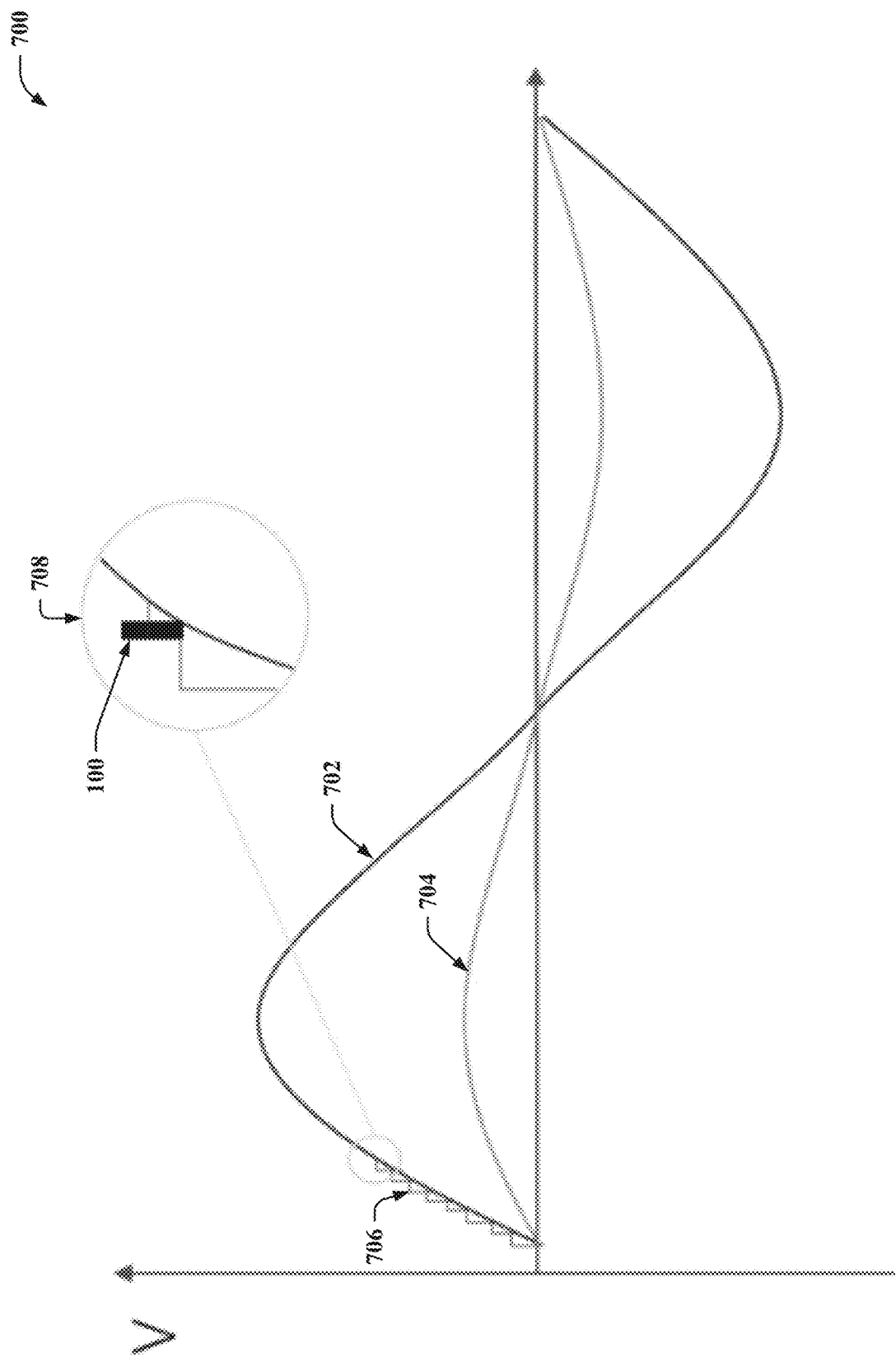
FIG. 7 illustrates an example, non-limiting plot that can facilitate an intelligent battery cell with integrated monitoring and switches in accordance with one or more embodiments described herein.

FIG. 7 illustrates an example, non-limiting plot 700 that can facilitate an intelligent battery cell with integrated monitoring and switches in accordance with one or more embodiments described herein. Repetitive description of like elements and/or processes employed in respective embodiments is omitted for sake of brevity.

Plot 700 can comprise voltage curves 702, 704 that can each represent electric voltage of a battery pack string comprising one or more devices 100 and/or smart cell modules 104. Voltage curves 702, 704 can each be generated using multiple steps 706 (e.g., as depicted on voltage curve 702 in FIG. 7). Each of steps 706 can represent the electric voltage (e.g., positive or negative) that can be yielded by a single device 100 in a battery pack string, for example, as illustrated by the visual representation of such a single device 100 in inset 708 depicted in FIG. 7. Voltage curve 704 can comprise a voltage curve that can be generated by applying pulse width modulation (PWM) to the last cell of a battery pack (e.g., to the last device 100 in a battery pack string). In some embodiments, applying PWM as described above can be useful when a voltage curve at low voltage is requested. In some embodiments, applying PWM as described above can also be useful in embodiments where a single smart cell module 104 is used to control multiple cells in a battery pack (e.g., multiple active cell material 106 in a battery pack).

Figure 8:
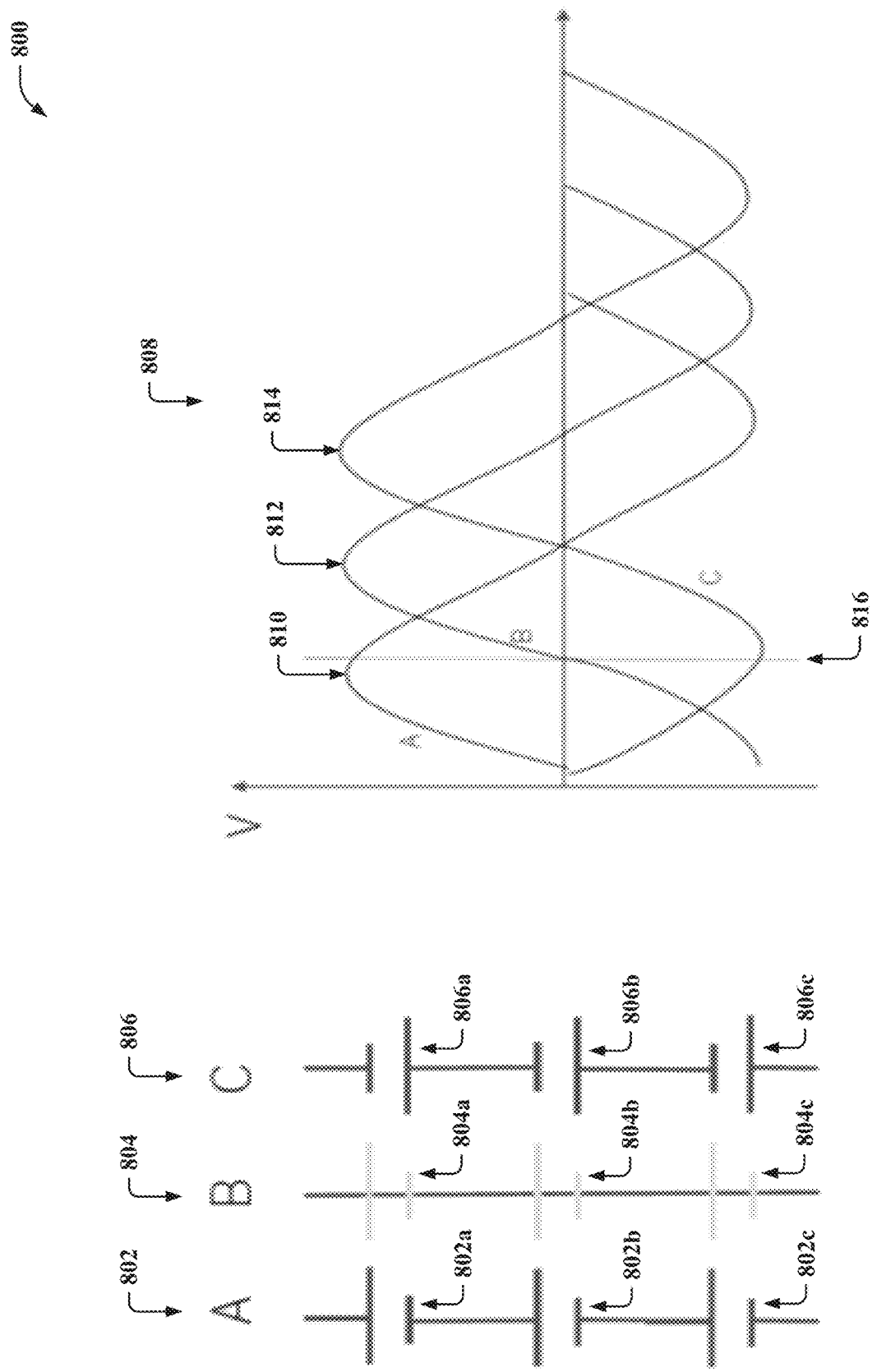
FIG. 8 illustrates an example, non-limiting diagram that can facilitate an intelligent battery cell with integrated monitoring and switches in accordance with one or more embodiments described herein.

FIG. 8 illustrates an example, non-limiting diagram 800 that can facilitate an intelligent battery cell with integrated monitoring and switches in accordance with one or more embodiments described herein. Repetitive description of like elements and/or processes employed in respective embodiments is omitted for sake of brevity.

Diagram 800 can comprise strings 802, 804, 806. Diagram 800 can further comprise a plot 808 depicting voltage curves 810, 812, 814 corresponding to strings 802, 804, 806, respectively.

String 802 is an electrical diagram representing an example, non-limiting battery pack string that can comprise multiple battery devices and/or battery cell devices 802a, 802b, 802c that can be coupled in series to yield, for example, 11.1V of electric voltage. Battery devices and/or battery cell devices 802a, 802b, 802c can each comprise the same structure and/or functionality as that of device 100 and/or smart cell module 104. As illustrated in FIG. 8, to yield 11.1V of electric voltage, for example, all battery devices and/or battery cell devices 802a, 802b, 802c of string 802 can be configured (e.g., as described above with reference to FIG. 4) to operate in positive mode 404.

String 804 is an electrical diagram representing an example, non-limiting battery pack string that can comprise multiple battery devices and/or battery cell devices 804a, 804b, 804c that can be coupled in series to yield, for example, 0.0V of electric voltage. Battery devices and/or battery cell devices 804a, 804b, 804c can each comprise the same structure and/or functionality as that of device 100 and/or smart cell module 104. As illustrated in FIG. 8, to yield 0.0V of electric voltage, for example, all battery devices and/or battery cell devices 804a, 804b, 804c of string 804 can be configured (e.g., as described above with reference to FIG. 4) to operate in bypass mode 408.

String 806 is an electrical diagram representing an example, non-limiting battery pack string that can comprise multiple battery devices and/or battery cell devices 806a, 806b, 806c that can be coupled in series to yield, for example, −11.1V of electric voltage. Battery devices and/or battery cell devices 806a, 806b, 806c can each comprise the same structure and/or functionality as that of device 100 and/or smart cell module 104. As illustrated in FIG. 8, to yield −11.1V of electric voltage, for example, all battery devices and/or battery cell devices 806a, 806b, 806c of string 806 can be configured (e.g., as described above with reference to FIG. 4) to operate in negative mode 406.

Voltage curves 810, 812, 814 can each comprise an example, non-limiting alternative embodiment of voltage curve 608, 702, and/or 704, where voltage curves 810, 812, 814 can be generated based on electric voltages that can be yielded by strings 802, 804, 806, respectively. For example, voltage curves 810, 812, 814 can be generated using steps 706 as described above with reference to FIG. 7, where each step 706 of each voltage curve 810, 812, 814 can represent an electric voltage yielded by a single device 100 in each of strings 802, 804, 806.

As illustrated by voltage curves 810, 812, 814 depicted in FIG. 8, strings 802, 804, 806 can yield respective electric voltages that, when combined as shown in plot 808, can provide a three phase (3-phase) current source (e.g., an AC source) that can be used to drive, for example, an electrical motor, an AC-charger, and/or another electronic device. For instance, strings 802, 804, 806 can yield respective electric voltages that, when combined as shown in plot 808, can function as a multilevel inverter having a cascading H-bridge design (e.g., an H-bridge design as described above with reference to FIG. 3 that can be implemented using one or more switches 308 of switch section 314). In some embodiments, to provide such a 3-phase current source described above, plot 808 and/or voltage curves 810, 812, 814 can be "frozen in time" at a time 816 depicted on plot 808 in FIG. 8. In these embodiments, at time 816, strings 802, 804, 806 can respectively yield, for example, 11.1V, 0.0V, −11.1V of electric voltage, which can produce the 3-phase current source described above. In some embodiments, switch losses associated with each of strings 802, 804, 806 (e.g., losses associated with one or more switches 308 described above with reference to FIG. 3) can be linear to the frequency of each voltage curve 810, 812, 814.

It should be appreciated that the implementation of strings 802, 804, 806 and/or voltage curves 810, 812, 814 in an electronic system to provide the 3-phase current source (e.g., an AC source) described above can eliminate the use of an inverter in such an electronic system. For example, it should be appreciated that the implementation of strings 802, 804, 806 in a DC battery pack of an electric driveline in an EV to provide the 3-phase current source (e.g., an AC source) described above can eliminate the use of an inverter in such an EV to change the DC provided by the battery pack to AC (e.g., to change the DC provided by strings 802, 804, 806 to AC).

Figure 9:
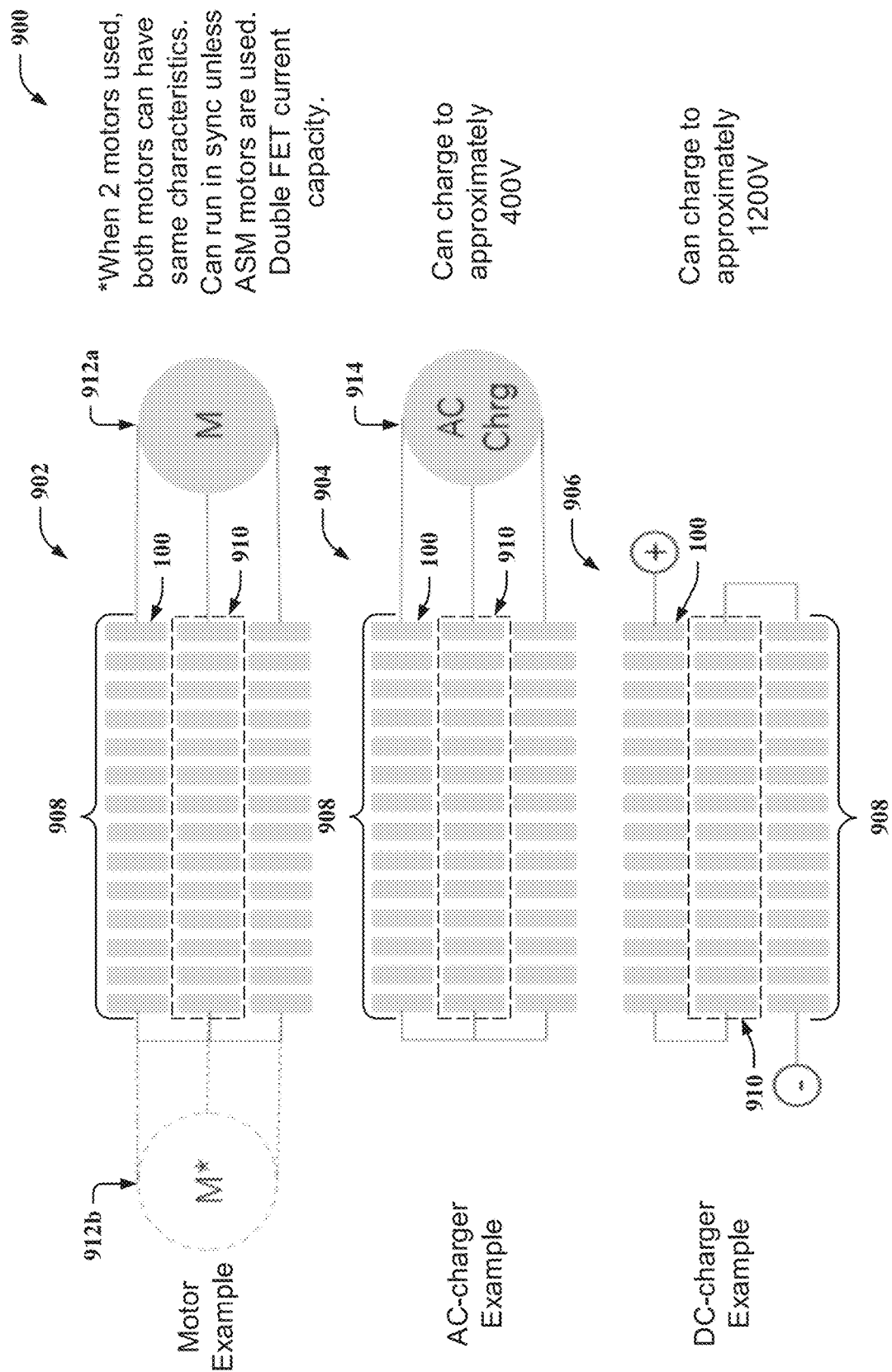
FIG. 9 illustrates example, non-limiting electronic systems that can facilitate an intelligent battery cell with integrated monitoring and switches in accordance with one or more embodiments described herein.

FIG. 9 illustrates example, non-limiting electronic systems 900 that can facilitate an intelligent battery cell with integrated monitoring and switches in accordance with one or more embodiments described herein. Repetitive description of like elements and/or processes employed in respective embodiments is omitted for sake of brevity.

Electronic systems 900 can comprise example, non-limiting electronic systems 902, 904, 906 illustrated in FIG. 9. Each of electronic systems 902, 904, 906 can comprise an example, non-limiting embodiment of the subject disclosure that can comprise one or more other embodiments of the subject disclosure described herein (e.g., device 100, device 200, etc.). In some embodiments, each of electronic systems 902, 904, 906 can comprise an electric driveline that can be implemented in an EV to, for example, provide electric power (e.g., AC or DC) directly (e.g., without the use of, for instance, an inverter) to one or more electronic components in the EV and/or to enable a battery pack of the electric driveline to be charged using an AC or DC charger.

Electronic system 902 can comprise a battery pack 908. Battery pack 908 can comprise the same structure and/or functionality as that of the battery pack described above with reference to FIGS. 1-8 (e.g., a battery pack comprising multiple devices 100 and/or devices 200). Battery pack 908 of electronic system 902 can comprise multiple devices 100 (e.g., 42 devices 100) that be coupled to one another in series to form multiple strings 910 (e.g., 3 strings 910). Strings 910 of electronic system 902 can be coupled to one another in parallel as illustrated in FIG. 9. For clarity, only one device 100 and only one string 910 are identified in electronic system 902 depicted in FIG. 9. Each device 100 of each string 910 in battery pack 908 of electronic system 902 can be individually configured to operate in a certain operation mode 400 (e.g., as described above with reference to FIG. 4) to yield a desired electric voltage (e.g., a certain positive or negative electric voltage value). For example, each device 100 of each string 910 in battery pack 908 of electronic system 902 can be individually configured to operate in off mode 402, positive mode 404, negative mode 406, or bypass mode 408 such that battery pack 908 can provide AC electric power to one or more motors 912a, 912b (respectively denoted as "M" and "M*" in FIG. 9).

Electronic system 904 can comprise battery pack 908. Battery pack 908 of electronic system 904 can comprise multiple devices 100 (e.g., 42 devices 100) that be coupled to one another in series to form multiple strings 910 (e.g., 3 strings 910). Strings 910 of electronic system 904 can be coupled to one another in parallel as illustrated in FIG. 9. For clarity, only one device 100 and only one string 910 are identified in electronic system 904 depicted in FIG. 9. Each device 100 of each string 910 in battery pack 908 of electronic system 904 can be individually configured to operate in a certain operation mode 400 (e.g., as described above with reference to FIG. 4) to yield a desired electric voltage (e.g., a certain positive or negative electric voltage value). For example, each device 100 of each string 910 in battery pack 908 of electronic system 904 can be individually configured to operate in off mode 402, positive mode 404, negative mode 406, or bypass mode 408 such that battery pack 908 can be coupled to an AC charger 914 (denoted as "AC Chrg" in FIG. 9) to enable AC charging of battery pack 908 of electronic system 904 (e.g., AC charging to approximately 400V as illustrated in FIG. 9). In this example, AC charger 914 can comprise an AC charger including, but not limited to, a single-phase AC charger, a 3-phase AC charger, and/or another type of AC charger.

Electronic system 906 can comprise battery pack 908. Battery pack 908 of electronic system 906 can comprise multiple devices 100 (e.g., 42 devices 100) that be coupled to one another in series to form multiple strings 910 (e.g., 3 strings 910). Strings 910 of electronic system 906 can be coupled to one another in series as illustrated in FIG. 9. For clarity, only one device 100 and only one string 910 are identified in electronic system 906 depicted in FIG. 9. Each device 100 of each string 910 in battery pack 908 of electronic system 906 can be individually configured to operate in a certain operation mode 400 (e.g., as described above with reference to FIG. 4) to yield a desired electric voltage (e.g., a certain positive or negative electric voltage value). For example, each device 100 of each string 910 in battery pack 908 of electronic system 906 can be individually configured to operate in off mode 402, positive mode 404, negative mode 406, or bypass mode 408 such that battery pack 908 can be coupled to a DC charger (not illustrated in FIG. 9) to enable DC charging of battery pack 908 of electronic system 906 (e.g., DC charging to approximately 1200V as illustrated in FIG. 9).

Figure 10A:
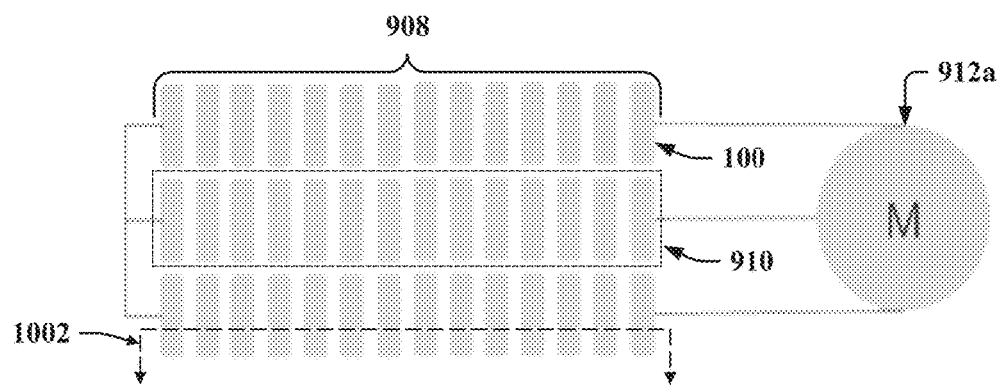
FIGS. 10A and 10B illustrate a top view and a cross-sectional side view, respectively, of an example, non-limiting electronic system that can facilitate an intelligent battery cell with integrated monitoring and switches in accordance with one or more embodiments described herein.
Figure 10B:
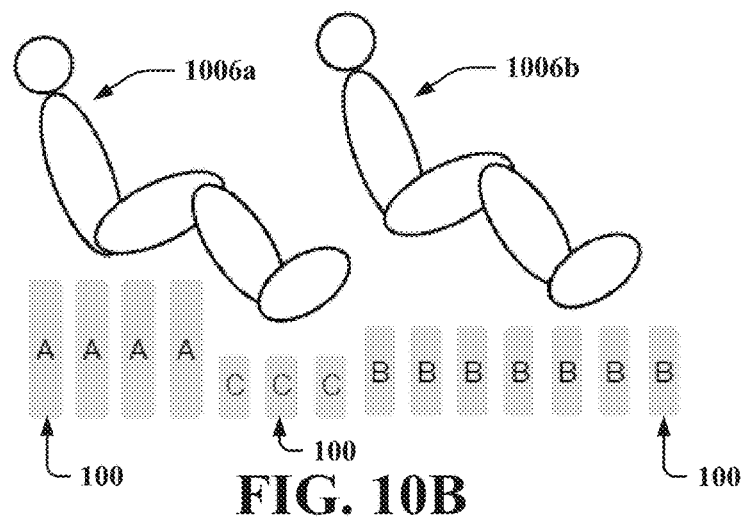
Figure 10C:
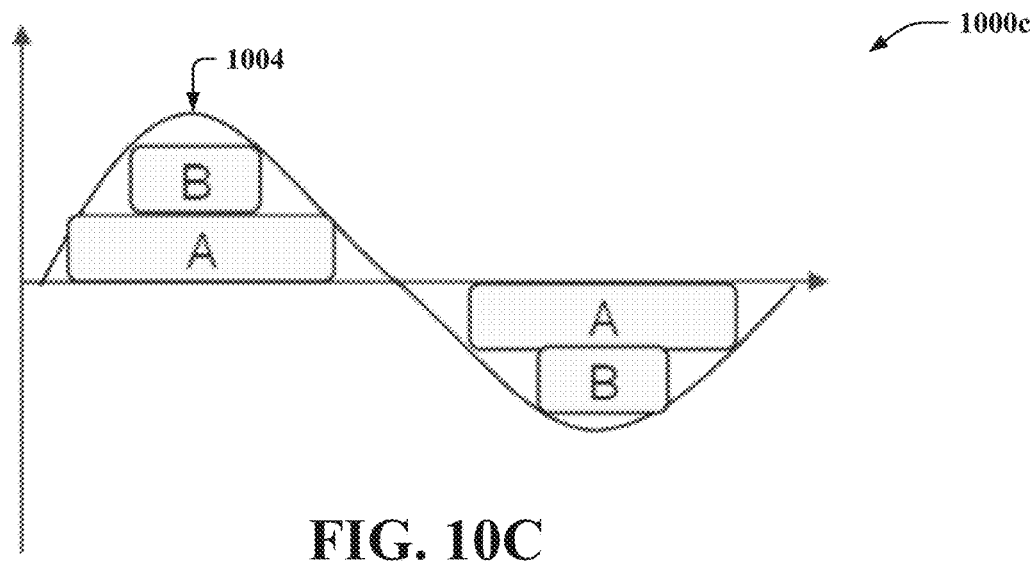
FIG. 10C illustrates an example, non-limiting plot corresponding to the electronic system of FIGS. 10A and 10B.

FIG. 10A illustrates a top view of an example, non-limiting electronic system 1000a that can facilitate an intelligent battery cell with integrated monitoring and switches in accordance with one or more embodiments described herein. FIG. 10B illustrates a cross-sectional side view of one or more components of electronic system 1000a as viewed along a plane defined by line 1002. FIG. 10C illustrates an example, non-limiting plot 1000c corresponding to electronic system 1000a. Repetitive description of like elements and/or processes employed in respective embodiments is omitted for sake of brevity.

Electronic system 1000a can comprise an example, non-limiting alternative embodiment of electronic system 902 described above with reference to FIG. 9. In some embodiments, electronic system 1000a can comprise an electric driveline that can be implemented in an EV to, for example, provide electric power (e.g., AC or DC) directly (e.g., without the use of, for instance, an inverter) to one or more electronic components in the EV (e.g., motor 912a) and/or to enable a battery pack of the electric driveline to be charged using an AC or DC charger.

Electronic system 1000a can comprise battery pack 908. Battery pack 908 of electronic system 1000a can comprise multiple devices 100 (e.g., 42 devices 100) that be coupled to one another in series to form multiple strings 910 (e.g., 3 strings 910). Strings 910 of electronic system 1000a can be coupled to one another in parallel as illustrated in FIG. 10A. For clarity, only one device 100 and only one string 910 are identified in electronic system 1000a depicted in FIG. 10A. Each device 100 of each string 910 in battery pack 908 of electronic system 1000a can be individually configured to operate in a certain operation mode 400 (e.g., as described above with reference to FIG. 4) to yield a desired electric voltage (e.g., a certain positive or negative electric voltage value). For example, each device 100 of each string 910 in battery pack 908 of electronic system 1000a can be individually configured to operate in off mode 402, positive mode 404, negative mode 406, or bypass mode 408 such that battery pack 908 can provide AC electric power to motor 912a (denoted as "M" in FIG. 10A). In another example, each device 100 of each string 910 in battery pack 908 of electronic system 1000a can be individually configured to operate in off mode 402, positive mode 404, negative mode 406, or bypass mode 408 such that battery pack 908 can provide (e.g., in parallel, simultaneously) AC electric power to motor 912a and one or more other motors (not illustrated in FIG. 10A).

Each device 100 in battery pack 908 of electronic system 1000a can be controlled individually (e.g., via smart cell module 104 as described above with reference to FIGS. 1-9). Usage of each device 100 can be controlled (e.g., via smart cell module 104) with a corresponding duty cycle defined for each device 100. To facilitate individual control of each device 100 in battery pack 908, in some embodiments, battery pack 908 can also be coupled to, for instance, a control unit (e.g., a vehicle control unit (VCU), not illustrated in FIG. 10A, 10B, or 10C) that can control the total electric power output (e.g., electric voltage, electric current, etc.) of battery pack 908 by individually controlling electric power output of each device 100 in battery pack 908. Such a control unit (e.g., a VCU) can individually control the electric power output of each device 100 in battery pack 908 by configuring each device 100 (e.g., via smart cell module 104 in each device 100) to operate in off mode 402, positive mode 404, negative mode 406, or bypass mode 408 for a certain duration. By configuring each device 100 in battery pack 908 to operate in off mode 402, positive mode 404, negative mode 406, or bypass mode 408 for a certain duration, such a control unit (e.g., a VCU) can thereby define a certain duty cycle for each device 100 in battery pack 908. In some embodiments, such a control unit (e.g., a VCU) can employ a scheduler component (not illustrated in the figures) to define the duration that each device 100 in battery pack 908 will remain in off mode 402, positive mode 404, negative mode 406, or bypass mode 408. By individually implementing the duty cycle of each device 100 in battery pack 908, such a control unit (e.g., a VCU) can individually "switch on" one or more certain devices 100 in battery pack 908 and individually "switch off" one or more other devices 100 in battery pack 908 to yield a desired electrical output from battery pack 908.

It should be appreciated that, in some embodiments, electronic system 1000a does not comprise the above described control unit. In these embodiments, each device 100 in battery pack 908 can control its own electric power output (e.g., as described above with reference to FIGS. 1-9), and therefore, all devices 100 in battery pack 908 can collectively control the electric power output (e.g., electric voltage, electric current, etc.) of battery pack 908. In these embodiments, each device 100 in battery pack 908 can also communicate periodically (e.g., every second) with all other devices 100 in battery pack 908 to facilitate, if needed, adjustment of the electric power output of each device 100 to, for instance, maintain a certain electric power output of battery pack 908. For example, as described below with reference to FIG. 27, each device 100 can communicate with all other devices 100 in battery pack 908 (e.g., wirelessly via smart cell module 104, network 112, etc.) to, for instance: determine each other's SoC status; exchange each other's assigned duty cycles; and/or exchange revised duty cycles of one or more certain devices 100 that can be modified based on, for instance, a change in the SoC status of one or more other devices 100 in battery pack 908.

In some embodiments, battery pack 908 can comprise devices 100 having different chemistries and/or different sized devices 100 (denoted as "A," "B," and "C" in FIG. 10B), where the size of each device 100 can be indicative of its electrical capacity (e.g., electric voltage, electric current, electric power, etc.). For example, a relatively large device 100 such as, for instance, device 100 denoted in FIG. 10B as "A" can comprise a relatively larger electrical capacity than that of devices 100 denoted in FIG. 10B as "B" and "C." In embodiments where battery pack 908 is also coupled to the control unit described above (e.g., a VCU), such a control unit can define (e.g., as described above) a duty cycle for each device 100 that is based on the device's electrical capacity. For example, such a control unit can define a duty cycle for a device 100 denoted in FIG. 10B as "A" that is longer in duration than that of the duty cycles for devices 100 denoted in FIG. 10B as "B" and "C," where device 100 denoted in FIG. 10B as "A" comprises a relatively larger electrical capacity than that of devices 100 denoted in FIG. 10B as "B" and "C." For instance, as illustrated by voltage curve 1004 of plot 1000c depicted in FIG. 10C, such a control unit can define a duty cycle for a device 100 denoted in FIG. 10C as "A" that is longer in duration than that of a duty cycle for device 100 denoted in FIG. 10C as "B."

As each device 100 in battery pack 908 can be individually controlled as described above, various parameters of battery pack 908 (e.g., dimensions, weight, etc.) can be optimized for a certain packaging space. For example, various parameters of battery pack 908 (e.g., dimensions, weight, etc.) can be optimized (e.g., using a bin packing algorithm) for a certain packaging space based on one or more parameters (e.g., dimensions, weight, etc.) of each device 100 in battery pack 908. For instance, various parameters of battery pack 908 (e.g., dimensions, weight, etc.) can be optimized (e.g., using a bin packing algorithm) based on one or more parameters (e.g., dimensions, weight, etc.) of each device 100 in battery pack 908 such that battery pack 908 can occupy (e.g., fully or partially) a certain packaging space in, for example, one or more components of an EV (e.g., in a frame, chassis, body, and/or seat of an EV as illustrated in FIG. 10B, where entities 1006a, 1006b represent occupants (e.g., humans) of such an EV).

FIGS. 11A and 11B illustrate example, non-limiting existing devices 1100a, 1100b (e.g., prior art devices). FIG. 11C illustrates an example, non-limiting device 1100c that can facilitate an intelligent battery cell with integrated monitoring and switches in accordance with one or more embodiments described herein. Repetitive description of like elements and/or processes employed in respective embodiments is omitted for sake of brevity.

Device 1100a comprises an existing battery pack 1102a (e.g., a battery pack currently used in prior art technologies) having battery cells 1104a, 1106a. Device 1100a illustrates how the electrical capacity (denoted as "pack capacity" and represented by the dark gray shading in FIG. 11A) of existing battery pack 1102a is limited by battery cell 1104a which has the lowest electrical capacity relative to that of all other battery cells 1106a in existing battery pack 1102a.

Device 1100b comprises an existing battery pack 1102b (e.g., a battery pack currently used in prior art technologies) having battery cells 1104b, 1106b. Device 1100b illustrates how the electric energy (e.g., electric voltage, electric current, etc.) of each battery cell 1104b, 1106b in existing battery pack 1102b is drained (e.g., discharged) according to a discharge priority schedule (denoted as "discharge priority" in FIG. 11B) and/or a target state of charge (SoC) of, for instance, 52 percent (%) as illustrated in FIG. 11B. In operation, each battery cell 1104b, 1106b in existing battery pack 1102b can be drained to the target SoC (e.g., drained to an SoC of 52% as illustrated in FIG. 11B). However, when one or more battery cells 1104b, 1106b (e.g., battery cell 1106b as illustrated in FIG. 11B) are drained (e.g., discharged) to a level that is lower than the target SoC (e.g., lower than a SoC of 52%), existing battery pack 1102b stops functioning (e.g., stops discharging electric voltage, electric current, etc.).

Device 1100c comprises a battery pack 1102c having multiple devices 100. Battery pack 1102c can comprise the same structure and/or functionality as that of battery pack 908 described above with reference to FIGS. 9, 10A, 10B, and 10C. As each device 100 in battery pack 1102c can be individually controlled (e.g., as described above with reference to FIGS. 10A, 10B, and 10C), device 1100c illustrates how the electric energy (e.g., electric voltage, electric current, etc.) of each device 100 in battery pack 1102c can be used (e.g., discharged) to its full extent. It should be appreciated that such use of all electric energy available in each device 100 in battery pack 1102c eliminates the use of balancing techniques (e.g., load balancing techniques) employed by existing battery packs (e.g., existing battery pack 1102a and/or 1102b described above and illustrated in FIGS. 11A and 11B, respectively).

During operation of battery pack 1102c, the duty cycle defined for each device 100 in battery pack 1102c (e.g., as described above with reference to FIGS. 10A, 10B, and 10C) can dictate how much electric energy (e.g., electric voltage, electric current, etc.) of each device 100 is used (e.g., discharged). Therefore, the electric energy (e.g., electric voltage, electric current, etc.) of each device 100 in battery pack 1102c can be used (e.g., discharged) to its full extent (e.g., all or nearly all electric energy of each device 100 can be used). Consequently, it should be appreciated that the variation in electrical capacity of each device 100 in battery pack 1102c illustrated in FIG. 11C will not be a limit to the electrical capacity of battery pack 1102c.

In some embodiments, a certain device 100 in battery pack 1102c can determine (e.g., via one or more sensors 306 of smart cell module 104) that its electric energy is at or approaching a defined low level (e.g., a target SoC percentage) and can further communicate such information to a control unit that can be coupled to battery pack 1102c (e.g., the control unit described above with reference to FIGS. 10A, 10B, and 10C). In these embodiments, this certain device 100 (e.g., via smart cell module 104) and/or the control unit can modify the duty cycle corresponding to such a certain device 100. For example, this certain device 100 (e.g., via smart cell module 104) and/or the control unit can reduce the duration of the duty cycle corresponding to this certain device 100 such that less electric energy is discharged from this certain device 100.

Battery pack 1102c can be discharged at a discharge amount (e.g., discharge rate, discharge voltage, discharge current, etc.) that can be determined based on a target SoC percentage and/or a cell priority stack corresponding to devices 100 in battery pack 1102c. Additionally, or alternatively, each device 100 in battery pack 1102c can comprise a modular component that can function and/or be controlled independent of all other devices 100 in battery pack 1102c. Therefore, for example, in operation, when one or more devices 100 in battery pack 1102c are approaching the SoC percentage or are drained below the SoC percentage, such one or more devices 100 can be reconfigured (e.g., via smart cell module 104 and/or the control unit described above) to operate in bypass mode 408 and/or can be reprioritized to a lower discharge priority level. In this example, one or more other devices 100 in battery pack 1102c can then be configured or reconfigured to operate in a certain operation mode 400 (e.g., off mode 402, positive mode 404, negative mode 406, or bypass mode 408) that can enable battery pack 1102c to continue operating, unaffected, at the same discharge amount (e.g., discharge rate, discharge voltage, discharge current, etc.). Thus, it should be appreciated that devices 100 provide redundancy to battery pack 1102c, as a reduction of electrical capacity of any device 100 in battery pack 1102c and/or a failure (e.g., malfunction, etc.) of any device 100 in battery pack 1102c will not affect the structure and/or functionality of battery pack 1102c and/or any other devices 100 in battery pack 1102c.

Figure 12:
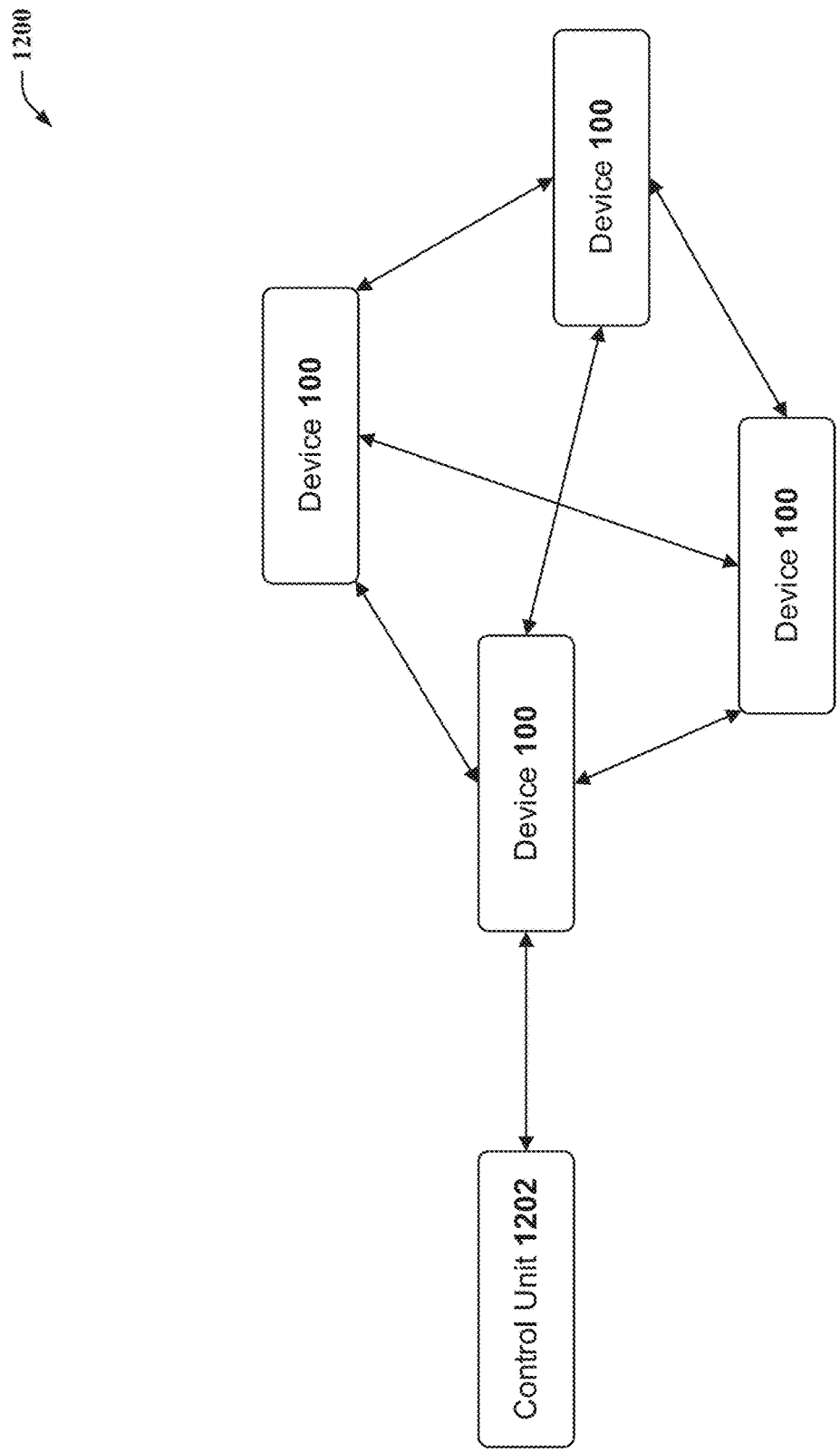
FIG. 12 illustrates an example, non-limiting system that can facilitate an intelligent battery cell with integrated monitoring and switches in accordance with one or more embodiments described herein.

FIG. 12 illustrates an example, non-limiting system 1200 that can facilitate an intelligent battery cell with integrated monitoring and switches in accordance with one or more embodiments described herein. Repetitive description of like elements and/or processes employed in respective embodiments is omitted for sake of brevity.

System 1200 can comprise a mesh network (e.g., a local network topology having infrastructure nodes coupled directly, dynamically, and/or non-hierarchically to multiple nodes to cooperate with one another and/or to communicate data). System 1200 can comprise a control unit 1202 that can be coupled to one or more devices 100, where such one or more devices 100 can be further coupled to one another as illustrated in the example embodiment depicted in FIG. 12. Such coupling of control unit 1202 to one or more devices 100 and each device 100 to one or more other devices 100 can facilitate communication between all such components (e.g., via smart cell module 104 and/or network 112 as described above with reference to FIG. 1). For example, control unit 1202 can request, and/or each device 100 can periodically provide (e.g., every minute), parameter data (e.g., electric voltage, frequency, temperature, chemistry, etc.) from each device 100 that can be obtained by each such device 100 (e.g., via smart cell module 104 and/or one or more sensors 306 as described above with reference to FIG. 1).

In some embodiments, control unit 1202 can comprise a VCU (e.g., the VCU described above with reference to FIGS. 10A, 10B, and 10C) that can be implemented in and/or coupled to an electric driveline of an EV. In some embodiments, control unit 1202 can comprise and/or employ a BMS that can individually control (e.g., via smart cell module 104) functionality of each device 100 and/or functionality of a battery pack (e.g., battery pack 908) that can comprise one or more devices 100. For example, based on parameter data obtained from each device 100 in system 1200 as described above, control unit 1202 can perform one or more operations (e.g., operation mode reconfiguration, modify discharge priorities, etc.) to ensure a battery pack (e.g., battery pack 908) that can comprise devices 100 can maintain its discharge amount (e.g., discharge rate, discharge voltage, discharge current, etc.).

In some embodiments, system 1200 can comprise a multicore processing system and/or a distributed computing network system, where one or more functions of one or more nodes located inside or outside of system 1200 can be distributed to one or more nodes of system 1200. For example, one or more functions of control unit 1202 and/or a device (e.g., a computing device and/or communication device, not illustrated in FIG. 12) that is external to system 1200 can be transferred to one or more devices 100 of system 1200. In this example, such one or more devices 100 can then perform such one or more functions. Examples of such one or more functions include, but are not limited to: processing functions of control unit 1202, the external device, and/or one or more devices 100, thereby enabling parallel processing of such processing functions by such components; intelligent self-driving functions associated with a vehicle (e.g., an EV) comprising system 1200; detection and/or monitoring functions associated with such a vehicle comprising system 1200; and/or another function. To transfer such one or more functions to one or more devices 100 of system 1200, the external device described above can be coupled to control unit 1202 (e.g., via a wired connection, wireless connection, etc.) such that control unit 1202 can transfer such one or more functions received from the external device to one or more devices 100 of system 1200.

It should be appreciated that, based on such functionality transfer described above, system 1200 can enable cross connection between and/or redundancy associated with devices 100, control unit 1202, and/or one or more devices external to system 1200 (e.g., computing devices, communication devices, etc.). It should also be appreciated that, based on such cross connection and/or redundancy described above, system 1200 can facilitate elimination of one or more devices external to system 1200 that can transfer their functionality (e.g., processing functions, etc.) to control unit 1202 and/or one or more devices 100 of system 1200. For example, in embodiments where system 1200 is implemented in an EV and control unit 1202 comprises a VCU, system 1200 can facilitate elimination of one or more computing devices and/or communication devices associated with and/or located in the EV, as the functionality of such devices can be transferred to control unit 1202 and/or one or more devices 100 of system 1200.

Figure 13:
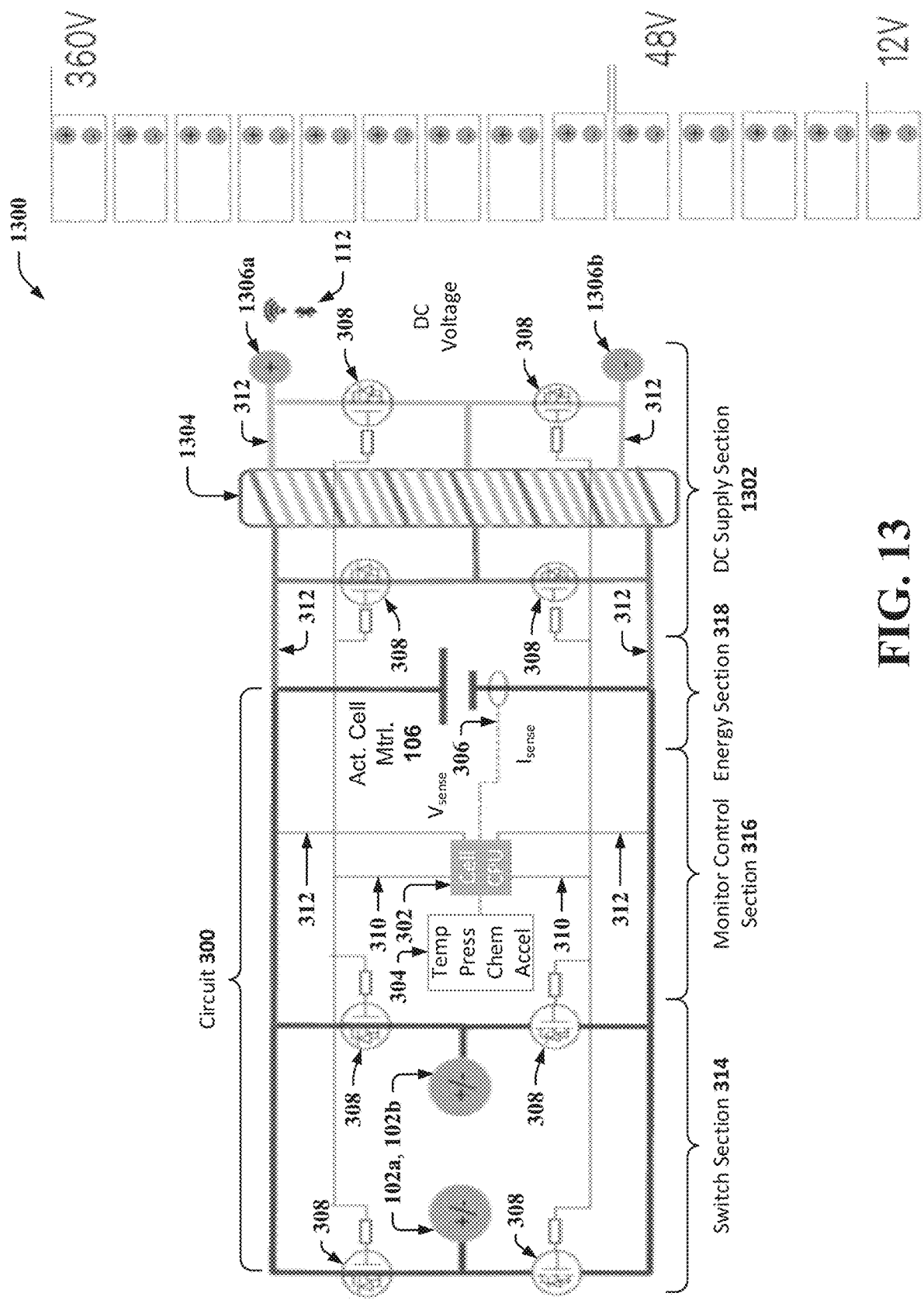
FIGS. 13 and 14 illustrate example, non-limiting circuits that can facilitate an intelligent battery cell with integrated monitoring and switches in accordance with one or more embodiments described herein.

FIG. 13 illustrates an example, non-limiting circuit 1300 that can facilitate an intelligent battery cell with integrated monitoring and switches in accordance with one or more embodiments described herein. Repetitive description of like elements and/or processes employed in respective embodiments is omitted for sake of brevity.

In some embodiments, device 100 can comprise a DC supply section (not illustrated in FIG. 1). In these embodiments, circuit 1300 can comprise an electrical circuit representation of such a device 100 that can comprise a DC supply section. For example, circuit 1300 can comprise an example, non-limiting alternative embodiment of circuit 300 described above with reference to FIG. 3, where circuit 1300 can comprise a DC supply section 1302 as illustrated in the example embodiment depicted in FIG. 13.

DC supply section 1302 can comprise a transformer 1304 that can be coupled to circuit 300 and/or cell poles 1306a, 1306b via one or more switches 308 and/or wire traces 312 of DC supply section 1302 as illustrated in the example embodiment depicted in FIG. 13. Cell poles 1306a, 1306b can comprise the same structure and/or functionality as that of cell poles 102a, 102b described above with reference to FIG. 1.

Transformer 1304 can comprise a push-pull transformer or another transformer. Transformer 1304 can enable coupling (e.g., via cell poles 1306a, 1306b) of a DC electronic device to a device 100 that comprises DC supply section 1302, where such DC coupling of the DC electronic device can be independent from and/or insulated from (e.g., electrically independent from and/or electrically insulated from) the AC supply that can be provided using device 100 (e.g., as described above with reference to FIGS. 3-9). Transformer 1304 can be controlled (e.g., operated) by processor 302 using one or more switches 308 of DC supply section 1302.

A single device 100 comprising DC supply section 1302 can provide DC electric voltage that can range from, for example, approximately 4V to approximately 48V. To provide DC electric voltage of 12V, 48V, and/or 400V, multiple devices 100 that respectively comprise DC supply section 1302 can be coupled to one another in series and parallel in a battery string (e.g., string 910) of a battery pack (e.g., battery pack 908). To provide redundancy, such a battery pack can comprise several (e.g., 3) of the battery strings described above.

It should be appreciated that each device 100 in a battery pack (e.g., battery pack 908) can comprise DC supply section 1302 and the AC supply section described above with reference to FIGS. 3-9 (e.g., the AC supply section represented by circuit 300 of circuit 1300 depicted in FIG. 13). It should also be appreciated that DC supply section 1302 and the AC supply section of each device 100 in such a battery pack can operate in parallel (e.g., simultaneously) to provide a DC electric energy supply and an AC electric energy supply from the battery pack (e.g., at a DC terminal and an AC terminal, respectively, of such a battery pack), which can thereby enable elimination of one or more electronic components associated with an electronic system comprising such a device 100 and/or such a battery pack. For example, in embodiments where a device 100 comprising DC supply section 1302 is implemented in an electric driveline of an EV, such a device 100 comprising DC supply section 1302 can provide AC electric power (e.g., as described above with reference to FIGS. 3-9) to operate one or more motors of the EV (e.g., AC electric power to drive the EV) and DC electric power to operate one or more auxiliary electronic systems of the electric driveline and/or the EV, thereby enabling elimination of one or more electronic components associated with such one or more auxiliary electronic systems, the electric driveline, and/or the EV. For instance, in these embodiments, such a device 100 comprising DC supply section 1302 can provide DC electric power to operate one or more auxiliary electronic systems in the EV such as, for example, a heating, ventilation, and air conditioning (HVAC) system, interior and/or exterior lighting systems, electrically powered windows and/or locks, audio systems, DC electric power supply ports, windshield wipers, and/or another auxiliary electronic system in the EV. In these embodiments, such a device 100 comprising DC supply section 1302 can thereby enable elimination of one or more electronic components including, but not limited to, a converter, an inverter, one or more DC batteries, and/or another component associated with such one or more auxiliary electronic systems, the electric driveline, and/or the EV.

Figure 14:
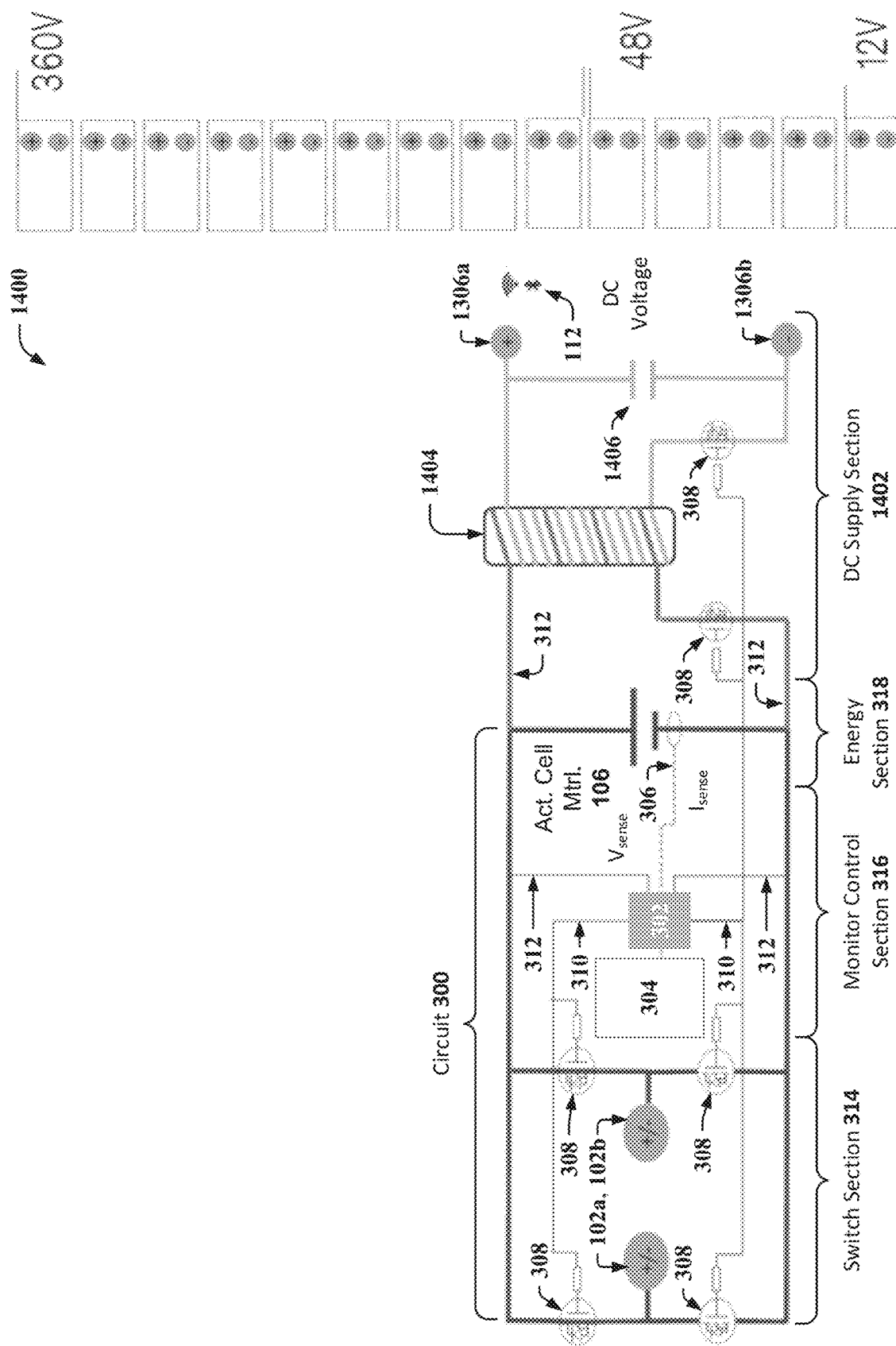

FIG. 14 illustrates an example, non-limiting circuit 1400 that can facilitate an intelligent battery cell with integrated monitoring and switches in accordance with one or more embodiments described herein. Repetitive description of like elements and/or processes employed in respective embodiments is omitted for sake of brevity.

In some embodiments, device 100 can comprise a DC supply section (not illustrated in FIG. 1). In these embodiments, circuit 1400 can comprise an electrical circuit representation of such a device 100 that can comprise a DC supply section. For example, circuit 1400 can comprise an example, non-limiting alternative embodiment of circuit 300 and/or circuit 1300 described above with reference to FIGS. 3 and 13, respectively, where circuit 1400 can comprise a DC supply section 1402 as illustrated in the example embodiment depicted in FIG. 14.

DC supply section 1402 can comprise an example, non-limiting alternative embodiment of DC supply section 1302. DC supply section 1402 can comprise a transformer 1404 that can be coupled to circuit 300, a capacitor 1406, and/or cell poles 1306a, 1306b via one or more switches 308 and/or wire traces 312 of DC supply section 1402 as illustrated in the example embodiment depicted in FIG. 14.

DC supply section 1402 can enable coupling (e.g., via cell poles 1306a, 1306b) of a DC electronic device to a device 100 that comprises DC supply section 1402, where such DC coupling of the DC electronic device can be independent from and/or insulated from (e.g., electrically independent from and/or electrically insulated from) the AC supply that can be provided using device 100 (e.g., as described above with reference to FIGS. 3-9). It should be appreciated that such DC coupling of the DC electronic device can be independent from and/or insulated from the AC supply due to a magnetic field (not illustrated in FIG. 14) that can be generated in transformer 1404 (e.g., in the coil of transformer 1404) during operation of such a device 100 comprising DC supply section 1402.

Transformer 1404 can comprise a flyback transformer or another transformer. DC supply section 1402 and/or transformer 1404 can be controlled (e.g., operated) by processor 302 using one or more switches 308 of DC supply section 1402. Capacitor 1406 can store electric energy yielded by transformer 1404 via operation of one or more switches 308 of DC supply section 1402 (e.g., capacitor 1406 can store electric energy yielded by repeatedly actuating (e.g., turning on and off) one or more switches 308 of DC supply section 1402 at, for instance, 300 kilohertz (kHz)). DC supply section 1402 can provide such electric energy stored in capacitor 1406 to a DC electronic device that can be coupled to cell poles 1306a, 1306b.

The transformer ratio of transformer 1404 can comprise any ratio value that can enable a device 100 comprising DC supply section 1404 to yield a constant DC electric voltage ranging from, for example, approximately 4V to approximately 6V. For example, in an embodiment, the transformer ratio of transformer 1404 can comprise a 1:2 ratio. The transformer ratio of transformer 1404 can be adjusted to yield a desired constant DC electric voltage value. The DC electric voltage that can be yielded at cell poles 1306a, 1306b can be controlled by the duty cycle(s) corresponding to one or more switches 308 of DC supply section 1402 as described above, where such one or more switches 308 of DC supply section 1402 can be operated (e.g., opened, closed, turned on, turned off, engaged, disengaged, etc.) by processor 302.

It should be appreciated that each device 100 in a battery pack (e.g., battery pack 908) can comprise DC supply section 1402 and the AC supply section described above with reference to FIGS. 3-9 (e.g., the AC supply section represented by circuit 300 of circuit 1400 depicted in FIG. 14). It should also be appreciated that DC supply section 1402 and the AC supply section of each device 100 in such a battery pack can operate in parallel (e.g., simultaneously) to provide a DC electric energy supply and an AC electric energy supply from the battery pack (e.g., at a DC terminal and an AC terminal, respectively, of such a battery pack), which can thereby enable elimination of one or more electronic components associated with an electronic system comprising such a device 100 and/or such a battery pack. For example, in embodiments where a device 100 comprising DC supply section 1402 is implemented in an electric driveline of an EV, such a device 100 comprising DC supply section 1402 can provide AC electric power (e.g., as described above with reference to FIGS. 3-9) to operate one or more motors of the EV (e.g., AC electric power to drive the EV) and DC electric power to operate one or more auxiliary electronic systems of the electric driveline and/or the EV, thereby enabling elimination of one or more electronic components associated with such one or more auxiliary electronic systems, the electric driveline, and/or the EV. For instance, in these embodiments, such a device 100 comprising DC supply section 1402 can provide DC electric power to operate one or more auxiliary electronic systems in the EV such as, for example, a heating, ventilation, and air conditioning (HVAC) system, interior and/or exterior lighting systems, electrically powered windows and/or locks, audio systems, DC electric power supply ports, windshield wipers, and/or another auxiliary electronic system in the EV. In these embodiments, such a device 100 comprising DC supply section 1402 can thereby enable elimination of one or more electronic components including, but not limited to, a converter, an inverter, one or more DC batteries, and/or another component associated with such one or more auxiliary electronic systems, the electric driveline, and/or the EV.

Figure 15:
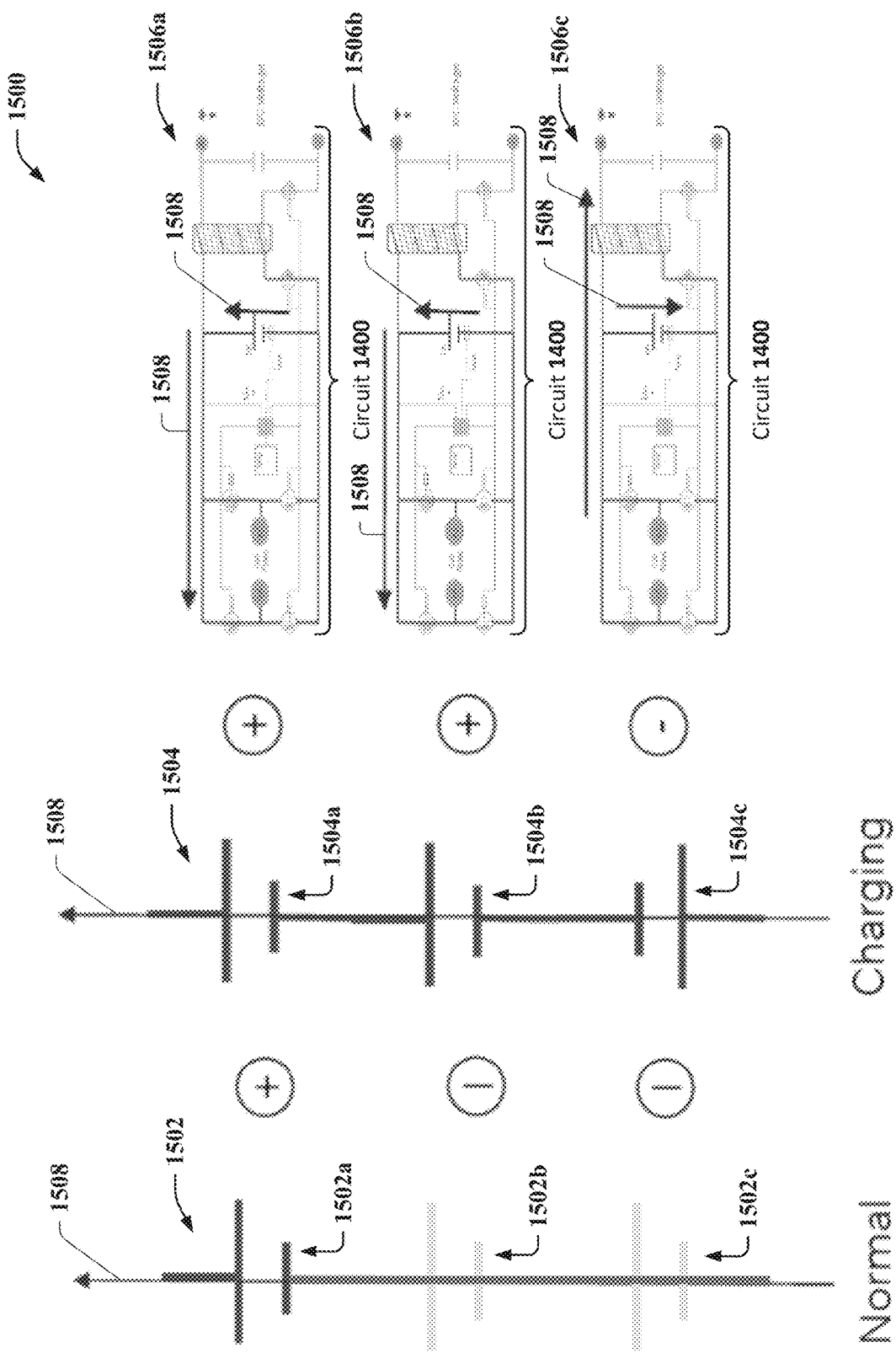
FIG. 15 illustrates an example, non-limiting diagram that can facilitate an intelligent battery cell with integrated monitoring and switches in accordance with one or more embodiments described herein.

FIG. 15 illustrates an example, non-limiting diagram 1500 that can facilitate an intelligent battery cell with integrated monitoring and switches in accordance with one or more embodiments described herein. Repetitive description of like elements and/or processes employed in respective embodiments is omitted for sake of brevity.

Diagram 1500 can comprise strings 1502, 1504. Diagram 1500 can further comprise energy flow diagrams 1506a, 1506b, 1506c. Each of energy flow diagrams 1506a, 1506b, 1506c can comprise an energy flow diagram of circuit 1400 described above with reference to and illustrated in FIG. 14, where circuit 1400 can comprise an electrical circuit representation of a device 100 having DC supply section 1402.

Energy flow diagram 1506a can correspond to battery devices and/or battery cell devices 1502a, 1504a of strings 1502, 1504, respectively, where the energy flow direction in each of strings 1502, 1504 and energy flow diagram 1506a is represented by arrows 1508 as depicted in the example embodiment shown in FIG. 15. Energy flow diagram 1506b can correspond to battery devices and/or battery cell devices 1502b, 1504b of strings 1502, 1504, respectively, where the energy flow direction in each of strings 1502, 1504 and energy flow diagram 1506b is represented by arrows 1508 as depicted in the example embodiment shown in FIG. 15. Energy flow diagram 1506c can correspond to battery devices and/or battery cell devices 1502c, 1504c of strings 1502, 1504, respectively, where the energy flow direction in each of strings 1502, 1504 and energy flow diagram 1506c is represented by arrows 1508 as depicted in the example embodiment shown in FIG. 15.

String 1502 is an electrical diagram representing an example, non-limiting battery pack string that can comprise multiple battery devices and/or battery cell devices 1502a,

1502*b*, 1502*c* that can be coupled in series to yield a certain electric voltage. Battery devices and/or battery cell devices 1502*a*, 1502*b*, 1502*c* can each comprise the same structure and/or functionality as that of device 100 and/or smart cell module 104. String 1502 can illustrate the direction of energy flow in a normal mode (e.g., a discharge mode), where the energy flow direction is represented by arrow 1508 as depicted in the example embodiment shown in FIG. 15. In such a normal mode, battery device and/or battery cell device 1502*a* of string 1502 can be configured (e.g., as described above with reference to FIG. 4) to operate in positive mode 404 while battery devices and/or battery cell devices 1502*b*, 1502*c* of string 1502 can be configured (e.g., as described above with reference to FIG. 4) to operate in bypass mode 408.

String 1504 is an electrical diagram representing an example, non-limiting battery pack string that can comprise multiple battery devices and/or battery cell devices 1504*a*, 1504*b*, 1504*c* that can be coupled in series to yield a certain electric voltage. Battery devices and/or battery cell devices 1504*a*, 1504*b*, 1504*c* can each comprise the same structure and/or functionality as that of device 100 and/or smart cell module 104. String 1504 can illustrate the direction of energy flow in a charging mode (e.g., a reverse mode), where the energy flow direction is represented by arrow 1508 as depicted in the example embodiment shown in FIG. 15. In such a charging mode, battery devices and/or battery cell devices 1504*a*, 1504*b* of string 1504 can be configured (e.g., as described above with reference to FIG. 4) to operate in positive mode 404 while battery device and/or battery cell device 1504*c* of string 1504 can be configured (e.g., as described above with reference to FIG. 4) to operate in negative mode 406.

As described above, each battery device and/or battery cell device 1504*a*, 1504*b*, 1504*c* of string 1504 can comprise the same structure and/or functionality as that of a device 100 comprising DC supply section 1402, and string 1504 comprising such devices can be implemented in a battery pack (e.g., battery pack 908). In some embodiments, if a DC electric load (e.g., 12V load, 48V load, etc.) that can be coupled to DC supply section 1402 is relatively high and/or unbalance occurs in the battery pack, electric energy can be transferred between battery devices and/or battery cell devices 1504*a*, 1504*b*, 1504*c* in the charging mode (e.g., transferred on the AC supply side of such devices) as illustrated by string 1504 and energy flow diagrams 1506*a*, 1506*b*, 1506*c* illustrated in FIG. 15. In some embodiments, the above described battery pack (e.g., battery pack 908) that can comprise string 1504 can be implemented in an electric driveline of an EV. In these embodiments, such electric energy transfer described above can also be implemented, for instance, when the EV is static (e.g., in standstill, in parked position, motionless, etc.) and/or when the AC supply side of the above described battery pack and/or battery devices and/or battery cell devices 1504*a*, 1504*b*, 1504*c* is not operating (e.g., not propelling the EV or charging). In these embodiments, the 3-phases of the 3-phase AC supply described above with reference to FIGS. 3-9 must not create a rotating magnetic field. It should be appreciated that such electric energy transfer described above can be implemented to ensure no devices 100 described herein in accordance with one or more embodiments of the subject disclosure will be drained below a defined low level when providing a DC electric supply while the AC supply is not operating (e.g., not propelling an EV or charging).

Figure 16:
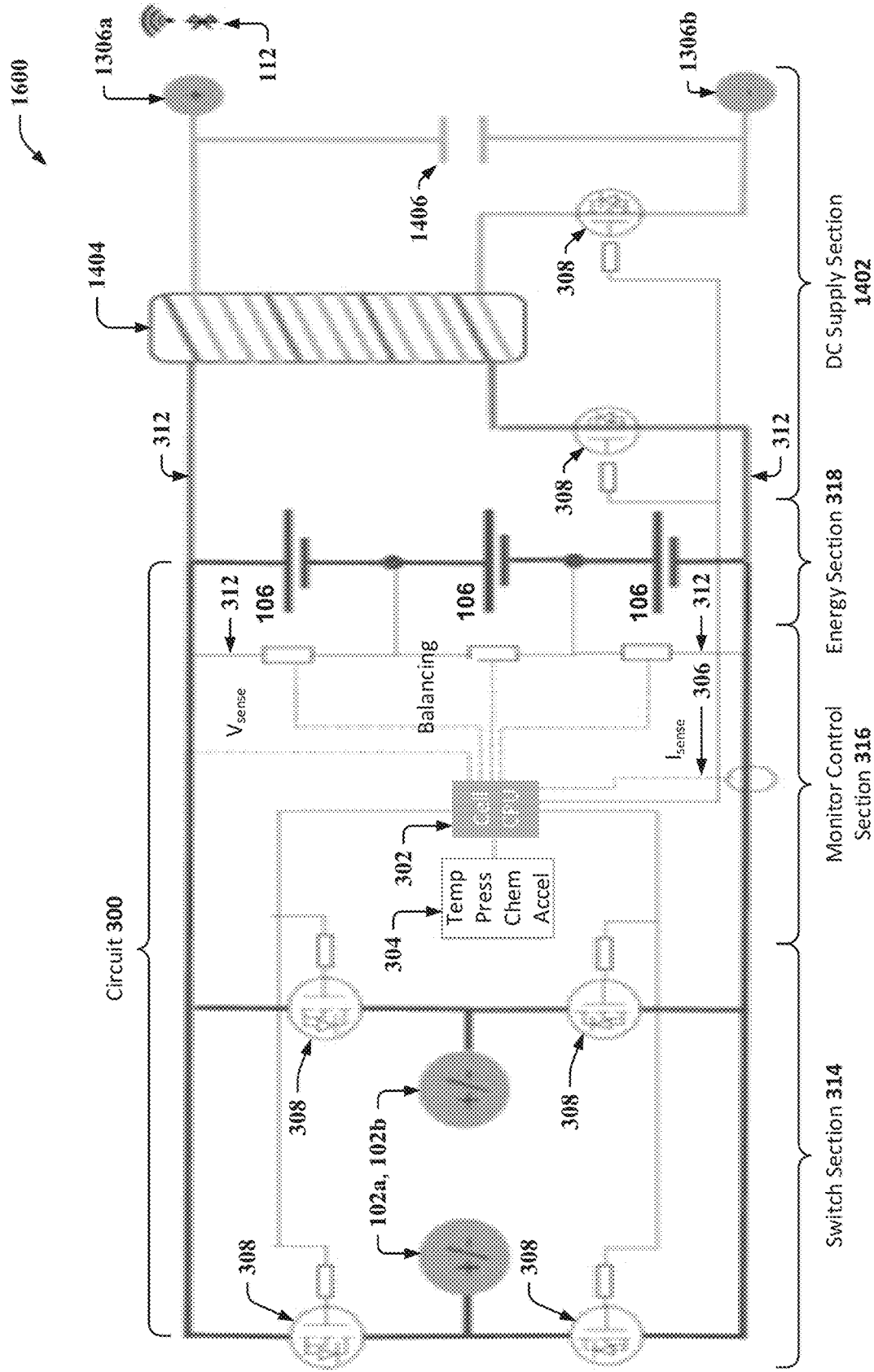
FIG. 16 illustrates an example, non-limiting circuit that can facilitate an intelligent battery cell with integrated monitoring and switches in accordance with one or more embodiments described herein.

FIG. 16 illustrates an example, non-limiting circuit 1600 that can facilitate an intelligent battery cell with integrated monitoring and switches in accordance with one or more embodiments described herein. Repetitive description of like elements and/or processes employed in respective embodiments is omitted for sake of brevity.

In some embodiments, device 100 can comprise multiple active cell material 106 (e.g., multiple battery cells) that can be coupled to the same smart cell module 104 in device 100. In these embodiments, circuit 1600 can comprise an electrical circuit representation of such a device 100 that can comprise multiple active cell material 106 (e.g., multiple battery cells) that can be coupled to the same smart cell module 104. For example, circuit 1600 can comprise an example, non-limiting alternative embodiment of circuit 300, circuit 1300, and/or circuit 1400 described above with reference to FIGS. 3, 13, and 14, respectively, where circuit 1600 can comprise multiple active cell material 106 (e.g., 3 battery cells) that can be coupled to the same smart cell module 104 in a device 100 as illustrated in the example embodiment depicted in FIG. 16.

As illustrated in the example embodiment depicted in FIG. 16, device 100 can comprise, for instance, three active cell material 106 that can be coupled to the same smart cell module 104. In this example embodiment, such active cell material 106 can be coupled to one another in series and coupled to the same smart cell module 104 in parallel (e.g., via one or more components that can facilitate internal balancing (e.g., internal load balancing) as illustrated in FIG. 16). It should be appreciated that, in some embodiments, such a device 100 that can comprise multiple active cell material 106 that can be coupled to the same smart cell module 104 in device 100 can enable elimination of one or more components associated with an electronic system comprising such a device 100 (e.g., by simultaneously providing DC power supply and AC power supply as described above with reference to FIGS. 13 and 14).

Figure 17:
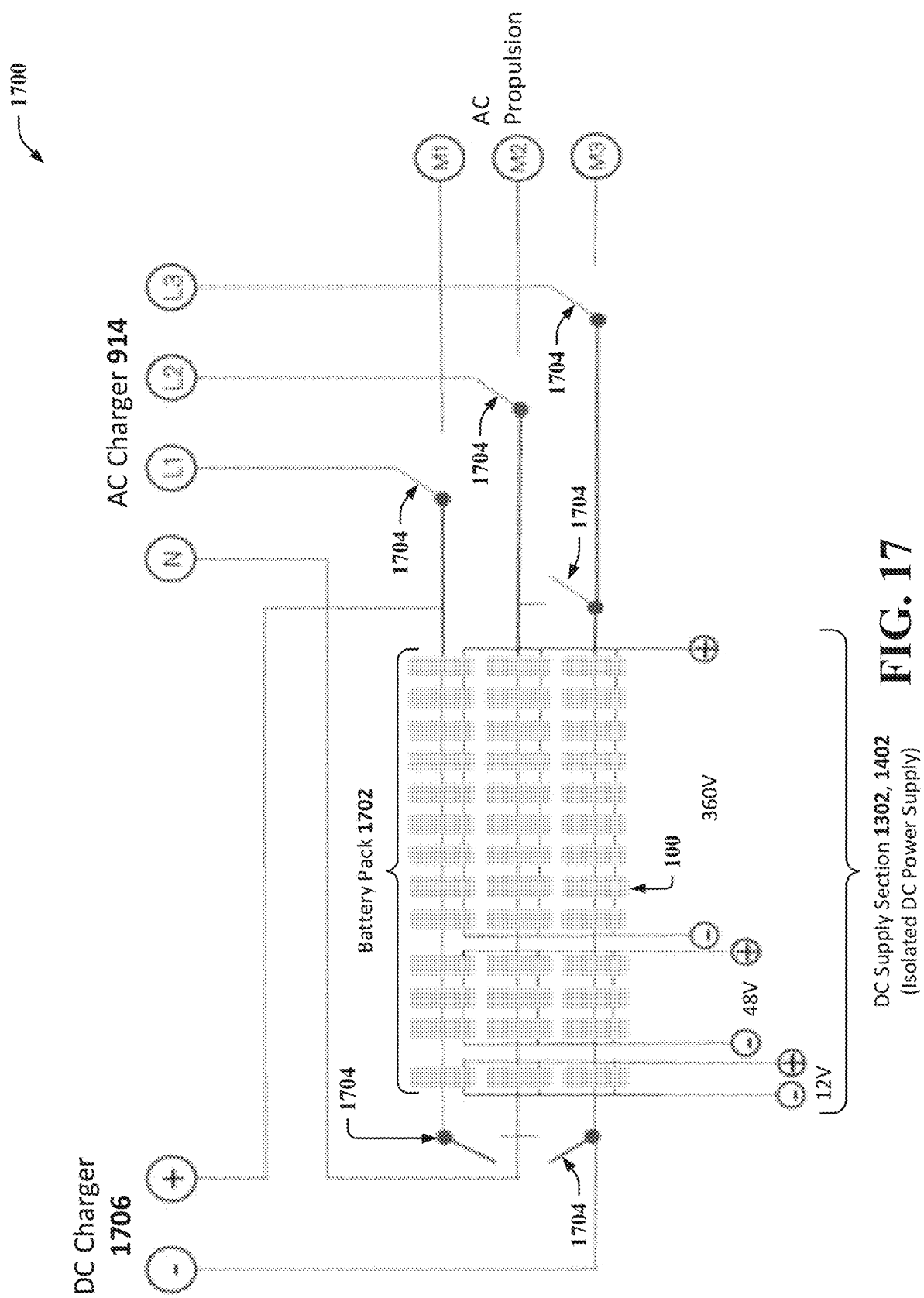
FIG. 17 illustrates an example, non-limiting wire diagram that can facilitate an intelligent battery cell with integrated monitoring and switches in accordance with one or more embodiments described herein.

FIG. 17 illustrates an example, non-limiting wire diagram 1700 that can facilitate an intelligent battery cell with integrated monitoring and switches in accordance with one or more embodiments described herein. Repetitive description of like elements and/or processes employed in respective embodiments is omitted for sake of brevity.

Wire diagram 1700 illustrates how one or more embodiments of the subject disclosure can be implemented in an electrical system to facilitate one or more functions of such one or more embodiments described above with reference to FIGS. 1-16. In the example embodiment depicted in FIG. 17, wire diagram 1700 illustrates how one or more embodiments of the subject disclosure can be implemented in, for example, an electric driveline of an EV to facilitate one or more functions of such one or more embodiments described above with reference to FIGS. 1-16.

With reference to the example embodiments described above and illustrated in FIGS. 3-9 and 13-15, an isolated DC power supply (e.g., 12V, 48V, 360V, etc.) can be extracted (e.g., via cell poles 1306*a*, 1306*b*) from a battery pack 1702 of wire diagram 1700. Battery pack 1702 can comprise multiple devices 100 comprising DC supply section 1302 and/or DC supply section 1402. For clarity, only one of such devices 100 is identified in wire diagram 1700 depicted in FIG. 17. Battery pack 1702 can comprise the same structure and/or functionality as that of battery pack 908 described above with reference to FIG. 9. Such an isolated DC power supply can be extracted from battery pack 1702 by, for instance: respectively configuring (e.g., via processor 302) one or more devices 100 of battery pack 1702 in a certain operation mode 400 (e.g., off mode 402, positive mode 404, negative mode 406, or bypass mode 408) as described above with reference to FIGS. 3-9; and/or operating (e.g., via control unit 1202, a BMS, etc.) one or more switches 1704 of wire diagram 1700 to couple (e.g., in series) at least two of such devices 100 described above and/or to discharge DC electric energy (e.g., electric power, electric voltage, electric current, etc.) from one or more of such devices 100 described above.

With reference to the example embodiments described above and illustrated in FIGS. 3-9 and 13-15, an isolated AC power supply can be extracted from battery pack 1702 of wire diagram 1700. Such an isolated AC power supply can be extracted from battery pack 1702 by, for instance: respectively configuring (e.g., via processor 302) one or more devices 100 of battery pack 1702 in a certain operation mode 400 (e.g., off mode 402, positive mode 404, negative mode 406, or bypass mode 408) as described above with reference to FIGS. 3-9; and/or operating (e.g., via control unit 1202, a BMS, etc.) one or more switches 1704 of wire diagram 1700 to couple (e.g., in parallel) at least two of such devices 100 described above and/or to discharge AC electric energy (e.g., electric power, electric voltage, electric current, etc.) from one or more of such devices 100 described above. As illustrated in the example embodiment depicted in FIG. 17, such AC electric energy can be used as AC propulsion energy to power one or more motors M1, M2, M3 shown in wire diagram 1700, where such one or more motors M1, M2, M3 can be used to propel (e.g., drive) the EV. In some embodiments, one or more of such devices 100 described above and/or one or more switches 1704 can be configured and/or operated such that this AC power supply can be provided to one or more motors M1, M2, M3 at the same time (e.g., simultaneously, in parallel, etc.) as the above described isolated DC power supply is provided (e.g., at the same time the isolated DC power supply is provided to cell poles 1306a, 1306b).

With reference to the example embodiments described above and illustrated in FIGS. 3-9 and 13-15, AC charger 914 can be coupled to battery pack 1702 of wire diagram 1700 to charge battery pack 1702 and/or one or more of such devices 100 described above using an AC power supply from AC charger 914. AC charger 914 can charge battery pack 1702 and/or one or more of such devices 100 described above by, for instance: respectively configuring (e.g., via processor 302) one or more devices 100 of battery pack 1702 in a certain operation mode 400 (e.g., off mode 402, positive mode 404, negative mode 406, or bypass mode 408) as described above with reference to FIGS. 3-9; and/or operating (e.g., via control unit 1202, a BMS, etc.) one or more switches 1704 of wire diagram 1700 such that at least two of the above described devices 100 in battery pack 1702 can be coupled (e.g., in parallel) in a manner that facilitates charging of battery pack 1702 and/or one or more of such devices 100 using the AC power supply from AC charger 914. In some embodiments, one or more of such devices 100 described above and/or one or more switches 1704 can be configured and/or operated such that the AC power supply from AC charger 914 can be provided to battery pack 1702 and/or such one or more devices 100 at the same time (e.g., simultaneously, in parallel, etc.) as the above described isolated DC power supply is provided (e.g., at the same time the isolated DC power supply is provided to cell poles 1306a, 1306b).

With reference to the example embodiments described above and illustrated in FIGS. 3-9 and 13-15, DC charger 1706 can be coupled to battery pack 1702 of wire diagram 1700 to charge battery pack 1702 and/or one or more of such devices 100 described above using a DC power supply from DC charger 1706. DC charger 1706 can charge battery pack 1702 and/or one or more of such devices 100 described above by, for instance: respectively configuring (e.g., via processor 302) one or more devices 100 of battery pack 1702 in a certain operation mode 400 (e.g., off mode 402, positive mode 404, negative mode 406, or bypass mode 408) as described above with reference to FIGS. 3-9; and/or operating (e.g., via control unit 1202, a BMS, etc.) one or more switches 1704 of wire diagram 1700 such that at least two of the above described devices 100 in battery pack 1702 can be coupled (e.g., in series) in a manner that facilitates charging of battery pack 1702 and/or one or more of such devices 100 using the DC power supply from DC charger 1706.

Figure 18:
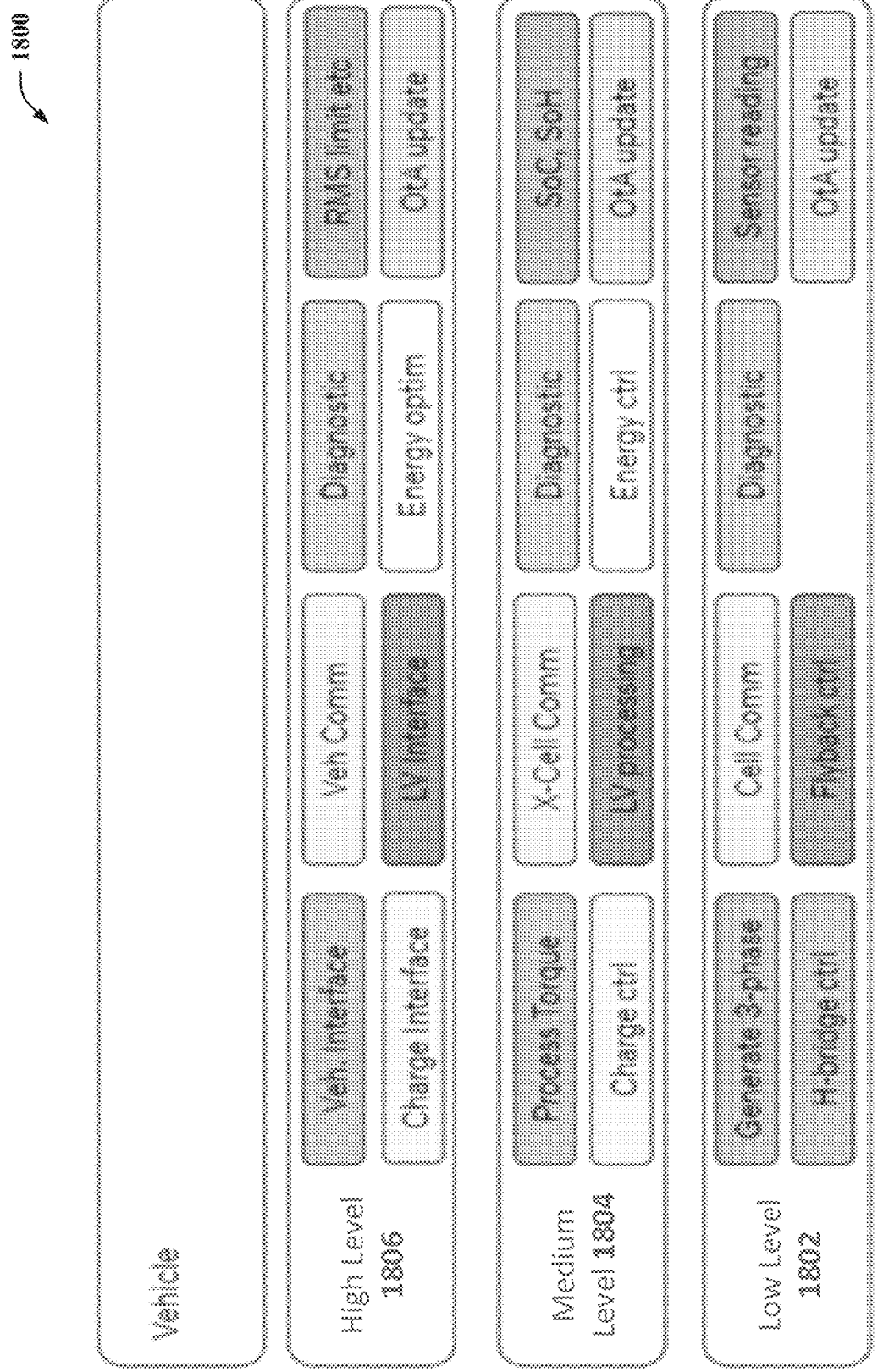
FIG. 18 illustrates an example, non-limiting wire diagram that can facilitate an intelligent battery cell with integrated monitoring and switches in accordance with one or more embodiments described herein.

FIG. 18 illustrates an example, non-limiting diagram 1800 that can facilitate an intelligent battery cell with integrated monitoring and switches in accordance with one or more embodiments described herein. Repetitive description of like elements and/or processes employed in respective embodiments is omitted for sake of brevity.

Diagram 1800 can comprise a hierarchy of functions that can be performed in accordance with one or more embodiments of the subject disclosure described herein. In some embodiments, diagram 1800 can comprise a low level 1802 of functions, a medium level 1804 of functions, and/or a high level 1806 of functions, where the complexity of such functions can increase from low level 1802 to high level 1806. For example, functions of low level 1802 can be less complex than those of medium level 1804 and functions of medium level 1804 can be less complex than those of high level 1806.

Low level 1802 can comprise low complexity functions that can be performed by, for instance, implementing one or more software applications that can facilitate such low complexity functions in low level 1802. For example, one or more software applications that can comprise a low level of complexity can be implemented to facilitate one or more functions of low level 1802 including, but not limited to: generating 3-phase (denoted as "Generate 3-phase" in FIG. 18); H-bridge control (denoted as "H-bridge ctrl" in FIG. 18); cell communication (denoted as "Cell Comm" in FIG. 18); flyback control (denoted as "Flyback ctrl" in FIG. 18); diagnostics (denoted as "Diagnostic" in FIG. 18); sensor reading; over-the-air updates (denoted as "OtA update" in FIG. 18); and/or another function.

Medium level 1804 can comprise medium complexity functions that can be performed by, for instance, implementing one or more software applications that can facilitate such medium complexity functions in medium level 1804. For example, one or more software applications that can comprise a medium level of complexity can be implemented to facilitate one or more functions of medium level 1804 including, but not limited to: processing torque (denoted as "Process Torque" in FIG. 18); charge control (denoted as "Charge ctrl" in FIG. 18); cross-cell communication (denoted as "X-Cell Comm" in FIG. 18); low voltage processing (denoted as "LV processing" in FIG. 18); diagnostics (denoted as "Diagnostic" in FIG. 18); energy control (denoted as "Energy ctrl" in FIG. 18); state of charge and/or state of health (denoted as "SoC, SoH" in FIG. 18); over-the-air updates (denoted as "OtA update" in FIG. 18); and/or another function.

High level 1806 can comprise high complexity functions that can be performed by, for instance, implementing one or more software applications that can facilitate such high complexity functions in high level 1806. For example, one or more software applications that can comprise a high level of complexity can be implemented to facilitate one or more functions of high level 1806 including, but not limited to: vehicle interface (denoted as "Veh. Interface" in FIG. 18); charge interface (denoted as "Charge Interface" in FIG. 18); vehicle communication (denoted as "Veh Comm" in FIG. 18); low voltage interface (denoted as "LV Interface" in FIG. 18); diagnostics (denoted as "Diagnostic" in FIG. 18); energy optimization (denoted as "Energy optim" in FIG. 18); root mean square (RMS) limit (denoted as "RMS limit etc" in FIG. 18); over-the-air updates (denoted as "OtA update" in FIG. 18); and/or another function.

Figure 19:
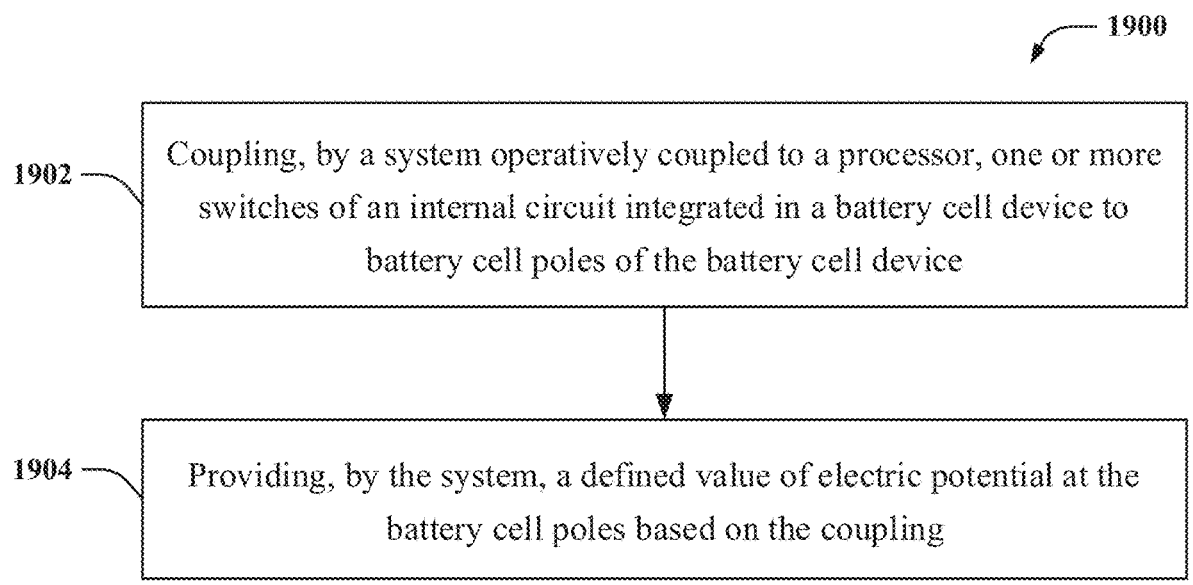
FIGS. 19-27 illustrate flow diagrams of example, non-limiting computer-implemented methods that can facilitate an intelligent battery cell with integrated monitoring and switches in accordance with one or more embodiments described herein.

FIG. 19 illustrates a flow diagram of an example, non-limiting computer-implemented method 1900 that can facilitate an intelligent battery cell with integrated monitoring and switches in accordance with one or more embodiments described herein. Repetitive description of like elements and/or processes employed in respective embodiments is omitted for sake of brevity.

At 1902, computer-implemented method 1900 can comprise coupling, by a system (e.g., via device 100, smart cell module 104, etc.) operatively coupled to a processor (e.g., processor 302), one or more switches (e.g., one or more switches 308) of an internal circuit (e.g., smart cell module 104) integrated in a battery cell device (e.g., device 100) to battery cell poles (e.g., cell poles 102a, 102b) of the battery cell device.

At 1904, computer-implemented method 1900 can comprise providing, by the system (e.g., via device 100, smart cell module 104, etc.), a defined value (e.g., a value of zero (0), a positive value, a negative value, etc.) of electric potential at the battery cell poles based on the coupling.

Figure 20:
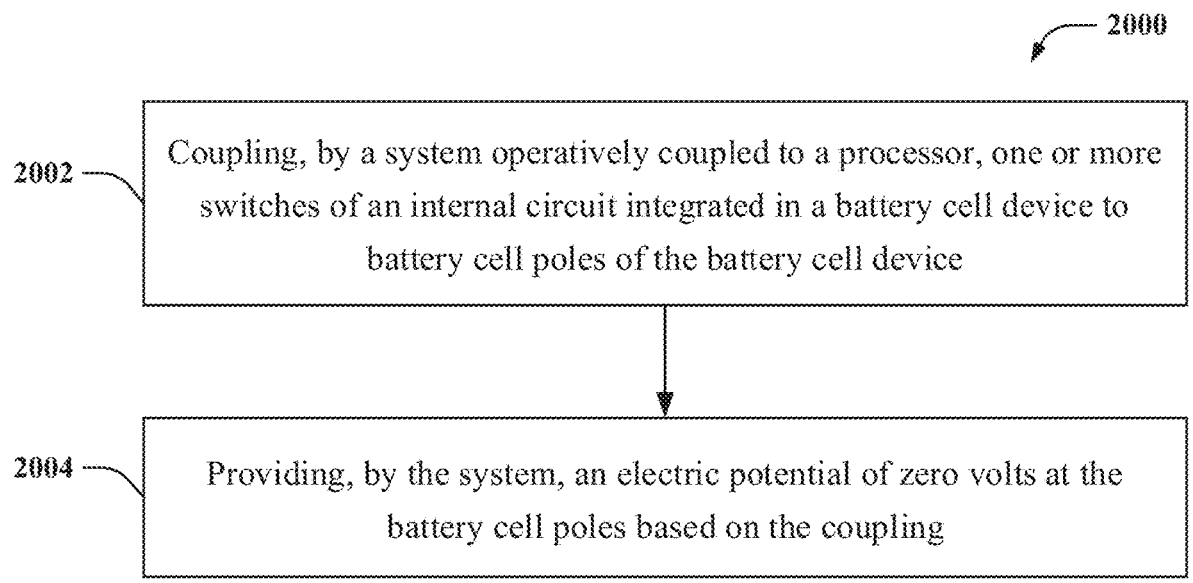

FIG. 20 illustrates a flow diagram of an example, non-limiting computer-implemented method 2000 that can facilitate an intelligent battery cell with integrated monitoring and switches in accordance with one or more embodiments described herein. Repetitive description of like elements and/or processes employed in respective embodiments is omitted for sake of brevity.

At 2002, computer-implemented method 2000 can comprise coupling, by a system (e.g., via device 100, smart cell module 104, etc.) operatively coupled to a processor (e.g., processor 302), one or more switches (e.g., one or more switches 308) of an internal circuit (e.g., smart cell module 104) integrated in a battery cell device (e.g., device 100) to battery cell poles (e.g., cell poles 102a, 102b) of the battery cell device.

At 2004, computer-implemented method 2000 can comprise providing, by the system (e.g., via device 100, smart cell module 104, etc.) an electric potential of zero volts at the battery cell poles based on the coupling.

Figure 21:
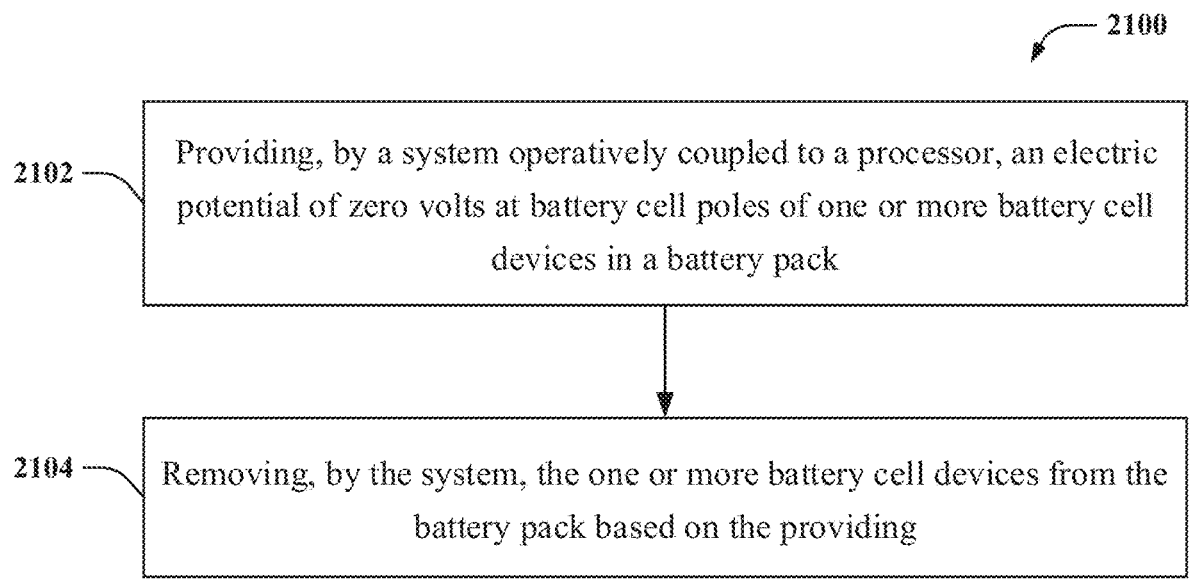

FIG. 21 illustrates a flow diagram of an example, non-limiting computer-implemented method 2100 that can facilitate an intelligent battery cell with integrated monitoring and switches in accordance with one or more embodiments described herein. Repetitive description of like elements and/or processes employed in respective embodiments is omitted for sake of brevity.

At 2102, computer-implemented method 2100 can comprise providing, by a system (e.g., via a system comprising a computer coupled to device 100, smart cell module 104, and/or machinery (e g., manufacturing equipment) operated by the computer to fabricate and/or maintain a battery pack comprising device 100) operatively coupled to a processor (e.g., processor 302), an electric potential of zero volts at battery cell poles (e.g., cell poles 102a, 102b) of one or more battery cell devices (e.g., one or more devices 100) in a battery pack (e.g., battery pack 908).

At 2104, computer-implemented method 2100 can comprise removing, by the system (e.g., via a system comprising a computer coupled to device 100, smart cell module 104, and/or machinery (e.g., manufacturing equipment) operated by the computer to fabricate and/or maintain a battery pack comprising device 100), the one or more battery cell devices from the battery pack based on the providing.

Figure 22:
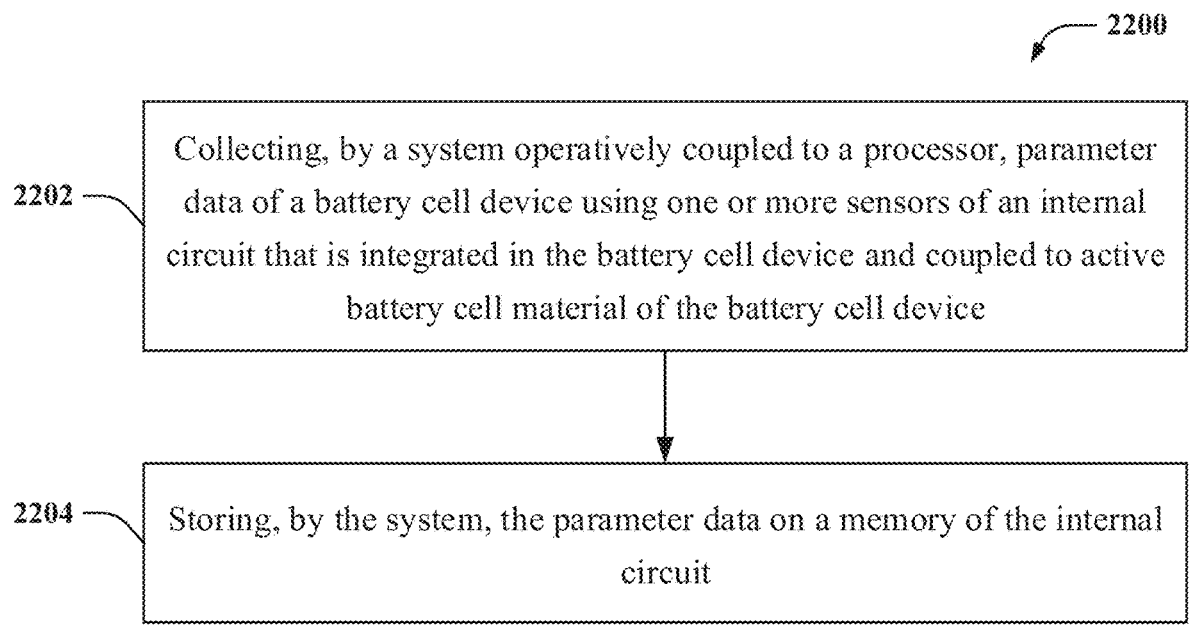

FIG. 22 illustrates a flow diagram of an example, non-limiting computer-implemented method 2200 that can facilitate an intelligent battery cell with integrated monitoring and switches in accordance with one or more embodiments described herein. Repetitive description of like elements and/or processes employed in respective embodiments is omitted for sake of brevity.

At 2202, computer-implemented method 2200 can comprise collecting, by a system (e.g., via device 100, smart cell module 104, one or more sensors 306, etc.) operatively coupled to a processor (e.g., processor 302), parameter data (e.g., parameter data defined above with reference to FIG. 1 such as, for instance, temperature, pressure, chemistry, acceleration, current, voltage, etc.) of a battery cell device (e.g., device 100) using one or more sensors (e.g., one or more sensors 306) of an internal circuit (e.g., smart cell module 104) that is integrated in the battery cell device and coupled to active battery cell material (e.g., active cell material 106) of the battery cell device.

At 2204, computer-implemented method 2200 can comprise storing, by the system (e.g., via device 100, smart cell module 104, etc.), the parameter data on a memory (e.g., memory 304) of the internal circuit.

Figure 23:
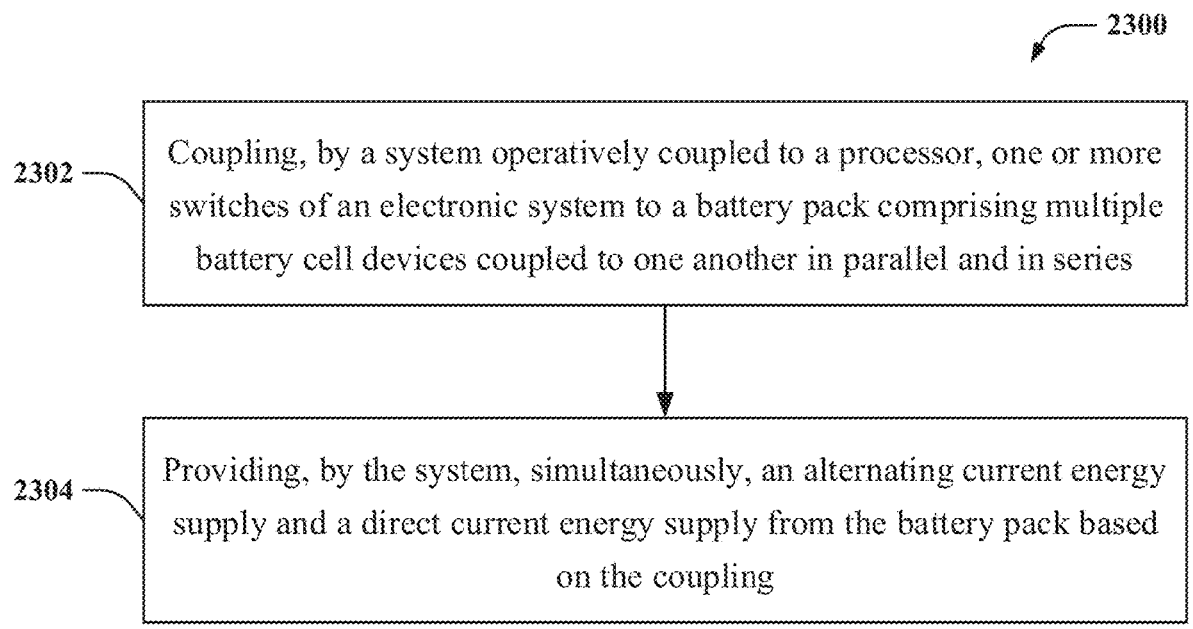

FIG. 23 illustrates a flow diagram of an example, non-limiting computer-implemented method 2300 that can facilitate an intelligent battery cell with integrated monitoring and switches in accordance with one or more embodiments described herein. Repetitive description of like elements and/or processes employed in respective embodiments is omitted for sake of brevity.

At 2302, computer-implemented method 2300 can comprise coupling, by a system (e.g., via a system such as, for instance, an electric driveline in an EV that comprises control unit 1202 coupled to battery pack 908, device 100, and/or smart cell module 104) operatively coupled to a processor (e.g., control unit 1202, processor 302, etc.), one or more switches (e.g., one or more switches 1704) of an electronic system (e.g., an electric driveline in an EV) to a battery pack (e.g., battery pack 908) comprising multiple battery cell devices (e.g., multiple devices 100) coupled to one another in parallel and in series (e.g., as described above with reference to FIGS. 3-9 and 13-17 and as illustrated by wire diagram 1700 depicted in FIG. 17).

At 2304, computer-implemented method 2300 can comprise providing, by the system (e.g., via a system such as, for instance, an electric driveline in an EV that comprises control unit 1202 coupled to battery pack 908, device 100, and/or smart cell module 104), simultaneously, an alternating current (AC) energy supply and a direct current (DC) energy supply from the battery pack based on the coupling (e.g., as described above with reference to FIG. 17).

Figure 24:
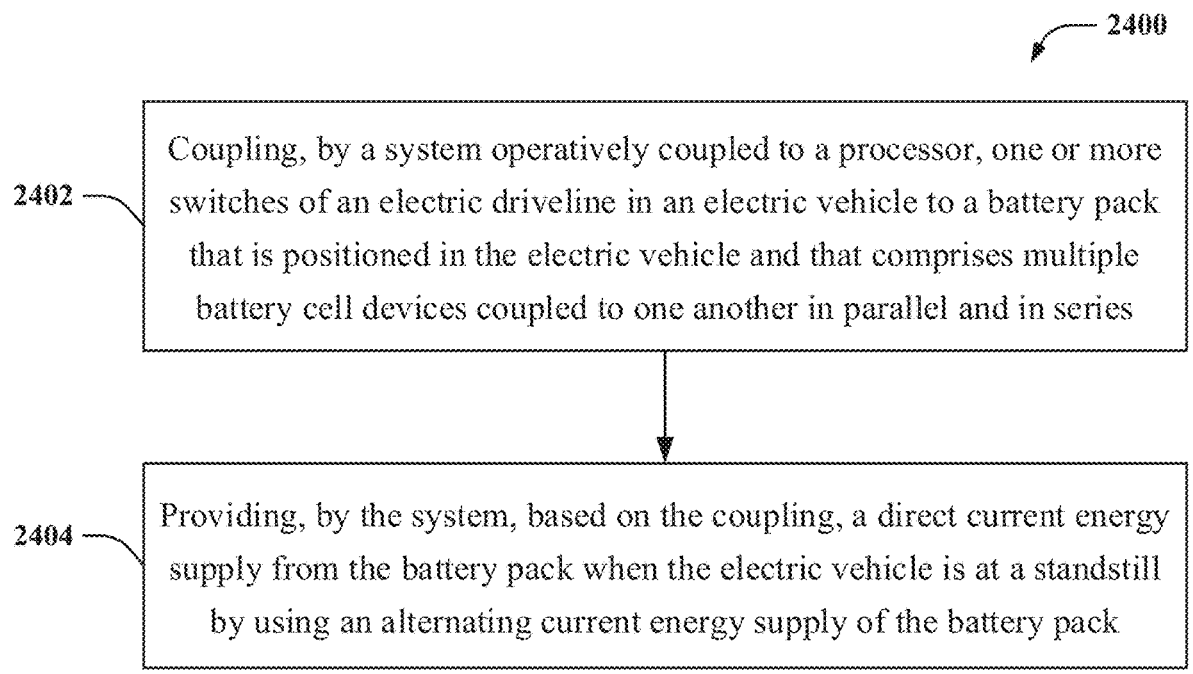

FIG. 24 illustrates a flow diagram of an example, non-limiting computer-implemented method 2400 that can facilitate an intelligent battery cell with integrated monitoring and switches in accordance with one or more embodiments described herein. Repetitive description of like elements and/or processes employed in respective embodiments is omitted for sake of brevity.

At 2402, computer-implemented method 2400 can comprise coupling, by a system (e.g., via a system such as, for instance, an electric driveline in an EV that comprises control unit 1202 coupled to battery pack 908, device 100, and/or smart cell module 104) operatively coupled to a processor (e.g., control unit 1202, processor 302, etc.), one or more switches (e.g., one or more switches 1704) of an electric driveline in an electric vehicle (EV) to a battery pack (e.g., battery pack 908) that is positioned in the EV and that comprises multiple battery cell devices (e.g., multiple devices 100) coupled to one another in parallel and in series (e.g., as described above with reference to FIGS. 3-9 and 13-17 and as illustrated by wire diagram 1700 depicted in FIG. 17).

At 2404, computer-implemented method 2400 can comprise providing, by the system (e.g., via a system such as, for instance, an electric driveline in an EV that comprises control unit 1202 coupled to battery pack 908, device 100, and/or smart cell module 104), providing, by the system, based on the coupling, a direct current (DC) energy supply from the battery pack when the electric vehicle is at a standstill (e.g., when the EV is static, motionless, parked, etc.) by using an alternating current (AC) energy supply of the battery pack (e.g., as described above with reference to FIG. 17).

Figure 25:
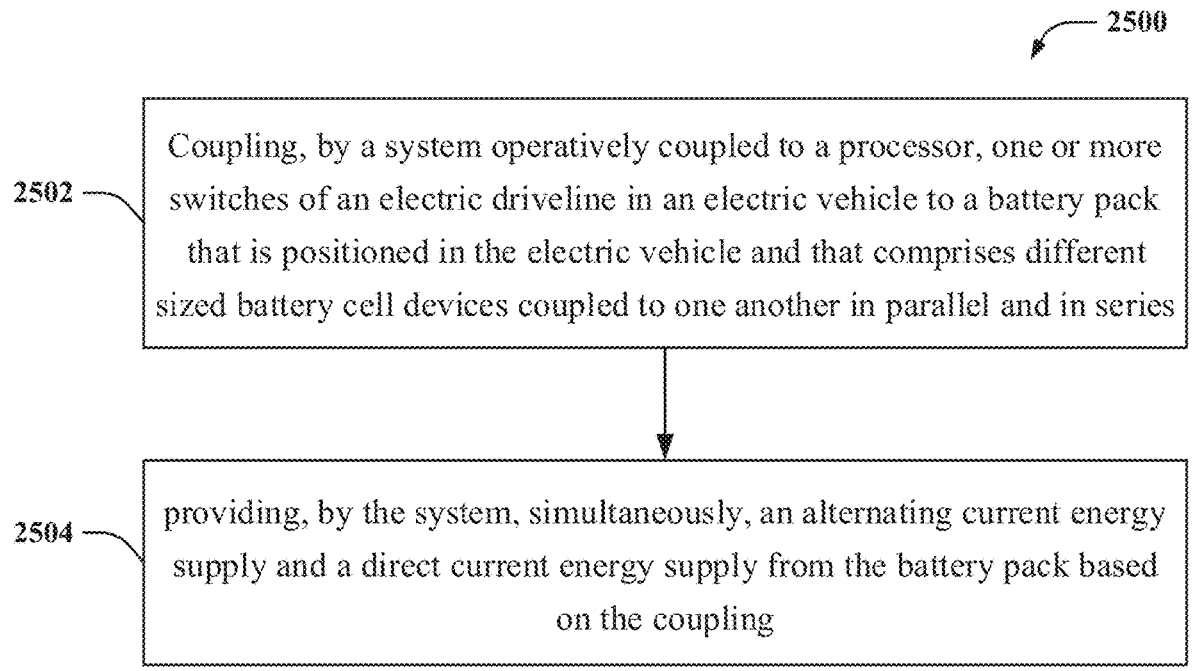

FIG. 25 illustrates a flow diagram of an example, non-limiting computer-implemented method 2500 that can facilitate an intelligent battery cell with integrated monitoring and switches in accordance with one or more embodiments described herein. Repetitive description of like elements and/or processes employed in respective embodiments is omitted for sake of brevity.

At 2502, computer-implemented method 2500 can comprise coupling, by a system (e.g., via a system such as, for instance, an electric driveline in an EV that comprises control unit 1202 coupled to battery pack 908, device 100, and/or smart cell module 104) operatively coupled to a processor (e.g., control unit 1202, processor 302, etc.), one or more switches (e.g., one or more switches 1704) of an electric driveline in an electric vehicle (EV) to a battery pack (e.g., battery pack 1102c) that is positioned in the electric vehicle and that comprises different sized battery cell devices (e.g., different sized devices 100 in battery pack 1102c) coupled to one another in parallel and in series (e.g., as described above with reference to FIGS. 3-11C and 13-17 and as illustrated by wire diagram 1700 depicted in FIG. 17).

At 2504, computer-implemented method 2500 can comprise providing, by the system (e.g., via a system such as, for instance, an electric driveline in an EV that comprises control unit 1202 coupled to battery pack 908, device 100, and/or smart cell module 104), simultaneously, an alternating current (AC) energy supply and a direct current (DC) energy supply from the battery pack based on the coupling (e.g., as described above with reference to FIGS. 3-11C and 13-17 and as illustrated by wire diagram 1700 depicted in FIG. 17).

Figure 26:
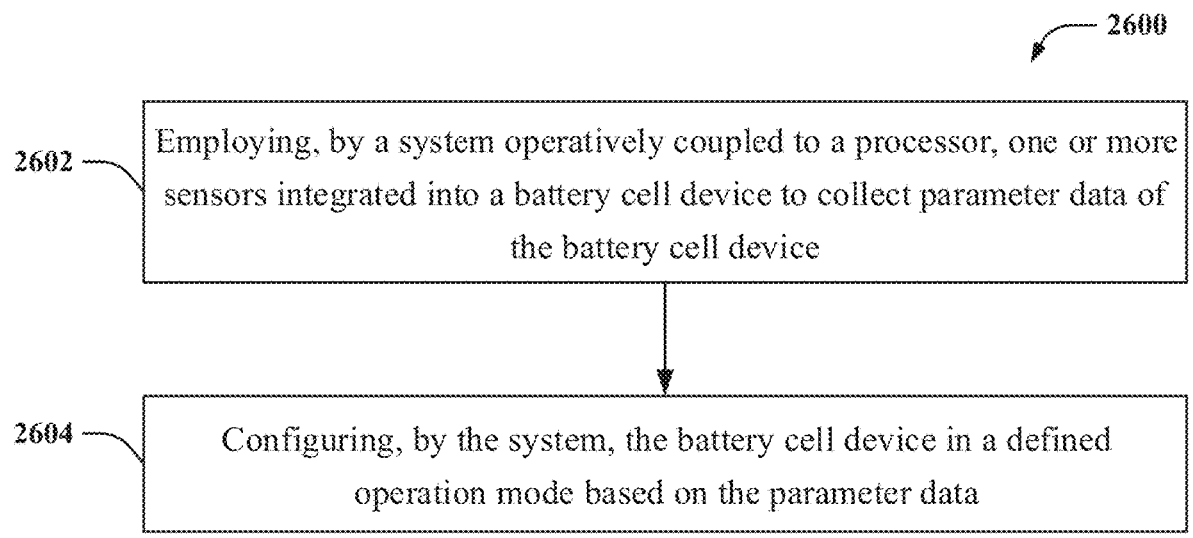

FIG. 26 illustrates a flow diagram of an example, non-limiting computer-implemented method 2600 that can facilitate an intelligent battery cell with integrated monitoring and switches in accordance with one or more embodiments described herein. Repetitive description of like elements and/or processes employed in respective embodiments is omitted for sake of brevity.

At 2602, computer-implemented method 2600 can comprise employing, by a system (e.g., via device 100, smart cell module 104, the monitoring component described above with reference to FIG. 1, etc.) operatively coupled to a processor (e.g., processor 302), one or more sensors (e.g., one or more sensors 306) integrated into a battery cell device (e.g., device 100) to collect parameter data of the battery cell device (e.g., parameter data defined above with reference to FIG. 1 such as, for instance, temperature, pressure, chemistry, acceleration, current, voltage, etc.).

At 2604, computer-implemented method 2600 can comprise configuring, by the system (e.g., via device 100, smart cell module 104, the machine learning component described above with reference to FIG. 1, etc.), the battery cell device in a defined operation mode (e.g., off mode 402, positive mode 404, negative mode 406, bypass mode 408, etc.) based on the parameter data.

Figure 27:
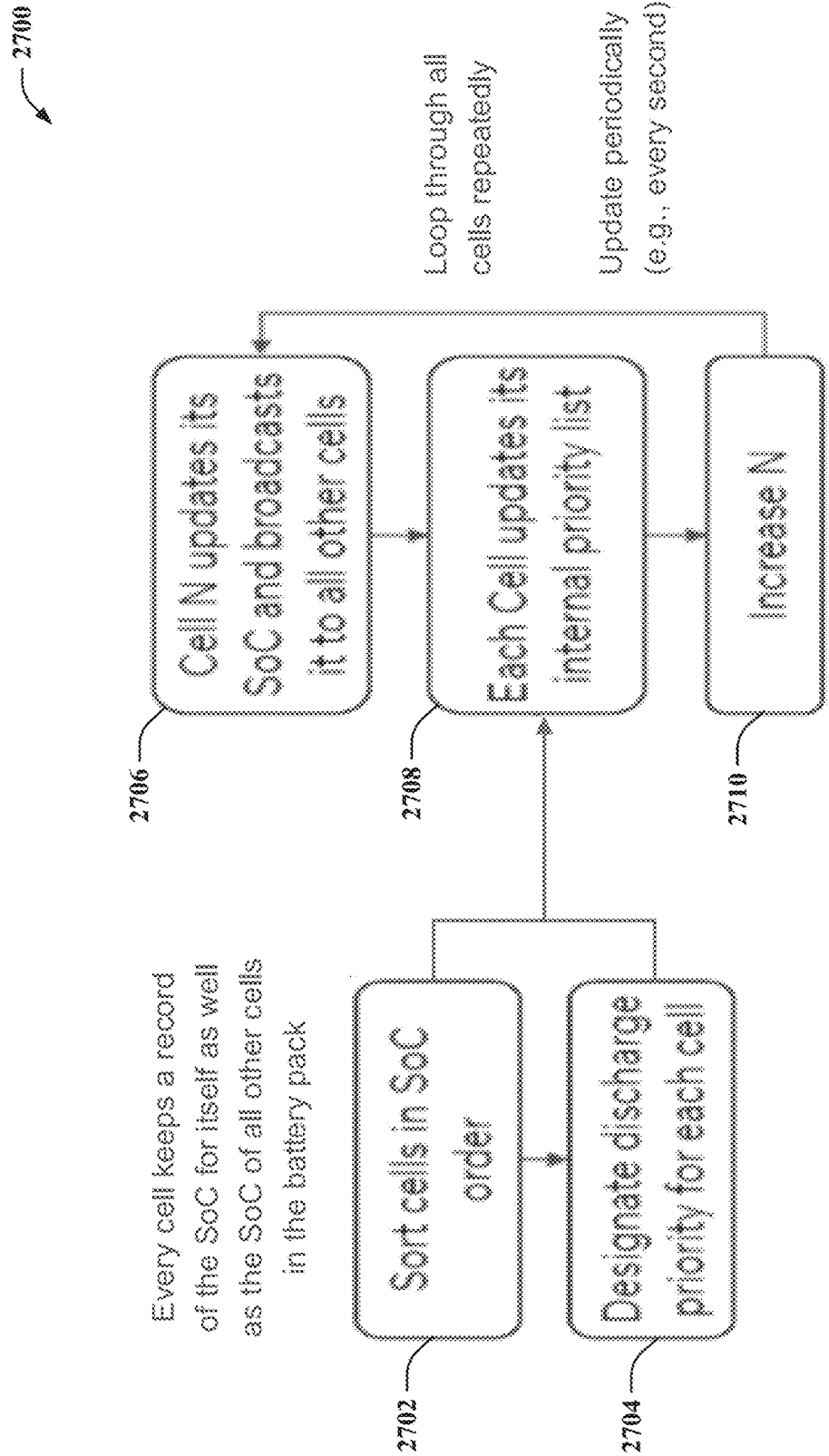

FIG. 27 illustrates a flow diagram of an example, non-limiting computer-implemented method 2700 that can facilitate an intelligent battery cell with integrated monitoring and switches in accordance with one or more embodiments described herein. Repetitive description of like elements and/or processes employed in respective embodiments is omitted for sake of brevity.

At 2702, computer-implemented method 2700 can comprise sorting cells (e.g., devices 100) in SoC order. For example, each device 100 in a battery pack (e.g., battery pack 908) can store (e.g., on memory 304) a record (e.g., a list, a database, etc.) having its own SoC and that of all other devices 100 in the battery pack, where the multiple devices 100 in such a battery pack can collectively constitute, for instance, a multicore processing system and/or a distributed computing network system. In this example, such a record can constitute an original record that can be generated at a certain time t0 (e.g., at the start of computer-implemented method 2700), where such a record can comprise an original SoC of each device 100 that can be determined at such a certain time t0 (e.g., each device 100 can send its original SoC to all other devices 100 in the battery pack at such a certain time t0 and each device 100 can generate such a record comprising the SoC status of all devices 100). In this example, by using such a record, each device 100 can sort (e.g., rank) all devices 100 in the battery pack according to the SoC of each device 100. For instance, each device 100 can rank all devices 100 in order from highest SoC to lowest SoC or vice versa.

At 2704, computer-implemented method 2700 can comprise designating discharge priority for each cell (e.g., for each device 100). For example, each device 100 in a battery pack (e.g., battery pack 908) can store (e.g., on memory 304) a record (e.g., a list, a database, etc.) comprising a discharge priority corresponding to each device 100 in the battery pack, where the multiple devices 100 in such a battery pack can collectively constitute, for instance, a multicore processing system and/or a distributed computing network system. In this example, such a discharge priority can be generated and/or revised by each device 100 based on the SoC status of all devices 100 in the battery pack. For instance, such a discharge priority can be generated (e.g., by each device 100 as described above at 2704) and/or revised (e.g., by each device 100 at some time subsequent to the above described time t0, as described below at 2708) based on the sorting operation performed at 2702 described above (e.g., which can be based on the original SoC status of each device 100 in the battery pack at a certain time t0) or based on a certain device 100 updating its SoC as described below at 2706 and 2708.

At 2706, computer-implemented method 2700 can comprise a certain cell N (e.g., a certain device 100 that can be denoted as "N") updating its SoC and broadcasting it to all other cells. For example, at some time ti that can be subsequent to the above described t0, a certain device 100 that can be denoted as "N" in a battery pack (e.g., battery pack 908) that can comprise multiple devices 100 can update its original SoC status on the record it can store on memory 304 as described above at 2702, where the multiple devices 100 in such a battery pack can collectively constitute, for instance, a multicore processing system and/or a distributed computing network system. Additionally, or alternatively, such a certain device 100 that can be denoted as "N" can periodically (e.g., every second) update its current SoC status on the record it can store on memory 304 as described above at 2702. Each device 100 in the battery pack can further distribute to all devices 100 in the battery pack its revised SoC status and/or a revised version of the record described above at 2702 comprising the SoC status of each device 100 in the battery pack, where such a revised version of such a record can comprise the revised SoC status of such a certain device 100 that can be denoted as "N."

At 2708, computer-implemented method 2700 can comprise each cell updating its internal priority list (e.g., the discharge priority that can be stored on memory 304 as described above at 2704). For example, each device 100 in a battery pack (e.g., battery pack 908) comprising multiple devices 100 can update its internal discharge priority based on the certain device 100 that can be denoted as "N" updating its SoC status and broadcasting such a revised SoC status to all other devices 100 in the battery pack as described above at 2708. In this example, the multiple devices 100 in such a battery pack can collectively constitute, for instance, a multicore processing system and/or a distributed computing network system. In these examples, each device 100 can update its own internal discharge priority that can be stored on memory 304 to reflect such a revised SoC status of such a certain device 100 that can be denoted as "N."

At 2710, computer-implemented method 2700 can comprise increasing N (e.g., increasing, by the certain device 100 that can be denoted as "N," the duty cycle of such a certain device 100). For example, as each device 100 in a battery pack (e.g., battery pack 908) can control (e.g., increase, decrease, etc.) its own electrical power output (e.g., AC and/or DC power output, as described above with reference to FIGS. 1-10C) such a certain device 100 that can be denoted as "N" can increase its own duty cycle (e.g., amplitude, duration, etc.). In this example, one or more other devices 100 in such a battery pack can then decrease their own duty cycle accordingly to, for instance, maintain a certain electrical output (e.g., AC and/or DC electrical output) of the respective devices 100 and/or of the battery pack. In these examples, the multiple devices 100 in such a battery pack (e.g., battery pack 908) can collectively constitute, for instance, a multicore processing system and/or a distributed computing network system.

In some embodiments, steps 2706 to 2710 can be repeated periodically (e.g., every second) to, for instance, maintain a certain electrical output (e.g., AC and/or DC electrical output) of the respective devices 100 and/or a certain electrical output of the battery pack.

It should be appreciated that computer-implemented method 2700 can be implemented as a balancing algorithm (e.g., a distributed algorithm). For example, computer-implemented method 2700 can be implemented to balance (e.g., modify, adjust, etc.) the electric power output (e.g., AC and/or DC power output) of each device 100 in a battery pack (e.g., battery pack 908) and/or to balance (e.g., modify, adjust, etc.) the electric power output (e.g., AC and/or DC power output) of the battery pack. In some embodiments, computer-implemented method 2700 can be implemented to perform such balancing of the electric power output of each device 100 and/or the electric power output of such a battery pack comprising multiple devices 100 without using a control unit (e.g., a VCU) to facilitate such balancing.

Figure 28:
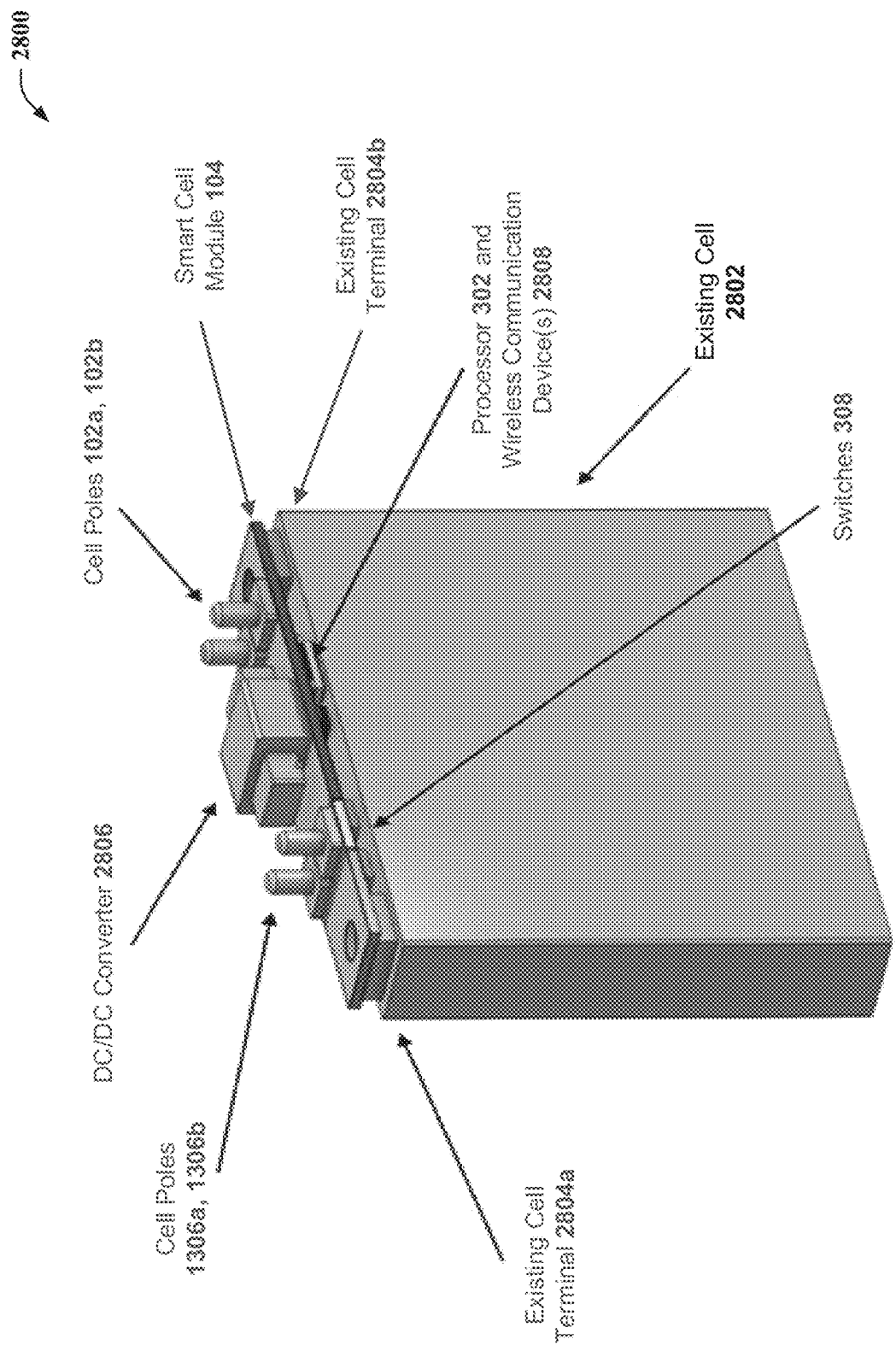
FIG. 28 illustrates an orthogonal view of an example, non-limiting device that can facilitate an intelligent battery cell with integrated monitoring and switches in accordance with one or more embodiments described herein.

FIG. 28 illustrates an orthogonal view of an example, non-limiting device 2800 that can facilitate an intelligent battery cell with integrated monitoring and switches in accordance with one or more embodiments described herein. Repetitive description of like elements and/or processes employed in respective embodiments is omitted for sake of brevity.

Device 2800 illustrated in FIG. 28 can comprise an example, non-limiting alternative embodiment of device 100 described above with reference to FIG. 1. For example, as illustrated in the example embodiment depicted in FIG. 28, device 2800 can comprise an existing cell 2802 having smart cell module 104 coupled thereto (e.g., where smart cell module 104 can comprise an add-on component that can be coupled to an already existing battery cell (e.g., a standard battery cell) denoted as existing cell 2802 in FIG. 28). Existing cell 2802 can comprise the same structure and/or functionality as that of active cell material 106 described above with reference to FIG. 1.

As illustrated in the example embodiment depicted in FIG. 28, smart cell module 104 can be coupled to existing cell 2802 via existing cell terminals 2804a, 2804b. Existing cell terminals 2804a, 2804b can comprise the same structure and/or functionality as that of cell material poles 106a, 106b described above with reference to FIG. 1. In some embodiments, cell poles 102a, 102b (e.g., DC terminals) and/or cell poles 1306a, 1306b (e.g., AC terminals) can be formed on and/or coupled to smart cell module 104 as depicted in FIG. 28. In some embodiments, cell poles 102a, 102b (e.g., DC terminals) and/or cell poles 1306a, 1306b (e.g., AC terminals) can be formed on and/or coupled to smart cell module 104 at another location on smart cell module 104 and/or in another orientation.

Device 2800 can further comprise a converter such as, for instance, a DC/DC converter 2806 that can be coupled to, formed on, and/or integrated with smart cell module 104. In an embodiment, DC/DC converter 2806 can be coupled to one or more components of device 100 and/or smart cell module 104 (e.g., to cell poles 102a, 102b, one or more switches 308, etc.). DC/DC converter 2806 can comprise a DC/DC converter or another type of converter. In some embodiments, DC/DC converter 2806 can be coupled to smart cell module 104, for example, as illustrated in FIG. 28. In some embodiments, DC/DC converter 2806 can be coupled to smart cell module 104 at another location on smart cell module 104 and/or in another orientation (e.g., vertically, etc.).

DC/DC converter 2806 can convert a source of DC voltage that can be yielded by device 100 and/or smart cell module 104 from one voltage level to another voltage level (e.g., from a lower DC voltage level to a higher DC voltage level or vice versa). In some embodiments, a battery pack (e.g., battery pack 908) that can comprise multiple device 100 can also comprise DC/DC converter 2806. In these embodiments, DC/DC converter 2806 can convert a source of DC voltage that can be yielded by such a battery pack (e.g., a source of DC voltage that can be yielded by one or more devices 100 in the battery pack) from one voltage level to another voltage level (e.g., from a lower DC voltage level to a higher DC voltage level or vice versa).

In the example embodiment depicted in FIG. 28, smart cell module 104 of device 2800 can comprise one or more wireless communication devices 2808. Such one or more wireless communication devices 2808 can comprise, for example, one or more transmitters, receivers, transceivers, antenna, and/or another wireless communication device that can facilitate wireless communication (e.g., via network 112) between multiple devices 2800 (e.g., as described above with reference to device 100 and FIGS. 1 and 3).

Figure 29:
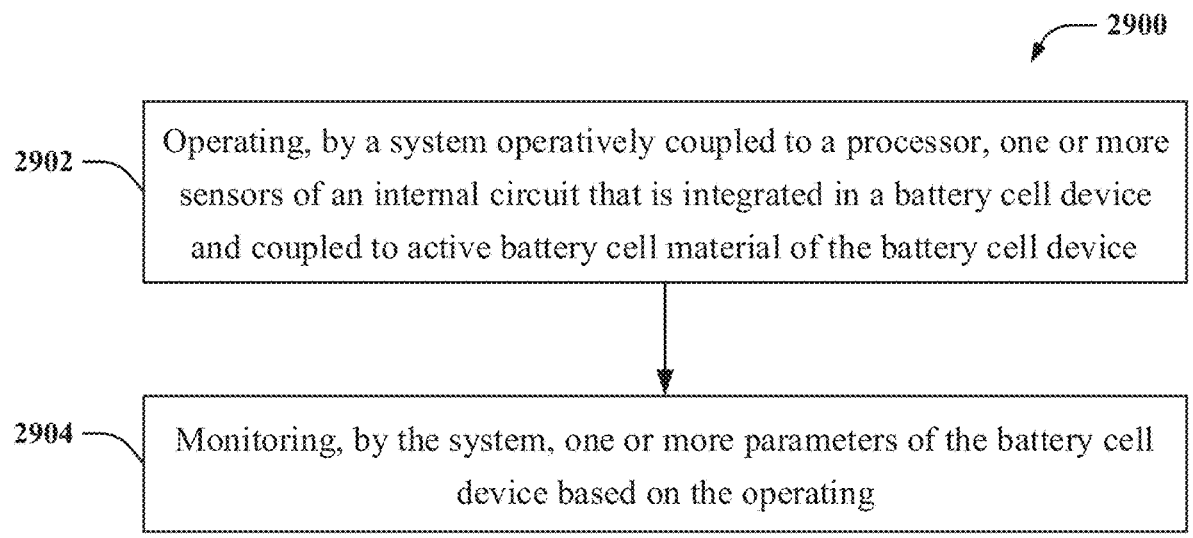
FIGS. 29-30 illustrate flow diagrams of example, non-limiting computer-implemented methods that can facilitate an intelligent battery cell with integrated monitoring and switches in accordance with one or more embodiments described herein.

FIG. 29 illustrates a flow diagram of an example, non-limiting computer-implemented method 2900 that can facilitate an intelligent battery cell with integrated monitoring and switches in accordance with one or more embodiments described herein. Repetitive description of like elements and/or processes employed in respective embodiments is omitted for sake of brevity.

At 2902, computer-implemented method 2900 can comprise operating, by a system (e.g., via device 100, smart cell module 104, processor 302, etc.) operatively coupled to a processor (e.g., processor 302), one or more sensors (e.g., one or more sensors 306) of an internal circuit (e.g., smart cell module 104) that is integrated in a battery cell device (e.g., device 100) and coupled to active battery cell material (e.g., active cell material 106) of the battery cell device.

At 2904, computer-implemented method 2900 can comprise monitoring, by the system (e.g., via device 100, smart cell module 104, processor 302, one or more sensors 306, etc.), one or more parameters (e.g., parameter data defined above with reference to FIG. 1 such as, for instance, temperature, pressure, chemistry, acceleration, current, voltage, etc.) of the battery cell device based on the operating.

Figure 30:
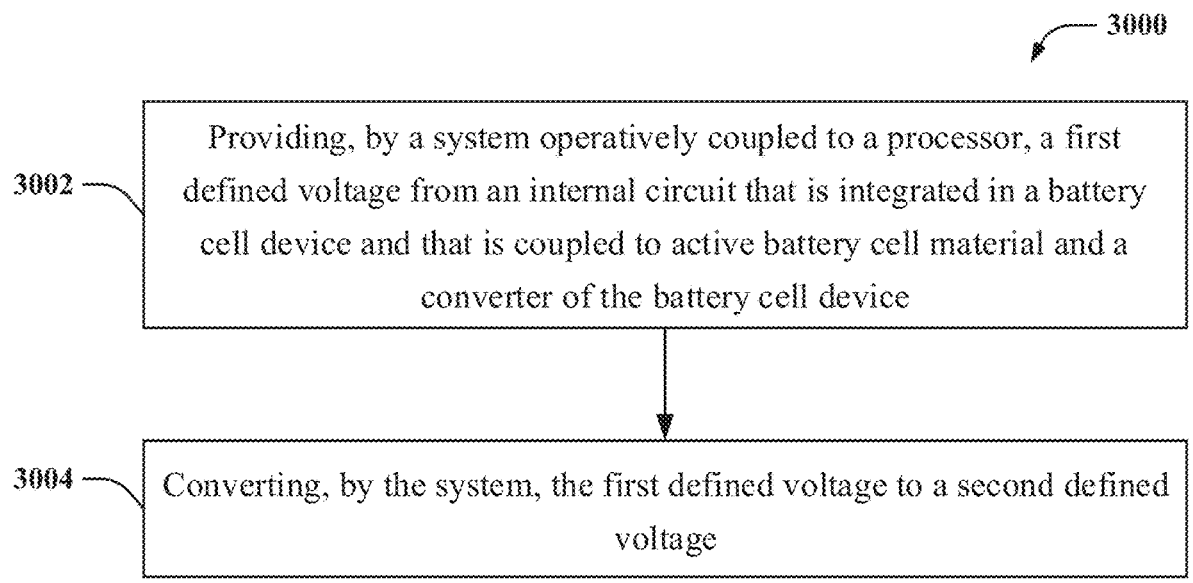

FIG. 30 illustrates a flow diagram of an example, non-limiting computer-implemented method 3000 that can facilitate an intelligent battery cell with integrated monitoring and switches in accordance with one or more embodiments described herein. Repetitive description of like elements and/or processes employed in respective embodiments is omitted for sake of brevity.

At 3002, computer-implemented method 3000 can comprise providing, by a system (e.g., via device 100, smart cell module 104, processor 302, one or more switches 308, etc.) operatively coupled to a processor (e.g., processor 302), a first defined voltage (e.g., a low voltage, a high voltage, etc.) from an internal circuit (e.g., smart cell module 104) that is integrated in a battery cell device (e.g., device 100) and that is coupled to active battery cell material (e.g., active cell material 106) and a converter (e.g., DC/DC converter 2806) of the battery cell device.

At 3004, computer-implemented method 3000 can comprise converting, by the system (e.g., via device 100, smart cell module 104, processor 302, one or more switches 308, DC/DC converter 2806, etc.), the first defined voltage to a second defined voltage (e.g., a high voltage, a low voltage, etc.).

The various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can be associated with various technologies. For example, the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can be associated with battery device and/or battery cell device technologies, battery pack technologies, battery management system (BMS) technologies, electric driveline technologies, electric vehicle technologies, semiconducting and/or superconducting circuit technologies, computing device and/or communication device technologies, machine learning technologies, artificial intelligence technologies, cloud computing technologies, and/or other technologies.

The various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can provide technical improvements to systems, devices, components, operational steps, and/or processing steps associated with the various technologies identified above. For example, the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can enable an intelligent battery cell with integrated monitoring and switches. For instance, as described herein, a battery cell device (e.g., device 100) can monitor (e.g., via one or more sensors 306) and/or log itself using an internal circuit (e.g., smart cell module 104) comprising a processor (e.g., processor 302) and a memory (e.g., memory 304). The battery cell device (e.g., device 100) can control its connection (e.g., via one or more switches 308) to other battery cell devices (e.g., to one or more other devices 100) using different operation modes (e.g., off mode 402, positive mode 404, negative mode 406, or bypass mode 408). Connection to other battery cell devices allows a battery pack comprising the battery cell device (e.g., battery pack 908) to vary in voltage and/or to provide an AC and/or DC power supply, thereby eliminating the need for many auxiliary systems (e.g., converter, inverter, DC battery, etc.) in an electronic system (e.g., an electric driveline in an EV) comprising the battery cell device (e.g., device 100).

In another example, as device 100 can comprise a modular component that can function and/or be controlled independent of all other battery devices and/or battery cell devices (e.g., other devices 100) that can be in a battery pack (e.g., battery pack 908), device 100 can be removed from such a battery pack and/or replaced without affecting the structure and/or functionality of the battery pack and/or any other devices 100 in the battery pack. In another example, as device 100 can use its own electric energy to power one or more of its components (e.g., active cell material 106, processor 302, memory 304, sensor(s) 306, switch(es) 308, etc.), device 100 can thereby eliminate galvanic contact of such component(s) with one or more devices that are external to device 100 (e.g., another battery device and/or battery cell device in a battery pack comprising device 100). By eliminating such galvanic contact, device 100 can thereby provide enhanced safety when compared to prior art battery device and/or battery cell device technologies. Additionally, or alternatively, by eliminating such galvanic contact, device 100 can thereby eliminate hardware such as, for instance, cables, which are used in existing battery pack and/or battery management system (BMS) technologies (e.g., BMS wires coupled to one or more battery devices and/or battery cell devices in a battery pack).

In another example, as device 100 can be configured (e.g., set) to operate in a bypass mode (e.g., bypass mode 408), it can mitigate risk of injury and/or damage to a person and/or property during, for instance, installation and/or maintenance of device 100. In another example, each device 100 in a battery pack (e.g., battery packs 908, 1102c) can use of all of its electric energy, device 100 can thereby eliminate the use of balancing techniques (e.g., load balancing techniques) employed by existing battery packs (e.g., existing battery pack 1102a and/or 1102b described above and illustrated in FIGS. 11A and 11B, respectively). Additionally, or alternatively, in this example, any variation in electrical capacity of each device 100 in such a battery pack will not be a limit to the electrical capacity of the battery pack.

The various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can provide technical improvements to a processing unit (e.g., processor 302) associated with one or more of the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.). For example, as described above with reference to FIG. 12, the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can facilitate transfer of processing functions across one or more devices 100 in a battery pack (e.g., battery pack 908). Therefore, in this example, device 100 can reduce the processing work load of a processor that can be external to device 100 (e.g., a processor in a computing device and/or a communication device associated with and/or powered by a battery pack comprising device 100), thereby facilitating improved efficiency and/or performance of such an external processor and/or reduced computational costs of such a processor.

Based on such above described technical improvements to systems, devices, components, operational steps, and/or processing steps associated with the various technologies identified above, and/or to a processing unit associated with one or more of the various embodiments of the subject disclosure (e.g., devices 100, 200, 2800, circuits 300, 1300, 1400, 1600, electronic systems 902, 904, 906, 1000a, battery pack 1102c, system 1200, wire diagram 1700, etc.), a practical application of such various embodiments of the subject disclosure is that they can be implemented in a battery pack associated with an electronic system to provide self-monitoring capabilities, varying voltage supply, as well as an AC and/or DC power supply to the electronic system. For example, a practical application of such various embodiments of the subject disclosure is that they can be implemented in a battery pack of an electric driveline in an EV.

It should be appreciated that the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) provide a new approach driven by relatively battery pack technologies. For example, one or more embodiments of the subject disclosure described herein (e.g., device 100a, etc.) provide a new approach to designing, commissioning, maintaining, operating, and/or decommissioning a single battery device and/or battery cell device (e.g., device 100) in a battery pack, as such a single battery device and/or battery cell device can comprise an intelligent (e.g., "smart") and modular battery device and/or battery cell device.

The various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. The various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can be employed to solve new problems that arise through advancements in technologies mentioned above, employment of quantum computing systems, cloud computing systems, computer architecture, and/or another technology.

It is to be appreciated that the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can utilize various combinations of electrical components, mechanical components, and circuitry that cannot be replicated in the mind of a human or performed by a human, as the various operations that can be executed by the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) are operations that are greater than the capability of a human mind. For instance, the amount of data processed, the speed of processing such data, or the types of data processed by the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) over a certain period of time can be greater, faster, or different than the amount, speed, or data type that can be processed by a human mind over the same period of time.

The various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that the various embodiments of the subject disclosure described herein (e.g., devices 100, 200, 2800, circuits 300, 1300, 1400, 1600, electronic systems 902, 904, 906, 1000a, battery pack 1102c, system 1200, wire diagram 1700, etc.) can include information that is impossible to obtain manually by an entity, such as a human user. For example, the type, amount, and/or variety of information included in devices 100, 200, circuits 300, 1300, 1400, 1600, electronic systems 902, 904, 906, 1000a, battery pack 1102c, system 1200, and/or wire diagram 1700 can be more complex than information obtained manually by a human user.

What is claimed is:

1. A battery device, comprising:
    battery cells, wherein each battery cell of the battery cells comprises:
        active battery cell material; and
        an internal circuit coupled to the active battery cell material and comprising:
            a processor that controls the battery cell to provide a defined value of electric potential at a first set of battery cell poles of the battery cell, wherein the processor uses electrical energy from the active battery cell material to operate, and wherein the battery cells are coupled to one another to provide a second defined value of electric potential at second set of battery cell poles of the battery device.

2. The battery device of claim 1, wherein one or more first battery cells of the battery cells comprise at least one of a different physical size, a different chemical composition, or a different electrical capacity than one or more second battery cells of the battery cells.

3. The battery device of claim 1, wherein the battery cells respectively operate based on at least one of a defined operation mode, a defined duty cycle, or a defined discharge priority level to provide at least one of the defined value of electric potential at the respective first sets of battery cell poles of the battery cells or the second defined value of electric potential at the second set of battery cell poles of the battery device.

4. The battery device of claim 1, wherein the battery cells respectively operate based on at least one of a defined operation mode, a defined duty cycle, or a defined discharge priority level to provide at least one of the defined value of electric potential at the respective first sets of battery cell poles of the battery cells or the second defined value of electric potential at the second set of battery cell poles of the battery device, and wherein the defined operation mode comprises an off mode indicative of a zero value of electric potential, a bypass mode indicative of the zero value of electric potential, a positive mode indicative of a positive value of electric potential, and a negative mode indicative of a negative value of electric potential.

5. The battery device of claim 1, wherein the battery cells respectively operate based on at least one of a defined operation mode, a defined duty cycle, or a defined discharge priority level to eliminate one or more load balancing components that balance discharge of respective electrical energy from the battery cells to provide the second defined value of electric potential at the second battery cell poles of the battery device.

6. The device of claim 1, wherein one or more first battery cell devices of the battery cells comprise one or more first communication components that use at least one of a wired communication network or a wireless communication network to provide data corresponding to the one or more first battery cells to one or more second communication components of one or more second battery cells of the battery cells.

7. The device of claim 1, wherein one or more first battery cells of the battery cells change at least one of a defined operation mode, a defined duty cycle, or a defined discharge priority level of the one or more first battery cells based on data received from one or more second battery cells of the battery cells that corresponds to the one or more second battery cells.

8. A computer-implemented method, comprising:
providing, by a battery device, via respective processors within battery cells of the battery device, respective defined values of electric potential at respective first sets of battery cell poles of the battery cells using internal circuits of the battery cells, wherein the respective processors are powered using respective electrical energy stored in the battery cells; and
yielding, by the battery device, a second defined value of electric potential at second battery cell poles of the battery device based on the providing.

9. The computer-implemented method of claim 8, wherein one or more first battery cells of the battery cells comprise at least one of a different physical size, a different chemical composition, or a different electrical capacity than one or more second battery cells of the battery cells.

10. The computer-implemented method of claim 8, further comprising:
operating, by the battery device, respectively, the battery cells based on at least one of a defined operation mode, a defined duty cycle, or a defined discharge priority level; and
providing, by the battery device, at least one of the defined value of electric potential or the second defined value of electric potential based on the operating.

11. The computer-implemented method of claim 8, further comprising:
operating, by the battery device, respectively, the battery cells based on at least one of a defined operation mode, a defined duty cycle, or a defined discharge priority level; and
providing, by the battery device, at least one of the defined value of electric potential or the second defined value of electric potential based on the operating, wherein the defined operation mode comprises an off mode indicative of a zero value of electric potential, a bypass mode indicative of the zero value of electric potential, a positive mode indicative of a positive value of electric potential, and a negative mode indicative of a negative value of electric potential.

12. The computer-implemented method of claim 8, further comprising:
operating, by the battery device, respectively, the battery cells based on at least one of a defined operation mode, a defined duty cycle, or a defined discharge priority level to eliminate one or more load balancing components that balance discharge of respective electrical energy from the battery cells to provide the second defined value of electric potential.

13. The computer-implemented method of claim 8, further comprising:
employing, by the battery device, one or more first communication components of one or more first battery cells of the battery cells to provide, using at least one of a wired communication network or a wireless communication network, data corresponding to the one or more first battery cells to one or more second communication components of one or more second battery cells of the battery cells.

14. The computer-implemented method of claim 8, further comprising:
receiving, by the battery device, from one or more first battery cells of the battery cells, data that corresponds to the one or more first battery cells; and
changing, by the battery device, at least one of a defined operation mode, a defined duty cycle, or a defined discharge priority level of one or more second battery cells based on the data.

15. The battery device of claim 1, wherein each battery cell further comprises a transceiver.

16. The battery device of claim 15, wherein the transceiver performs wireless communications.

17. The battery device of claim 15, wherein the transceiver performs wired communications.

18. The computer-implemented method of claim 8, wherein each battery cell further comprises a transceiver.

19. The battery device of claim 18, further comprising communicating, by the battery device, with the transceiver of a battery cell of the battery cells using wireless communications.

20. The battery device of claim 18, further comprising communicating, by the battery device, with the transceiver of a battery cell of the battery cells using wired communications.

* * * * *